United States Patent [19]

Hashimoto et al.

[11] Patent Number: 5,554,980
[45] Date of Patent: Sep. 10, 1996

[54] REMOTE CONTROL SYSTEM

[75] Inventors: Koosuke Hashimoto; Eiji Matsuo, both of Nagaokakyo; Hisashi Kawagoe; Hiroaki Iwaasa, both of Kawanishi, all of Japan

[73] Assignee: Mitsubishi Denki Kabushiki Kaisha, Tokyo, Japan

[21] Appl. No.: 207,714

[22] Filed: Mar. 9, 1994

[30]  Foreign Application Priority Data

| Mar. 12, 1993 | [JP] | Japan | 5-052141 |
| Jul. 2, 1993 | [JP] | Japan | 5-164616 |
| Feb. 2, 1994 | [JP] | Japan | 6-011070 |
| Feb. 17, 1994 | [JP] | Japan | 6-045153 |
| Mar. 8, 1994 | [JP] | Japan | 6-037110 |

[51] Int. Cl.$^6$ .............................. G08C 19/00; G09G 5/08
[52] U.S. Cl. .......................... 340/825.72; 340/825.57; 345/158; 345/163
[58] Field of Search ............... 345/163, 165, 345/158, 159, 145, 157; 340/825.72, 825.69, 825.62, 825.57

[56] References Cited

U.S. PATENT DOCUMENTS

| 4,565,999 | 1/1986 | King et al. | 345/158 |
| 4,578,674 | 3/1986 | Baker et al. | 345/159 |
| 4,688,037 | 8/1987 | Krieg | 340/825.72 |
| 4,754,268 | 6/1988 | Mori | 345/163 |
| 4,796,019 | 1/1989 | Auerbach | 345/158 |
| 4,988,981 | 1/1991 | Zimmerman et al. | 345/158 |
| 5,059,958 | 10/1991 | Jacobs et al. | 345/158 |

FOREIGN PATENT DOCUMENTS

| 9107826 | 5/1991 | WIPO | 340/825.72 |
| 9214231 | 8/1992 | WIPO | 345/163 |

OTHER PUBLICATIONS

IBM Technical Disclosure Bulletin, vol. 34, No. 11, Subject: PS12: Gyroscopic Mouse Device, Apr. 1992, pp. 89–90.

Primary Examiner—Brian Zimmerman
Assistant Examiner—Edward Merz

[57] ABSTRACT

A remote control system includes a remote control unit and a controlled unit. The remote control unit is moved in space, and includes a movement detector, selection switch and transmitter. The movement detector detects movement of the remote control unit. The transmitter transmits output of the movement detector and the selection switch. The controlled unit includes a display device, receiver, and controller. The display device includes a display screen, and displays a cursor and icons on the display screen. The receiver receives the output of the movement detector and the selection switch transmitted by the transmitter. The controller moves the cursor across the display screen in accordance with the output of the movement detector and the selection switch.

53 Claims, 65 Drawing Sheets

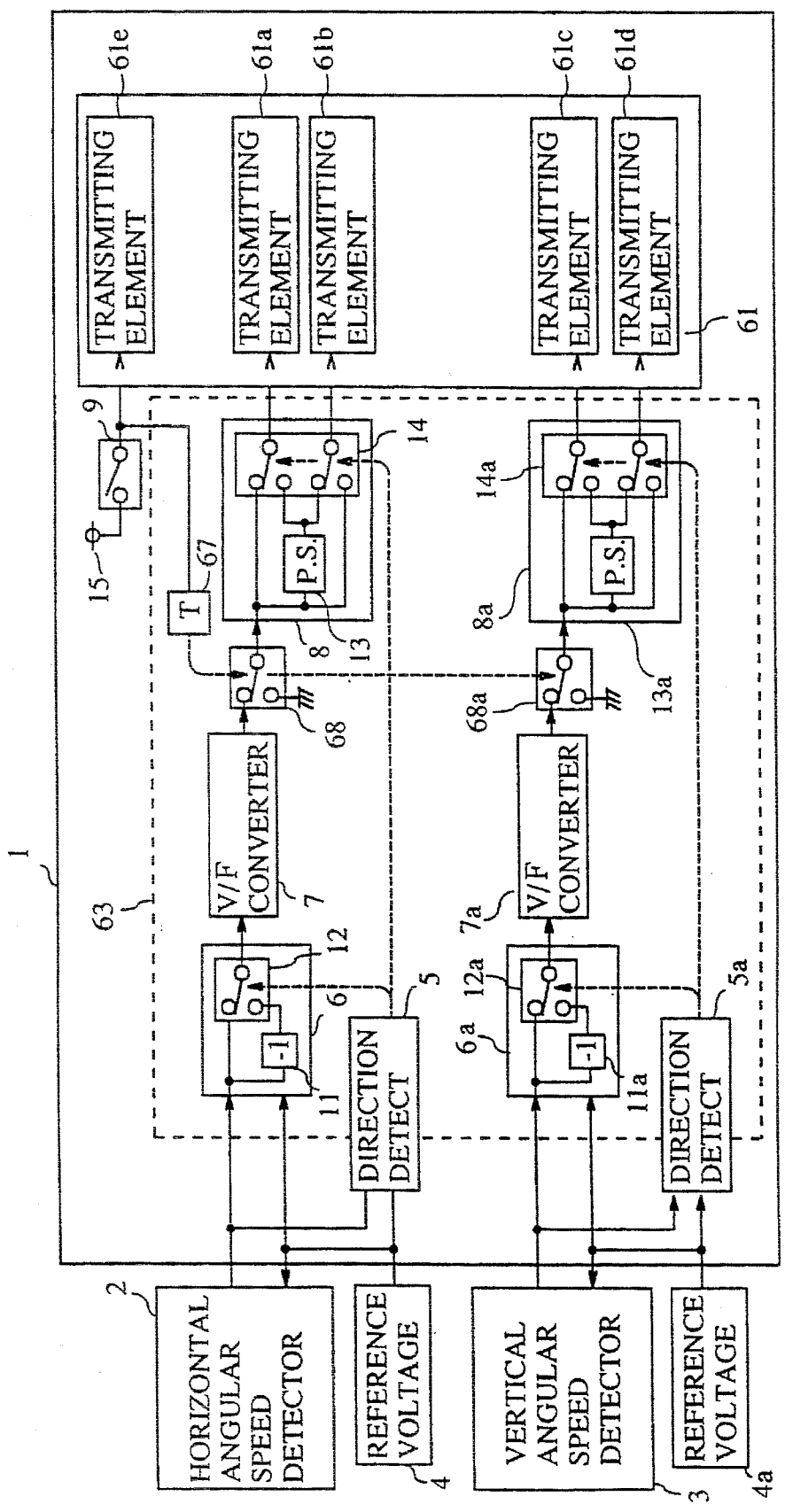

REMOTE CONTROL SYSTEM

BACKGROUND OF THE INVENTION

The present invention relates to a remote control system for controlling in an interactive manner a remotely controlled unit such as used in multimedia systems and the like. Multimedia systems are systems in which operating instructions concerning information for digitized text, audio, moving pictures, etc., which can be displayed on a screen of a direct-view CRT display device, a projector screen, etc., are issued interactively by means of icons, or instruction dialog boxes in the form of pictorial symbol also displayed on the screen. The multimedia systems are also used for control over the screen of the display device in a control tower or the like.

FIG. 73 is a perspective view showing a conventional remote control system, FIG. 74 is a block diagram of a controlled unit 121 in the conventional remote control system, and FIG. 75 is a diagram showing an example of a display on the screen of the remote control system. As shown in FIG. 73 and FIG. 74, the remote control system comprises a display device 1001 of a multimedia system, and a mouse 103 connected to the display device 1001. Specifically, the display device 1001 is provided with a mouse connection terminal 22, and the mouse 103 is provided with a connector 29 which is connected via a cable 28 to the mouse 103, and which can be inserted into the mouse connection terminal 22. In use, the mouse 103 is placed on a pad or table 104 and its ball is rolled over the pad 104.

The display device 1001 is also provided with a control processor 324, and a tuner 23 for terrestrial and satellite broadcasting. The display unit 1001 is connected to an LD (laser disk) player, a VTR (video tape recorder) 31, an antenna 30 for terrestrial and satellite broadcasting. A cursor (position selection mark) 108, in the form of an arrow, is displayed on the screen of the display device 100.

In FIG. 75, reference numeral 105 designates the opening menu screen; 353 designates a selective menu screen; 222 designates icons on the menu screens 105 and 353; and 322 designates the dialog box used to close selective menu 353.

Next, the operation of the multimedia TV will be described. When a power supply to the display device 100 is turned ON, the opening menu 105 is displayed. The cursor 108 is moved by moving the mouse 103 back and forth, and right and left. The cursor may be moved to the icon 222, for example, in the opening menu 105. If, in this state, a selection switch 309 is pressed, the icon 222 is selected, and the next selective menu 353 is displayed superimposed over the opening menu 105. If the cursor 108 is again moved to an icon 222, and the selection switch 309 is pressed, the operation represented by the selected icon 222 is executed by the control processor 324. If the control part 322 on the upper left corner is selected, the selective menu 353 is closed, and the display of the opening menu is resumed. In this way, control over the tuner 23 for the terrestrial and satellite broadcasting, the LD player 32 and the VTR 31 is performed.

FIG. 76 shows the structure of a mouse 103. The mouse 103 has a selection switch (in the form of a push-bottom switch) 309, a spherical ball 362, rollers 363 and 363a that are in contact with ball 362, rotary encoders 364 and 363a that are coaxial and connected with the rollers 363 and 363a, brushes 365 and 365a that are in contact with the rotary encoders 364 and 364a, and a printed circuit board 368 connected to the brushes 365 and 365a via a connection members 366 and 366a. The mouse 103 is further provided with a code conversion circuit 319 on the printed circuit board 368 for converting the sequences of pulses (pulse trains) from the rotary encoders 364 and 364a, the output signals of the selection switch 309 and a cancel switch 367 into codes of a format suitable for input to the control processor 324 for movement of the cursor and selection of the icon.

FIG. 77A and FIG. 77B show how the sequences of pulses are produced by rotation of the rotary encoder 364. Specifically, FIG. 77A shows how the rotary encoder 364 is contacted with the brushes 365-1, 365-2 and 365-3, and FIG. 77B shows the sequences of pulses produced when the mouse 103 is moved.

The following is a description of the sequence of pulses produced by the rotary encoder 364 of the mouse 103. As can be seen from FIG. 76, when the mouse 103 is moved, the ball 362 rotates so that the rollers 363 and 363a in contact with the ball 362 rotate, and hence the rotary encoders 364 and 364a, which are coaxial and connected with the rollers 363 and 363a also rotate. As can be seen from FIG. 77A, the brushes 365-1 and 365-2 alternately make and break contact with the conductor pattern of the rotary encoder 364 as it rotates, so that a sequence of pulses are produced from the brushes 365-1 and 365-2. As shown in FIG. 77B, no pulses are produced when the rotary encoder 364 is stationary, but as the speed of rotation increases, the frequency of the pulses rises. When the direction of movement of the mouse 103 is reversed, the relative phase of the pulses from the brushes 365-1 and 365-2 is reversed. Accordingly, it is possible to detect the direction of the movement of the mouse 103 by detecting the phase of the sequences of pulses.

The following is a description of the operation of the multimedia system. When the power supply for the controlled unit 21 is turned on, an opening menu screen 105 is displayed. Then the mouse 108 is moved toward the front, back, left or right on the pad 104 until the cursor 108 is positioned over the desired icon 222. If, in this state, the selection switch 309 is pressed, the icon 222 (over which the cursor 108 is superimposed) is selected, and a selective menu screen 353 corresponding to the selected icon 222 is displayed superimposed over the opening menu screen 105 (on the front side of the opening menu 105, and hence hiding most of the initial layout menu 105). By again moving the mouse 103 so that the cursor 108 is positioned over the desired icon 222 and pressing the selection switch 309, the icon 222 is selected and another selective menu is displayed, or some other operation (operation other than the display of the selective menu) is executed. Such operation is executed by the control processor. In this way, the terrestrial and satellite broadcast tuner 23, the VTR 31, the LD player 32, etc., are controlled.

Because the prior art remote control system is configured as described above, a table or a pad on which the mouse is moved is required.

It is also necessary for the operator to watch his hand holding the mouse as well as the screen.

SUMMARY OF THE INVENTION

An object of the invention is to solve the problems described above.

Another object of the invention is to provide a remote control system which does not require a table, pad, etc., for operation of a remote control unit.

According to the invention, there is provided a remote control system comprising a remote control unit provided with a display device and a controlled unit, the remote control unit being moved in space for moving a cursor displayed on a screen of the display device to an icon displayed on the screen of the display device for inputting a command for operation, wherein the remote control unit comprises movement detecting means for detecting movement of the remote control unit and producing a signal representing the movement, a selection switch for selecting the icon displayed on the screen and indicated by the cursor, and transmitting means for transmitting an output of the movement detecting means and an output of the selection switch, and the controlled unit comprises receiving means for receiving the signals transmitted from the transmitting means, and control means for moving the cursor in accordance with the signals received by the receiving means for the movement of the cursor and the selection of the icon.

With the above arrangement, the cursor on the display device is moved in accordance with the movement of the remote control unit in space so that a table or the like, which is used when a mouse is used, is not required. Moreover, it is only necessary to watch the screen of the display device, and it is not necessary to watch the hand holding the remote control unit. As a result, the remote control system of the invention is easy to use.

The movement detecting means may comprise first detecting means for detecting a component in a first direction of change in orientation of the remote control unit, and second detecting means for detecting a component in a second direction of change in orientation of the remote control unit.

With the above arrangement, the movement detecting means detects changes in orientation or rotation of the remote control unit, so that the cursor can be moved by simply rotating the remote control unit, i.e., changing the orientation of the remote control unit, while holding it in a hand.

The remote control unit may further comprise first signal converting means for converting an output signal from the first detecting means into a corresponding first sequence of pulses, second signal converting means for converting an output signal from the second detecting means into a corresponding second sequence of pulses, code conversion means for converting the sequences of pulses into corresponding codes;

with the transmitting means transmitting the codes, the receiving means receiving the codes, and the control means controlling the movement of the cursor in accordance with the codes.

With the above arrangement, the sequences of pulses are generated responsive to the components in the first and second directions of the change in orientation or rotation of the remote control unit. The sequences of pulses can be made to be equivalent to the sequences of pulses produced when a mouse is used. Accordingly, the claimed remote control unit can be used in combination with a controlled unit which is designed to be used with a mouse, without any modification of the controlled unit.

The remote control system of the invention may further comprise an angle-to-position conversion setting means having a first angle-to-position conversion coefficient and a second angle-to-position conversion coefficient. The first angle-to-position conversion coefficient is a ratio of the movement of the cursor in a first direction to the amount of change in orientation of the remote control unit. The second angle-to-position conversion coefficient is a ratio of the movement of the cursor in a second direction to the amount of change in orientation of the remote control unit. The second angle-to-position conversion coefficient is different from said first angle-to-position conversion coefficient.

With the above arrangement, the angle-to-position conversion coefficient is differently set between the movement in the first direction (e.g., horizontal direction) and the second direction (e.g., vertical direction) on the screen of a display device. As a result, even with a display device whose horizontal and vertical dimensions are different from each other, the cursor manipulation can be conducted with an improved sensation or feeling.

The remote control system may further comprise angle-to-position conversion coefficient altering means for altering a coefficient for angle-to-position conversion. The coefficient is a ratio of the movement of the cursor to the amount of change in orientation of the remote control unit in accordance with the cumulative amount of change in orientation of the remote control unit.

With the above arrangement, the angle-to-position conversion coefficient is varied depending on the cumulative amount of change in orientation of the remote control unit. Accordingly, the relationship between the orientation of the remote control unit and the position of the cursor on the screen is improved so that the cursor movement can be conducted with a more natural feeling.

The remote control system may further comprises means for removing, from the output signal of the movement detecting means, the component due to the movement of the remote control unit which is less than a predetermined value.

With the above arrangement, unwanted movement of the cursor due to a shake of the hand or the like can be prevented.

The remote control system may further comprise means for turning ON a power supply to the remote control unit when the selection switch is manipulated while the power supply to the remote control unit is OFF.

With the above arrangement, a separate power switch does not need to be provided on the remote control unit. Thus, the structure of the remote control unit is simple and the size of the remote control unit may be reduced.

The selection switch may comprise a two-stage selection switch which causes movement of the cursor when it is pressed to a first depth, and which causes selection of the icon indicated by the cursor on the display device, to produce an instruction, when it is pressed to a second, greater depth.

With the above arrangement, unintended movement of the cursor, such as when the remote control unit is brought onto a table, can be prevented by not pressing the selection switch.

The remote control system may further comprise operation detecting means which turns OFF the power supply to at least part of said remote control unit when the detected movement is less than a predetermined value continuously for more than a predetermined time, and which turns ON the power supply when the detected movement exceeds the predetermined value.

With the above arrangement, the power supply is automatically turned OFF when the remote control unit is not in use. Power consumption can, therefore, be reduced.

The transmitting means may comprise a plurality of transmitting elements for transmitting signals from the movement detecting means and the selection switch in parallel.

The receiving means may comprise a plurality of receiving elements, respectively corresponding to the transmitting elements which receive the signals transmitted from the corresponding transmitting elements to produce the signals from the movement detecting means and the selection switch.

With the above arrangement, a plurality of signals are transmitted directly. It is therefore not necessary to provide a modulator for merging the plurality of signals for transmission through a single channel. A demodulator in the receiving section is also not necessary.

The movement detecting means may comprise direction detecting means for detecting the direction of a change in orientation;

absolute value detecting means for detecting the absolute value of the change in orientation and producing a voltage signal indicative of the absolute value;

a voltage-to-frequency converting circuit for converting the voltage signal indicative of the absolute value into a first sequence of pulses corresponding to the voltage signal;

a phase shift circuit for shifting the phase of the first sequence of pulses to produce a second sequence of pulses having a predetermined phase difference with respect to the first sequence of pulses;

a switching circuit for selectively assuming a first position in which it outputs the first and second sequences of pulses respectively as third and fourth sequences of pulses, and a second position in which it outputs the first and second sequences of pulses respectively as fourth and third sequences of pulses; and wherein at least part of the direction detecting means, the absolute value detecting means, the voltage-to-frequency converting circuit, the phase shifting circuit and the switching circuit may be provided in the controlled unit.

With the above arrangement, the number of components forming the remote control unit can be reduced. This is advantageous from the view point of size reduction of the remote control unit and the reduction of power consumption at the remote control unit.

The direction detecting means may be adapted to produce a signal which assumes either a first value or a second value depending on whether the output of the movement detecting means is or is not greater than a predetermined value different from a value which indicates that there is no movement.

With the above arrangement, of the control signal pulses generated from the direction detecting means, the pulses that are due to the minute vibrations such as a shake of a hand are eliminated, and unnecessary switching of the switching circuit is prevented.

The remote control system may further comprise delay means for delaying the signal from the movement detection means; and the transmitting means may be adapted to transmit the signals delayed by the delay means.

With the above arrangement, when the remote control unit is moved due to the pressing of the selection switch for selection of an icon, attendant movement of the cursor is delayed until after the operation of the system for the selection of the icon is completed. Thus, failure of the selection of the icon due to cursor movement out of the icon is prevented.

The remote control system may further comprise means for inhibiting the movement of the cursor due to output of the movement detecting means is for a period after the selection switch is manipulated for the selection of the icon and until a predetermined time has elapsed after such manipulation of the selection switch.

With the above arrangement, when the remote control unit is moved due to the pressing of the selection switch, movement of the cursor is prevented.

The selection switch may comprise a two-stage switch whose first stage is operated for movement of the cursor, and whose second stage is operated for selection of the icon, with the first stage being operated by simply touching it or by pressing it with a minute pressing force.

With the above arrangement, the force required for operating the first stage, which must be kept pressed for moving the cursor, is eliminated or substantially reduced, so that the fatigue of the finger used for the operation of the selection switch is reduced.

The remote control system may further comprise means for producing a sound when the selection switch is brought to a state in which movement of the cursor is enabled, when the selection switch ceases to be in said first state, or as long as said selection switch is in said first state.

With the above arrangement, operation of the selection switch responsive to the manipulation (e.g., the closure of the switch) can be confirmed, and this makes the use of the remote control unit easier even when the pressing requires no or little pressing force.

The remote control system may further comprise a first member to which the movement detecting means is mounted, and a second member to which the selection switch is mounted. The first and second members are separate bodies.

With the above arrangement, transmission of vibrations due to the manipulation of the selection switch to the movement detecting means is minimized. This is particularly advantageous where the selection switch is made to produce clicks.

The remote control system may further comprise a damping material interposed between the movement detecting means and the selection switch.

With the above configuration, transmission of vibrations at the time of manipulation of the selection switch to the movement detecting means is minimized. This is particularly advantageous when the selection switch is made to produce clicks.

The selection switch may comprise a two-stage switch which produces a signal when its first stage is manipulated.

This system may further comprise synthesizing means for synthesizing the signal produced by the operation of the first stage, with the signal produced by the movement detecting means to produce a synthetic signal. In this system, the transmitting means transmits the synthetic signal, and the controlled unit comprises separating means for separating the synthetic signal into a signal indicating the manipulation of the first stage and the signal indicating the movement of the remote control unit, signal generating means responsive to the signal indicating the manipulation of the first stage, for producing a signal for turning ON the power supply to the display device or to operate a specific icon, and synthetic means for synthesizing the signal produced by said separating means and indicating the movement of the remote control unit and the signal produced by the signal generating means.

With the above arrangement, the first stage of the two-stage selection switch can be used for turning ON the power supply or the selection of a specific icon. The manipulation of the remote control unit can therefore be simplified.

The remote control system may further comprise a movement enabling switch which, when manipulated, enables movement of the cursor in accordance with the movement of the remote control unit. In this system, the movement enabling switch and said selection switch are separate and independent switches.

With the above arrangement, it is possible to use the movement enabling switch to inhibit the movement of the cursor despite the movement of the remote control unit.

The transmitting means may comprise means for producing electric waves, light, ultrasonic waves, etc., and may comprise a plurality of transmitting elements directed towards different directions.

With the above arrangement, even when the transmitting elements have a limited directivity and the orientation of the remote control unit is deviated to an extensive degree, the signals from the transmitting means can be received by the receiving means without fail.

The transmitting means may comprise means for producing light, and comprises a transmitting element and a lens for diverging the light from the transmitting element.

With the above arrangement, even when the transmitting element has a limited directivity and the orientation of the remote control unit is deviated to an extensive degree, the signals from the transmitting means can be received by the receiving means without fail.

The transmitting means may comprise means for producing electric waves, light, ultrasonic waves, etc., and the receiving means may comprise a plurality of receiving elements provided at different positions on the controlled unit.

With the above arrangement, even when the transmitting element has a limited directivity and the orientation of the remote control unit is deviated to an extensive degree, the signals from the transmitting means can be received by the receiving means without fail.

The remote control system may further comprise a continuous variation detecting circuit for enabling movement of the cursor only when the remote control unit is moving continuously.

With the above arrangement, sudden movement of the cursor due to a noise is prevented. This noise is generated, for example, when the direction in which the signals from the transmitting means of the remote control unit is shifted away from the direction in which the receiving means is provided.

The remote control system may further comprise a click interval detecting circuit for permitting the ON signal from the selection switch to select the icon only when the interval between the ON signals from the selection switch is longer than a predetermined value.

With the above arrangement, sudden movement of the cursor due to a noise, which has a level close to the threshold level and which is generated when the direction in which the signals from the transmitting means of the remote control unit is shifted away from the direction in which the receiving means is provided, is prevented.

The movement detecting means may comprise
first detecting means for detecting the component of the movement in a first direction,
second detecting means for detecting the component of the movement in a second direction,
first signal converting means for converting an output signal from the first detecting means into a corresponding first sequence of pulses,
second signal converting means for converting an output signal from the second detecting means into a corresponding second sequence of pulses,
code conversion means for converting the sequences of pulses into corresponding codes,
with the transmitting means transmitting the codes,
the receiving means receiving the codes, and
the control means controlling the movement of the cursor in accordance with the codes.

With the above arrangement, the sequences of pulses are generated responsive to the components in the first and second directions of a change in orientation of the remote control unit. The sequences of pulses can be made to be equivalent to the sequences of pulses produced when a mouse is used. Accordingly, the remote control unit can be used in combination with a controlled unit which is designed to be used with a mouse, without any modification of the controlled unit.

The code converting circuit is provided in the controlled unit.

With the above arrangement, identical remote control units can be used for different controlled units even if they may require different codes.

The movement detecting means comprises
first detecting means for detecting the component of the movement in a first direction,
second detecting means for detecting the component of the movement in a second direction, and
with the selection switch being provided such that it is pressed in a third direction normal to the first and second directions.

With the above arrangement, the movement in the first and second directions due to the pressing of the selection switch is minimized, and unwanted movement of the cursor due to the pressing of the selection switch can be minimized.

The movement detecting means may comprise
first detecting means for detecting an acceleration in a first direction of the movement of the remote control unit; and
second detecting means for detecting an acceleration in a second direction of the movement of the remote control unit.

With the above arrangement, it is possible to detect movement which does not accompany a change in orientation.

At least one of the first and second detecting means may comprise a pair of acceleration sensors for detecting acceleration components in directions orthogonal to each other, and a circuit for determining the square root of the sum of the squares of the outputs of the pairs of acceleration sensors.

With the above arrangement, it is possible to cancel fluctuations due to gravity on the change in orientation of the remote control unit.

The remote control unit may further comprise
first integrating means for integrating the output of the first detecting means into a first velocity signal;
second integrating means for integrating the output of the second detecting means into a second velocity signal;
first signal converting means for converting the first velocity signal into a corresponding first sequence of pulses; and
second signal converting means for converting the second velocity signal into a corresponding second sequence of pulses;

code conversion means for converting the sequences of pulses into corresponding codes, and the transmitting means transmitting the codes, the receiving means receiving the codes, and the control means controlling the movement of the cursor in accordance with the codes.

With the above arrangement, the sequences of pulses can be made to be equivalent to the sequences of pulses produced when a mouse is used. Accordingly, the remote control unit can be used in combination with a controlled unit which is designed to be used with a mouse, without any modification of the controlled unit.

The movement detecting means may further comprise third detecting means for detecting the component in the first direction of a change in orientation of the remote control unit;

fourth detecting means for detecting the component in the second direction of the change in orientation of the remote control unit;

first adding means for adding the output signal of the first integrating means and the third detecting means; and second adding means for adding the output signal of the second integrating means and the fourth detecting means.

With the above arrangement, the cursor can be moved according to the change in orientation as well as the translation movement of the remote control unit.

According to another aspect of the invention, there is provided a remote control system comprising a remote control unit provided with a display device and a controlled unit, the remote control unit being moved in space for moving a cursor displayed on a screen of the display device to an icon displayed on the screen of the display device for inputting a command for operation, wherein the remote control unit comprises position detecting means for detecting the position of the remote control unit relative to the display device, and producing a signal representing the position, a selection switch for selecting the icon displayed on the screen and indicated by the cursor, and transmitting means for transmitting an output of the detecting means and an output of the selection switch, and the controlled unit comprises receiving means for receiving the signals transmitted from the transmitting means, and control means for moving the cursor in accordance with the signals received by the receiving means for the movement of the cursor and the selection of the icon.

With the above arrangement, it is possible to make the position of the cursor correspond to the position of the remote control unit relative to the display device, without regard to the initial position (e.g., position at the time of power-on) and without resetting.

The selection switch may comprise a two-stage switch, and the system may further comprise operation stopping means responsive to the signal from the first stage of the two-stage switch for stopping the cursor.

With the above arrangement, it is possible to stop the cursor despite movement of the remote control unit.

The operation stopping means may comprise a synthesizing circuit provided in said remote control unit for synthesizing the signal of the first stage with the signals indicative of the position of the remote control unit and the signal of the second stage of the selection switch;

a separating circuit provided in the controlled unit for separating the signal of the first stage from the signal indicative of the position of the remote control unit and the signal of the second stage;

a switching circuit provided in the controlled unit to receive the signal indicative of the position of the remote control unit, and responsive to the signal of the first stage for preventing output of the signal indicative of the position of the remote control unit.

With the above arrangement, it is possible to prevent movement of the cursor despite the movement of the remote control unit.

The operation stopping means may comprise a memory provided in the remote control unit and storing the output of the position detecting means at the instant when the first stage of the two-stage switch is turned OFF; and a switch provided in the controlled unit for selecting the output of the position detecting means when the first stage is ON, and selecting the output of the memory when the first stage is OFF.

With the above arrangement, the cursor is fixed at the position corresponding to the position of the remote control unit at the instant when the first stage is turned OFF. It is therefore possible to prevent movement of the cursor due to movement of the remote control unit when such movement is not desired.

The remote control system may further comprise operation stopping means for preventing movement of the cursor for a predetermined time after selection of an icon by means of the selection switch.

With the above arrangement, the cursor is not moved for a predetermined time after the selection switch is manipulated and until the selection of the icon is completed. Thus, the selection of the icon, in particular, by double click can be achieved without fail.

The operation stopping means may comprise a timer for producing a signal for a predetermined time after turning-ON of the selection switch;

a synthesizing circuit provided in the remote control unit for synthesizing the signal of the timer with the signal indicative of the position of the remote control unit and the signal indicating that the selection switch is pressed;

a separating circuit provided in the controlled unit for separating the signal of the timer from the signal indicative of the position of the remote control unit and the signal indicating that the selection switch is pressed;

a switching circuit receiving the signal indicative of the position of the remote control unit, and responsive to the signal of the timer for inhibiting the output of the switching circuit for said predetermined time.

With the above arrangement, the signal indicative of the position of the remote control unit is not output for a predetermined time after the selection switch is turned ON. Accordingly, it is possible to prevent unwanted movement of the cursor due to pressing of the selection switch.

The operation stopping means may comprise a timer for producing a signal for a predetermined time after the selection switch is turned ON;

a memory provided in the remote control unit for storing the output of the position detecting means at the time when the selection switch is turned ON; and a switching circuit for selecting the output of the memory for a predetermined time after the selection switch is turned ON, and selecting the output of the position detecting means at other times.

With the above arrangement, it is possible to prevent the unwanted movement of the cursor due to pressing of the selection switch.

According to a further aspect of the invention, there is provided a remote control system comprising a superimposing device for displaying a cursor in superimposition with an image on a display screen, the image being displayed based on an input video signal; and a remote control unit for moving the cursor on the display screen.

With the above arrangement, it is possible to display a cursor in superimposition with an image displayed on a TV set or the like, which corresponds to the video signal from a VTR, an LD player, etc.

BRIEF DESCRIPTION OF THE DRAWINGS

FIG. 45A is a block diagram showing a remote control unit of Embodiment 19.

DETAILED DESCRIPTION OF THE PREFERRED EMBODIMENTS

Embodiment 1

Figure 1:
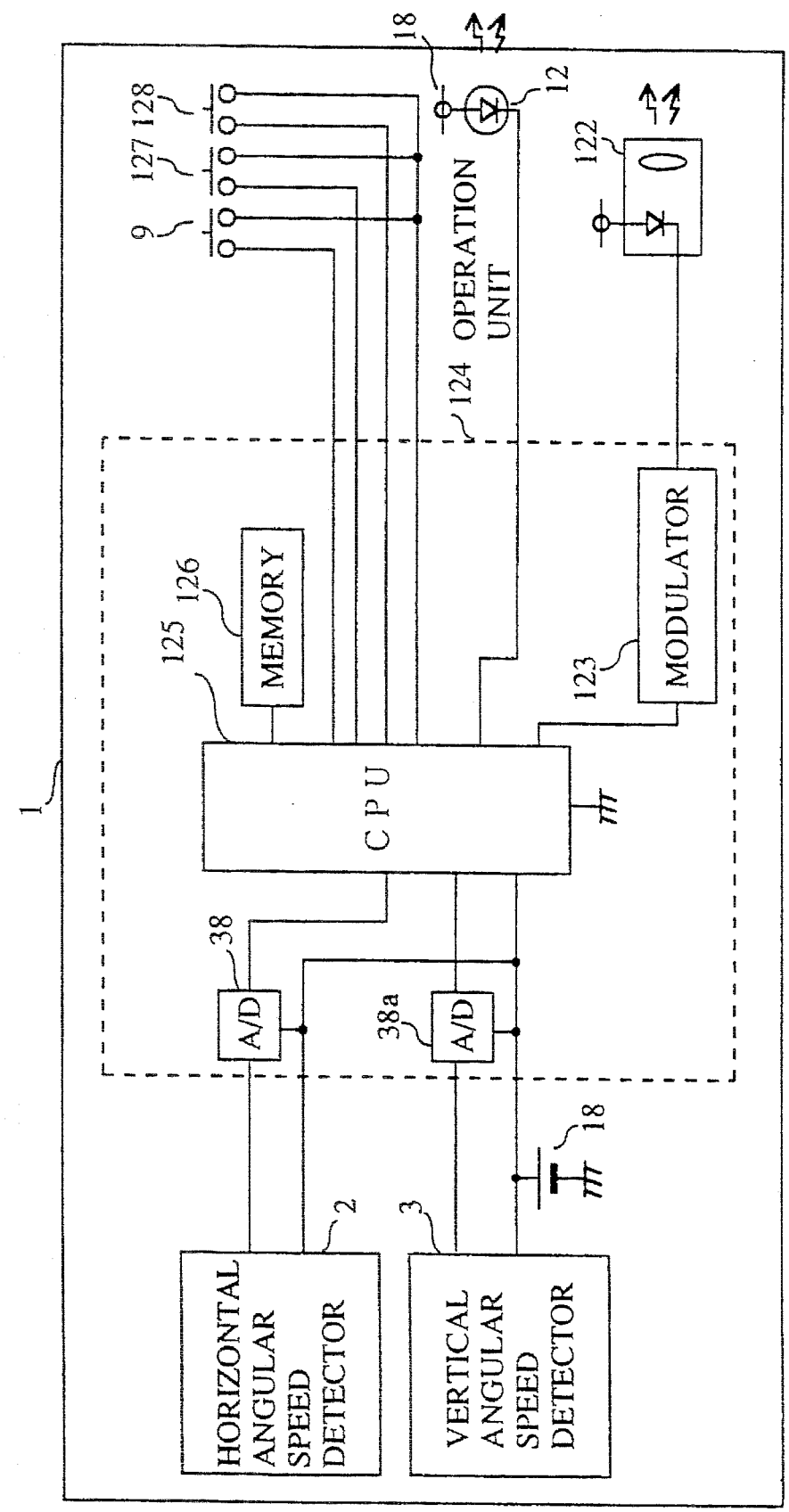
FIG. 1 is a block diagram showing a remote control unit of Embodiment 1.
Figure 2:
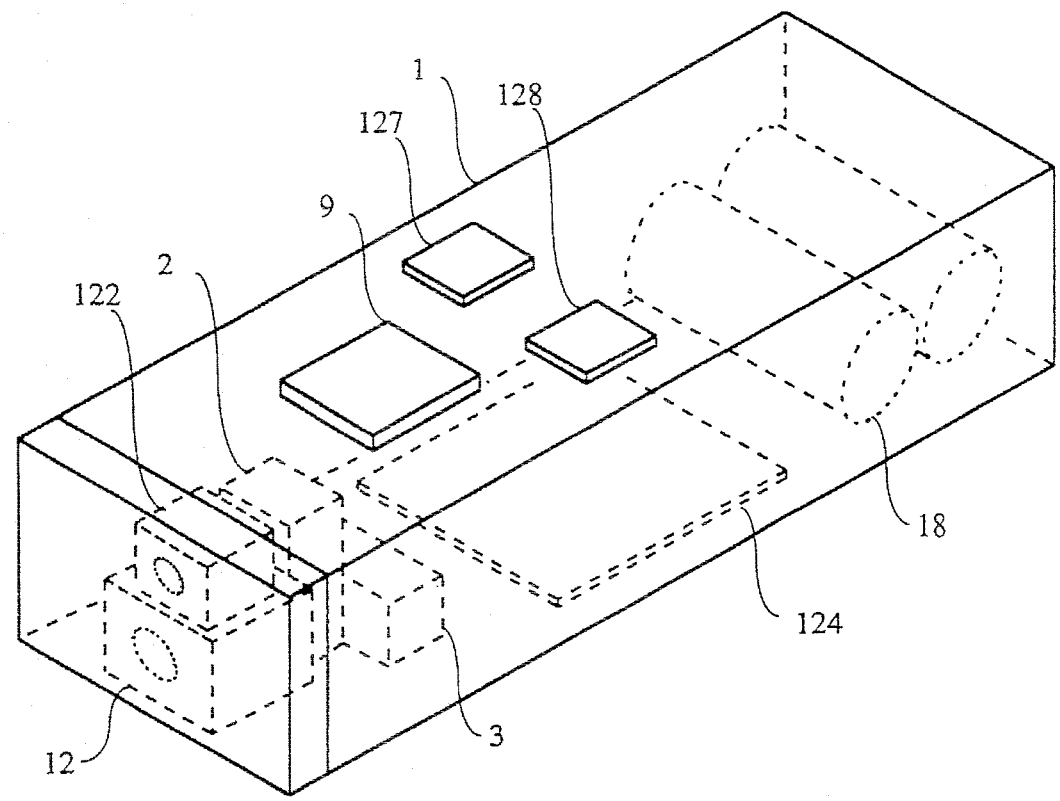
FIG. 2 is a perspective view showing the remote control unit of Embodiment 1.

A first embodiment, Embodiment 1, will now be described with reference to FIG. 1 to FIG. 15. FIG. 1 and FIG. 2 are a block diagram and a perspective view of a remote control unit 1 of this embodiment. This remote control unit 1 is used to control a controlled unit 21 including a display device 100, shown in FIG. 3.

As illustrated in FIG. 1, the remote control unit 1 comprises horizontal and vertical angular speed detectors 2 and 3 that detect the speed of angular motion in the horizontal and vertical directions, respectively. Here, the angular motion in the horizontal direction means angular motion, i.e., rotation about an axis parallel with a vertical line on the screen of the display device 100 of the controlled unit 21. The angular motion in the vertical direction means angular motion, i.e., rotation about an axis parallel with a horizontal line on the screen of the display device 100.

The horizontal and vertical angular speed detectors 2 and 3 are built in the casing of the remote control unit 1 and use vibration gyroscopes to produce electrical signals corresponding to the detected angular speed. Generally speaking, means that detect an angular speed to produce an electrical signal make use of mechanical phenomena that generate Coriolis force. Such angular speed detectors include, but are not limited to, rate gyros, which detect displacement due to the Coriolis force produced in accordance with the angular speed of a body that is rotated, and vibrating-reed or tuning-fork vibrating gyros, which detect displacement due to the Coriolis force produced in accordance with the angular speed when the vibrating-reed or tuning-fork vibrator is excited by a piezoelectric ceramic (bimorph). Any of these types of any other type of angular speed detectors may be used.

Reference numeral 12 designates a signal transmitter, and 18 designates a power supply. Reference numerals 38 and 38a designate A/D converters for converting the signals from the horizontal and vertical angular speed detectors 2 and 3, respectively, into digital signals; 122 designates a limited-directivity (narrow-directivity) photo-emitter, such as a laser pointer; 123 designates a modulator that modulates the signal produced by the limited-directivity photo-emitter 122. The A/D converters 38 and 38a, a CPU 125, a memory 126, and the modulator 123 form an operation unit 124. Reference numeral 127 designates a power supply switch, 128 designates a menu switch, and 9 designates a selection switch.

Figure 3:
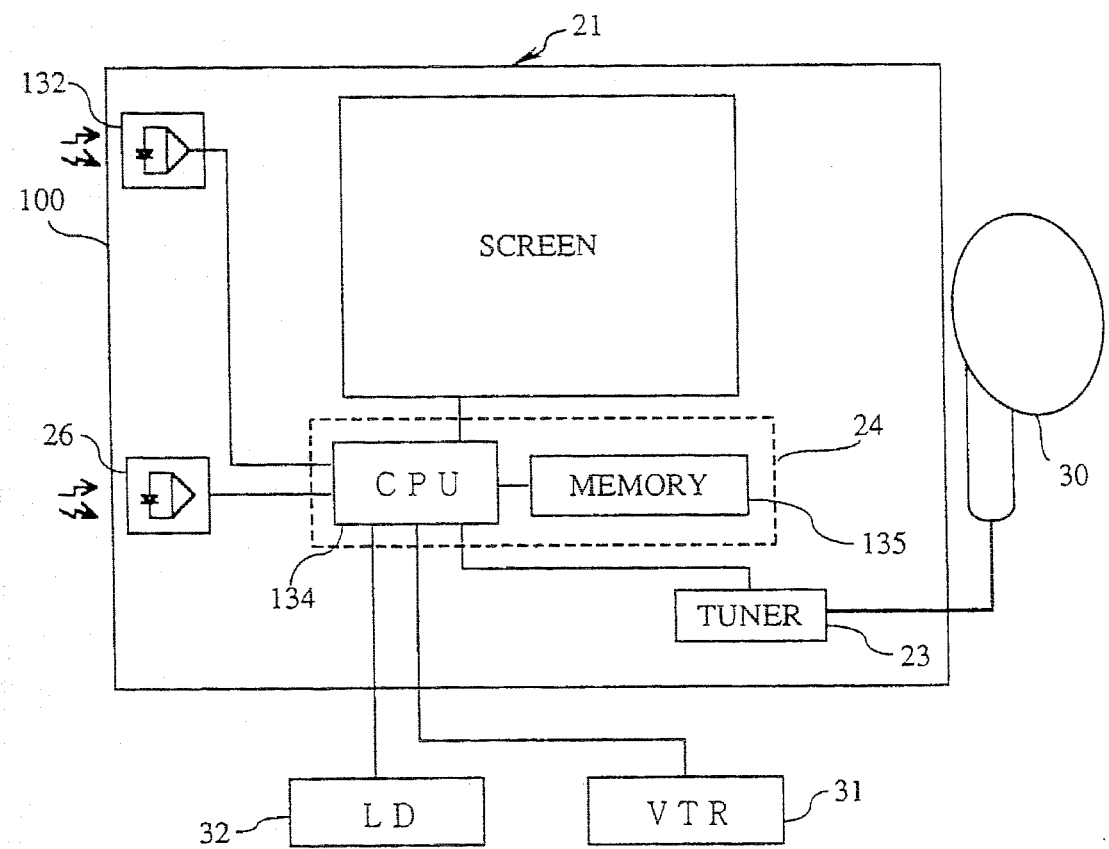
FIG. 3 is a block diagram showing a controlled unit of Embodiment 1.
Figure 4:
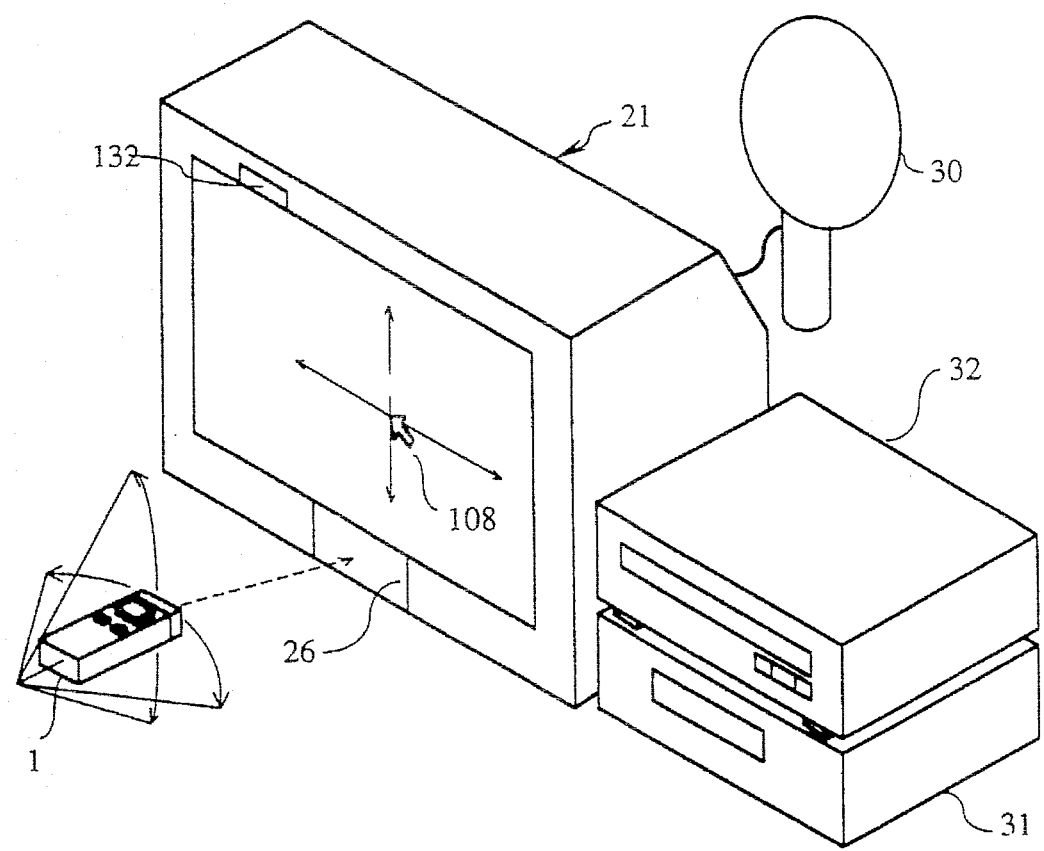
FIG. 4 is a perspective view showing a remote control system of Embodiment 1.

FIG. 3 is a block diagram showing the remotely controlled unit 21 that is operated by the remote control unit 1, and FIG. 4 is a perspective view showing a remote control system. In these drawings, a reference numeral 100 designates a display device of the remotely controlled unit 21 that is operated by the remote control unit 1. Provided on the front side of the display device 100 and mounted to the front side of the display device are a signal receiver 26 and a limited-directivity photo-detector (laser pointer receiving means) 132. Connected to the display device are an antenna 30 for reception of terrestrial broadcasting and satellite broadcasting, a VTR and an LD (laser disk) player. Built in the display device 100 are a control processor 24 comprising a CPU 134 and a memory 135, and a tuner for terrestrial broadcasting and satellite broadcasting. The control processor 24 is capable of controlling the terrestrial and satellite broadcast antenna 30, the VTR 31 and the LD player 32.

In the illustrated example, the controlled unit 21 is shown to have a monitor screen as it is assumed that an ordinary television receiver is developed for multimedia use. It is to be understood that, depending on the conditions under which is used (e.g., a home theater system), it is also possible for the display screen and controlled unit to be provided separately.

Figure 5:
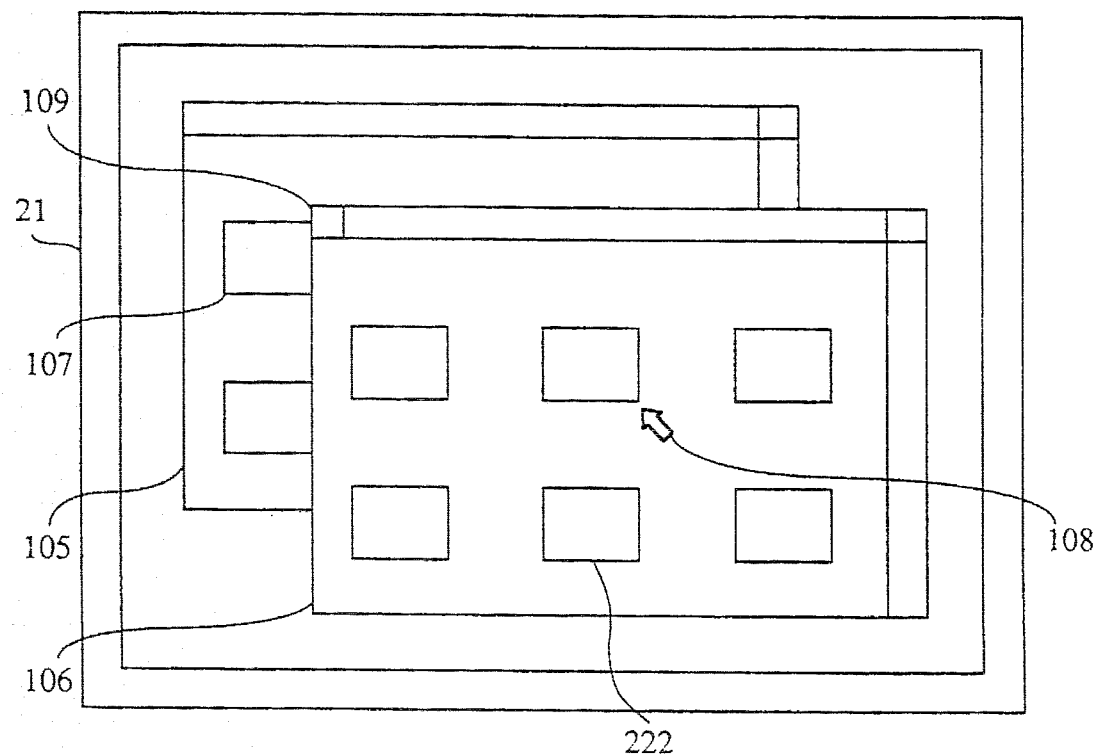
FIG. 5 is a diagram showing the screen of a display device of Embodiment 1.

When the power supply switch 127 of the remote control unit 1 is turned ON, power is supplied to the remote control unit 1. The operation unit 124 then reads the signal from the memory 126 to turn ON the power supply to the display device 100. This signal is transmitted from the signal transmitter 12. A signal is also emitted from the limited-directivity photo-emitter 122 to the limited-directivity photo-detector 132 of the display device 100. When the power supply to the display device 100 is turned ON, an opening menu screen 105 shown in FIG. 5 is caused to appear on the screen of the display device 100 under control of the control processor 24.

The orientation of the remote control unit 1 is then adjusted manually so that the signal transmitted by the limited-directivity photo-emitter 122 is received by the limited-directivity photo-detector 132 on the front panel of the display device 100. When the signal is received by the limited-directivity photo-detector 122, the cursor 108 shown in FIG. 5 changes in color, shape, size or the like to indicate that the signal has been received, and reception of the angular speed information transmitted by the signal transmitter 12 of the remote control unit 1 begins. The angular speed information indicates the rate of change in orientation, i.e., rotational angular speed.

When the remote control unit 1 is subjected to angular motion or rotated in space toward the front, back, left or right, the outputs of horizontal and vertical angular speed detectors 2 and 3 vary. The outputs of the detectors 2 and 3 are centered at the value of one half of the power supply voltage, which is produced when stationary; vary in accordance with the angular speed within a range of from one half of the power supply voltage to the full power supply voltage when the gyro rotates in the forward direction; and vary within a range of from one half of the power supply voltage to 0 V when the gyro rotates in the reverse direction. The horizontal and vertical angular speed detectors 2 and 3 are connected to the operation unit 124, which calculates the direction of the angular motion. The operation unit 124 detects the voltage output from detectors 2 and 3, and integrates the output voltage to obtain a vector quantity. The data indicative of the vector quantity is converted into a digital signal, and sent to the CPU 125. The signal is thereafter transmitted from the signal transmitter 12, as a remote control signal.

If the orientation of the remote control unit 1 is then changed to bring the cursor 108 toward a desired icon 222 of an opening menu screen 105, a transmitted remote control signal is received by the signal receiver 26 on the front panel of the display device 100 and processed by the control processor 24 to cause the cursor 108 to move.

When the cursor 108 has reached the desired icon 222, and the selection switch 9 is pressed, the icon (and hence the command represented by the icon) is selected, and a next menu is made to appear on the screen. If, for example, the selection switch 9 is pressed when the cursor is over an icon used for a VTR, the system will turn to a VTR mode.

Now the operation for successively selecting menus is described.

Figure 6:
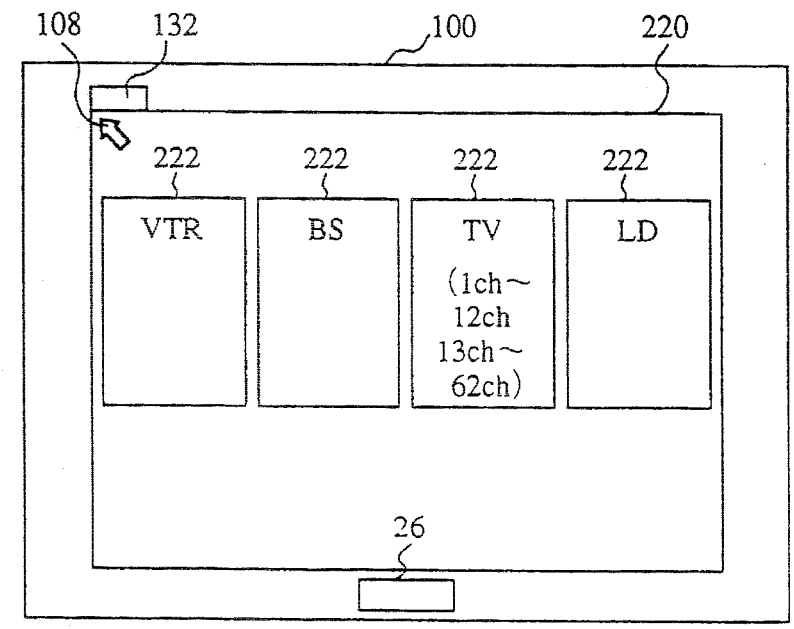
FIG. 6 is a diagram showing an initial menu displayed on the screen of the display device of Embodiment 1.

FIG. 6 shows an example of opening menu screen 220. Icons 222 are indicated as screen buttons for VTR, satellite broadcasting, TV (terrestrial broadcasting) and LD player modes. These buttons function as switches provided on the screen. A cursor 108 is also shown.

Figure 7:
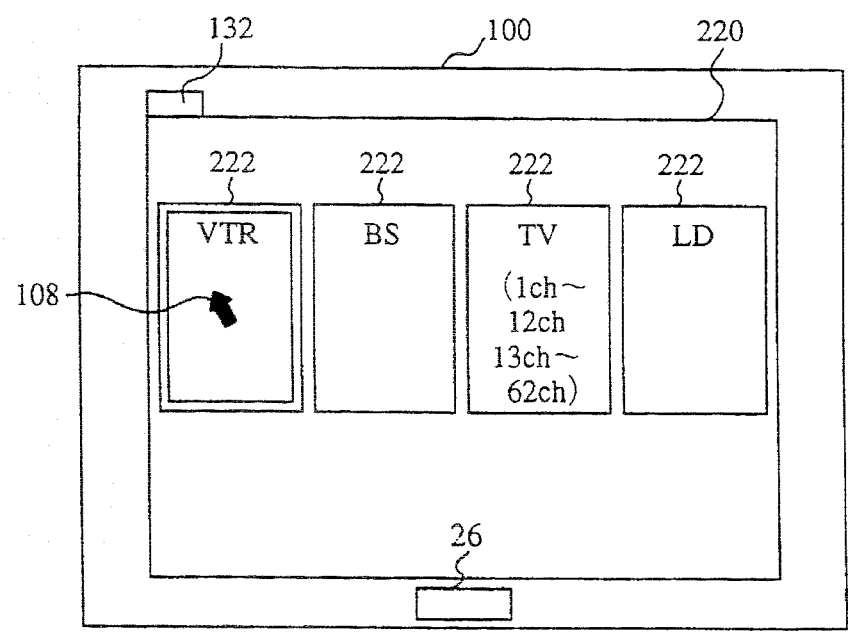
FIG. 7 is a diagram showing the initial menu displayed on the screen, with a cursor for selecting an icon.

FIG. 7 shows the opening menu screen 220 with an example of the cursor 108 selecting an icon 222 on the screen. The color of the cursor 108 is changed at this time.

Figure 8:
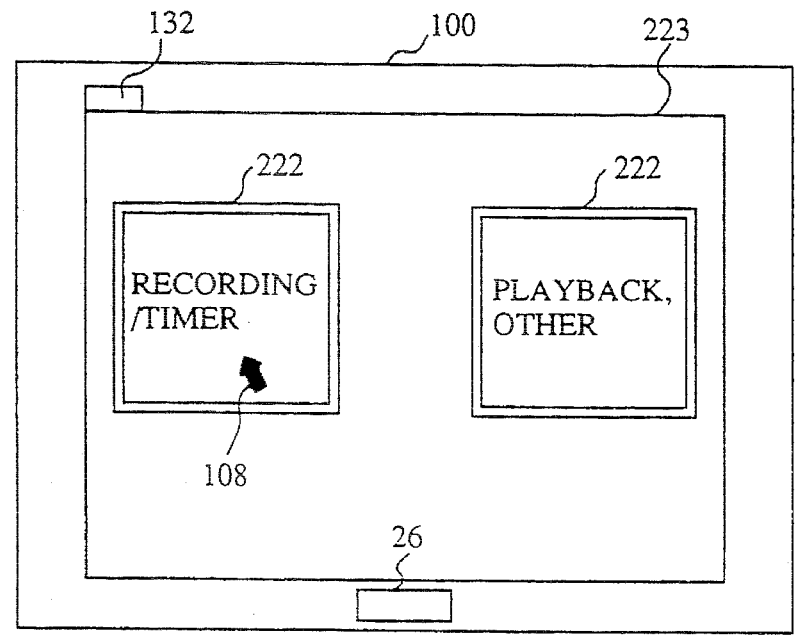
FIG. 8 is a diagram showing an initial menu for VTR.

FIG. 8 shows the VTR mode menu screen 223 comprising recording and playback icons. The color of the selected icon changes.

Figure 9:
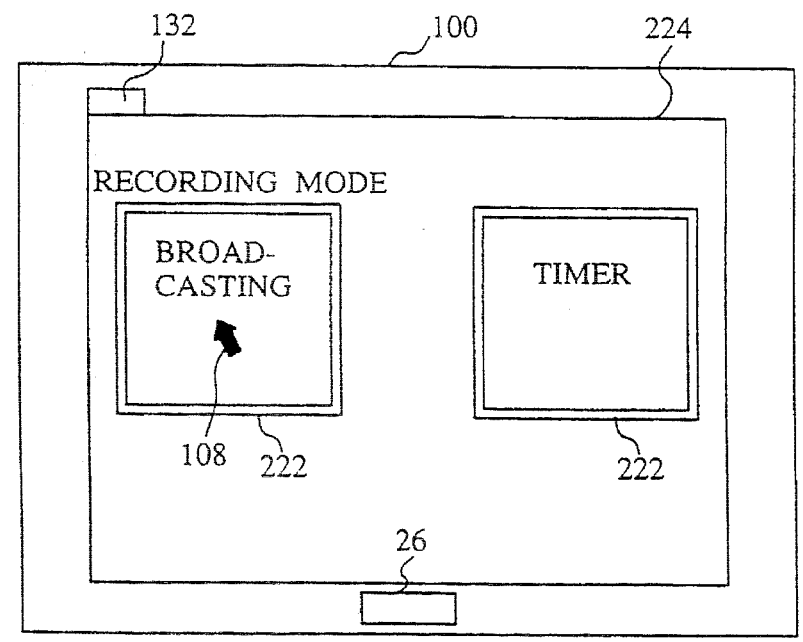
FIG. 9 is a diagram showing an initial menu for VTR recording.

FIG. 9 shows the VTR recording mode menu screen 224 obtained when, in the state of FIG. 8, the record mode is selected. The screen comprises icons for selecting modes for a channel being broadcast and timer recording.

Figure 10:
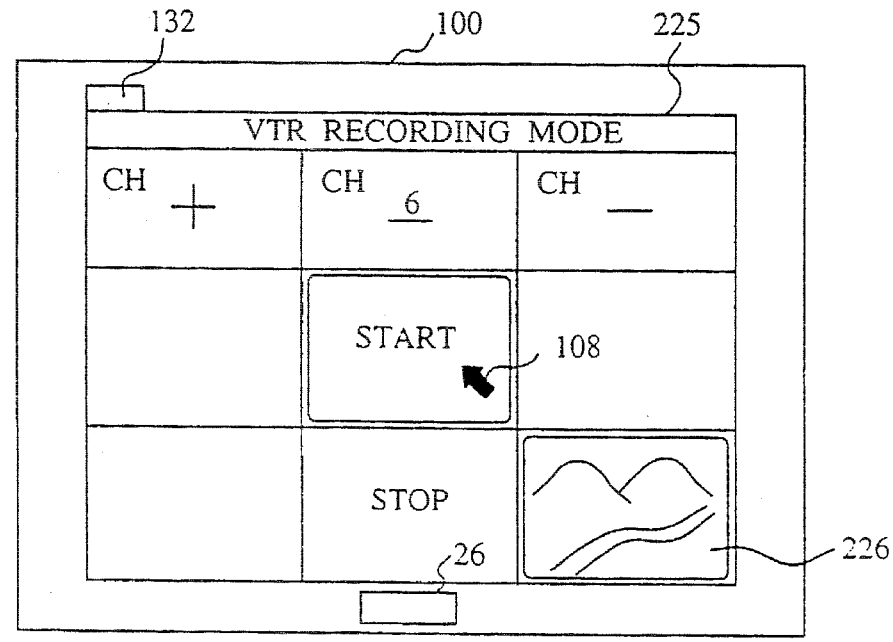
FIG. 10 is a diagram showing a menu for VTR recording.

FIG. 10 shows the VTR recording menu screen 225 produced when, in the state of FIG. 9, the broadcast channel mode is selected. The screen is divided into a suitable number of sub-screens, 9 in this example, each forming an icon for selecting an operation, except for one sub-screen 226 for displaying the VTR channel being received.

Figure 11:
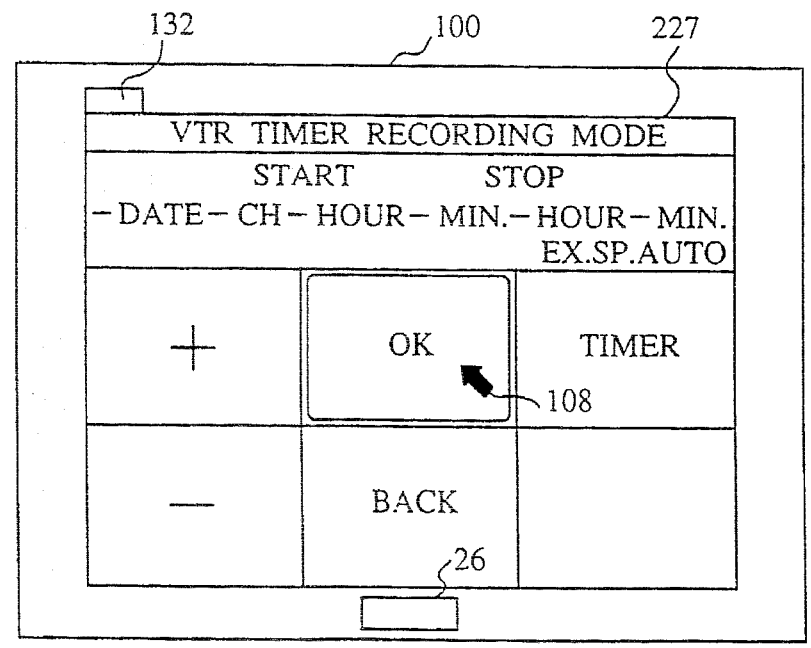
FIG. 11 is a diagram showing a menu for VTR timer/recording.

FIG. 11 shows the VTR recording menu screen 227 produced when, in the state of FIG. 9, the timer recording mode is selected. In this example, the icons comprise "+" icons, "−" icon, "OK" icon and "Back" icon for making corrections, as well as timer recording start icon.

Figure 12:
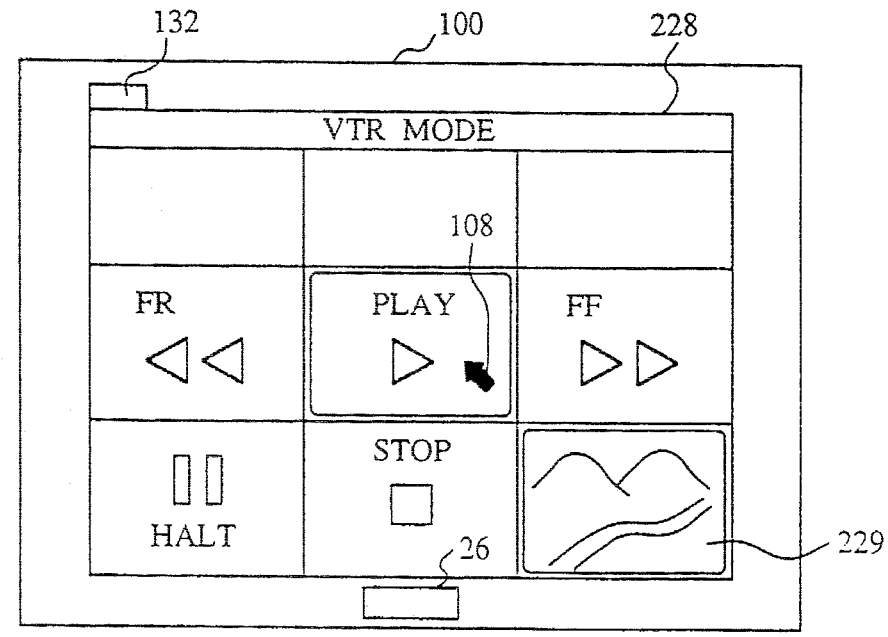
FIG. 12 is a diagram showing a menu for VTR playback.

FIG. 12 shows the VTR playback menu screen 228 obtained when, in the state of FIG. 8, the playback mode icon is selected. In the figure, the screen is divided into 9 sub-screens of which one is a VTR display device sub-screen 229 and five sub-screens are icons for operation.

Figure 13:
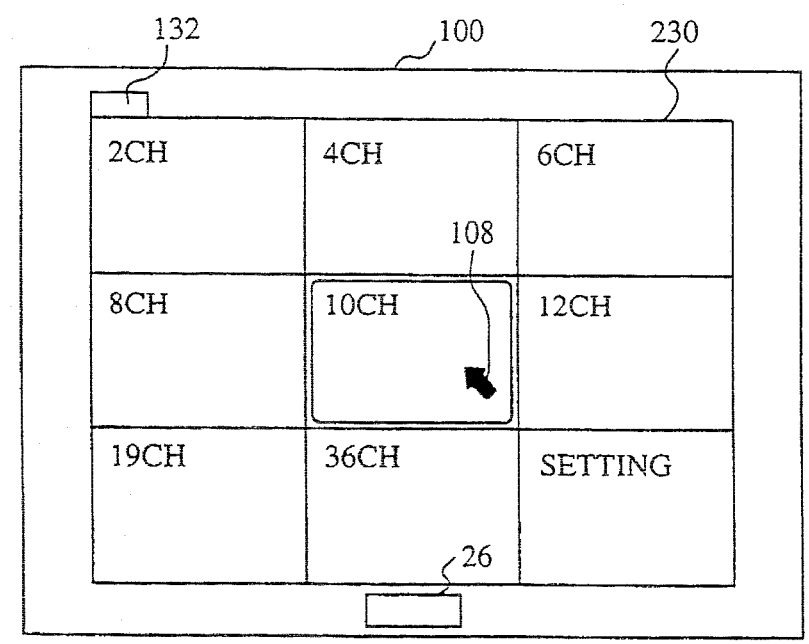
FIG. 13 is a diagram showing an initial menu for TV.

FIG. 13 shows the TV menu screen 230 obtained when, in the state of FIG. 7, TV mode is selected. As shown in the figure, the TV menu screen is divided into 9 icons for setting the respective TV channels.

Figure 14:
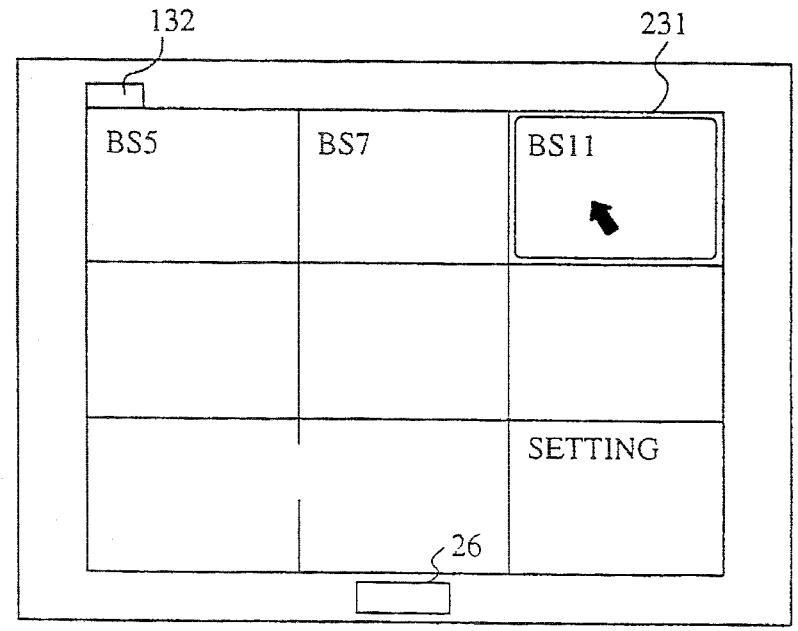
FIG. 14 is a diagram showing an initial menu for BS.

FIG. 14 shows the BS mode menu screen 231 obtained when, in the state of FIG. 7, the BS mode is selected. As shown in the figure, the BS menu screen is divided into a plurality of icons for setting the respective satellite channels.

Figure 15:
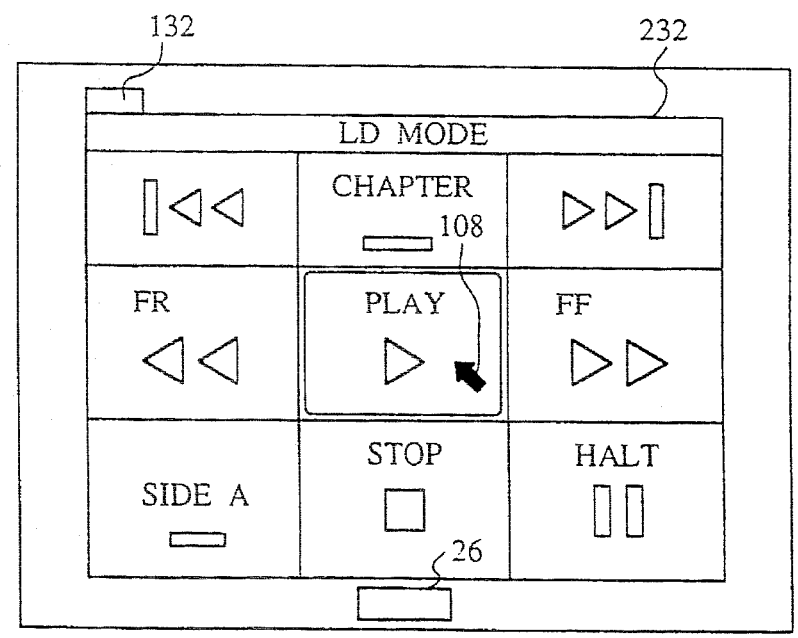
FIG. 15 is a diagram showing a menu for LD playback.

FIG. 15 shows the LD player playback mode menu screen 232 obtained when, in the state of FIG. 7, the LD player mode is selected. As illustrated, the screen is divided into 9 icons for selecting the respective operations. When an icon is selected, the corresponding control signal for the indicated operation is sent from the processor built in the display device 100 to the LD player 32.

When, for instance, the selection switch is pressed while the cursor 108 is over the icon for selecting the VTR mode, the display device is brought to the VTR mode. Then, the VTR opening menu 223 shown in FIG. 8 appears on the screen of the display device 100, and the power supply to the VTR is turned ON. The display device 100 and VTR 31 are connected with each other. The control signal is sent from the display 100 to the VTR 31, and the power supply activate signal is sent from the display device 100 to the VTR 31.

In the same manner, when the cursor 108 is brought to the recording/timer mode icon and the selection switch 9 is pressed, the icon display changes as if a button were pressed, and the record/timer mode indicated in FIG. 9 is produced.

When the record/timer mode screen appears and the broadcast channel or timer recording icon is selected, the next screen is produced. By selecting the broadcast icon in the same manner as described above, the screen changes to the VTR recording menu 225 indicated in FIG. 10. The four displayed icons are "+" and "−" for changing the channels, and "start" and "stop." Also, among the screen divisions one is the channel sub-screen 226 for displaying the channel selected by the VTR 31. When the start icon is selected, the processor sends the above mentioned control signal to the VTR 31, recording starts and the entire screen changes to display the channel selected by the VTR.

In order to return to the VTR recording menu, the menu switch 128 of the remote control system 1 is pressed and, a one-screen return signal is sent from the signal transmitter. This signal is received by the signal receiver 26 of the display 100, and sent to the processor 24 indicated in FIG. 3 which causes the return of the previous menu screen.

When desiring to stop recording, the menu switch 128 is pressed. This causes the return of the previous VTR recording menu screen 225. Then the stop icon can be selected. VTR recording is then stopped.

When timer recording is selected from the VTR recording mode menu 224 shown in FIG. 9, the timer recording menu 227 indicated in FIG. 11 is produced. At this menu, the desired day and time is selected with the "+" and "−" icons. Then an "OK" icon is selected, or, to correct the setting, the "Back" icon is selected. After setting the day and time, the timer icon is selected to produce the VTR timer mode. The display device 100 displays the opening menu 220 indicated in FIG. 6.

During the VTR mode menu screen 223 indicated in FIG. 8, when the playback mode icon is selected, the VTR playback menu screen 228 indicated in FIG. 12 is produced. When the VTR playback mode icon is selected, a signal is sent by the controller 24 to the VTR. For example, when playback is selected, the picture produced by the VTR 31 is produced on the overall screen and the VTR 31 enters the playback mode. During playback, when the menu switch 128 of the remote control system 1 is pressed, the previous screen, i.e., the VTR playback menu screen 228 indicated in FIG. 12 is produced.

Also, one sub-screen of the VTR playback menu screen 228 indicated in FIG. 12 is assigned to the playback picture 229 from the VTR 31. Also, this sub-screen is formed as an icon and by selecting this icon, the entire screen displays the playback picture of the VTR 31.

In the same manner as above, by pressing the menu switch 128 of the remote control system 1, the previous menu screen is produced. During the VTR initial menu, when the menu switch 128 of the remote control system 1 is pressed, the VTR 31 mode is checked, and if the VTR 31 is not in an operating state, the power supply to the VTR 31 is turned OFF.

When the TV mode is selected at the opening menu 220 indicated in FIG. 6, the TV menu 230 indicated in FIG. 13 is produced. The screen is divided into 9 sub-screens as indicated in FIG. 13, each corresponding to a channel, and each forming an icon corresponding to its respective channel. In this state, the channels are successively selected by the tuner 23, and the picture data is stored, with one field taken as a unit, in the memory 135 of the processor 24. The stored picture data corresponding to the respective channels are processed so that they are displayed in the respective sub-screens using a video board.

This menu is arranged so that the screen data sequentially switch in turn. For instance, the entire screen is divided into 9 sub-screens, and pictures of a first set of eight channels, e.g., 1st to 8th channels, are displayed in the 1st to 8th sub-screens. Characters or a mark indicating "others" is displayed in the 9th sub-screen. If the cursor is moved to one of the 1st to 8th sub-screens and the selection switch is pressed, the corresponding channel is selected. If the cursor is moved to the 9th sub-screen and the selection switch is pressed, then another set of eight channels, e.g., 9th to 16th channels, are displayed in the 1st to 8th subscreens, and the 9th sub-screen again displays characters or mark indicating "others." The same process is repeated to enable selection of a desired channel.

As mentioned above, when a channel is selected, the picture of the selected channel is displayed over the entire screen. In other words, the data of the channel selected by the tuner 23 are sent from the processor 24 and the picture of the selected channel is displayed on the screen.

In the same manner as above, when the menu switch 128 of the remote control unit 1 is pressed, the previous menu screen, i.e., the TV menu screen 230 indicated in FIG. 13 is produced, and when the menu switch 128 is again pressed, the opening menu 220 of FIG. 6 is returned.

At the opening menu of FIG. 6, when the BS mode is selected, in the same manner as the TV selection, the BS menu 231 indicated in FIG. 14 is produced. In the same manner as discussed above with respect to TV menu 230, the channels selected by the tuner are stored, with one frame taken as a unit, in the memory 135 of the processor 24 and displayed on the screen using the video board.

In the same manner as the above TV menu 230, the screen is divided into a plurality of sub-screens forming icons. When an icon is selected, the signal is sent from the processor portion to the tuner 23. The selected channel is produced and the overall picture displays the selected channel.

Also, in the same manner as above, by pressing the menu switch 128 of the remote control unit 1, the immediately preceding screen is produced, i.e., in this case, the BS menu 231 of FIG. 14 is obtained, and again pressing the menu switch 128 the opening menu 220 is returned.

At the opening menu 220 indicated in FIG. 6, when the LD player mode is selected, the LD player menu 232 indicated in FIG. 15 is produced and power is supplied to the LD player 32. In the same manner as the above VTR playback menu 228, the screen is divided into a plurality of sub-screens formed into icons indicating LD player operation. When an icon is selected, the command indicated by the icon is sent by the processor 24 to the LD player 32.

When the playback icon is selected, the LD player 12 enters the playback mode and the LD player 12 playback picture is displayed on the full screen of the display 10.

In the same manner as above, by pressing the menu switch 128 of the remote control unit 1, the immediately preceding screen is returned, i.e., in this case, the LD player menu 232 is obtained. Again pressing the menu switch 128 returns the opening menu 220. The power supply to the LD player 32 is then turned OFF.

In the above embodiment, transmission of the signal is by means of light. Transmission may alternatively be performed by electric waves, ultrasonic waves, etc., or by means of a cable connecting the remote control unit and the controlled unit.

Embodiment 2

In the remote control system described above, it is necessary to control movement of the cursor, which is different from the control performed when using a mouse. The problem is that the remote control unit cannot be used in conjunction with a controlled unit of a multimedia system designed to operate with a mouse. The embodiments described below overcome this problem, as well as other which will be apparent from the description.

Figure 16:
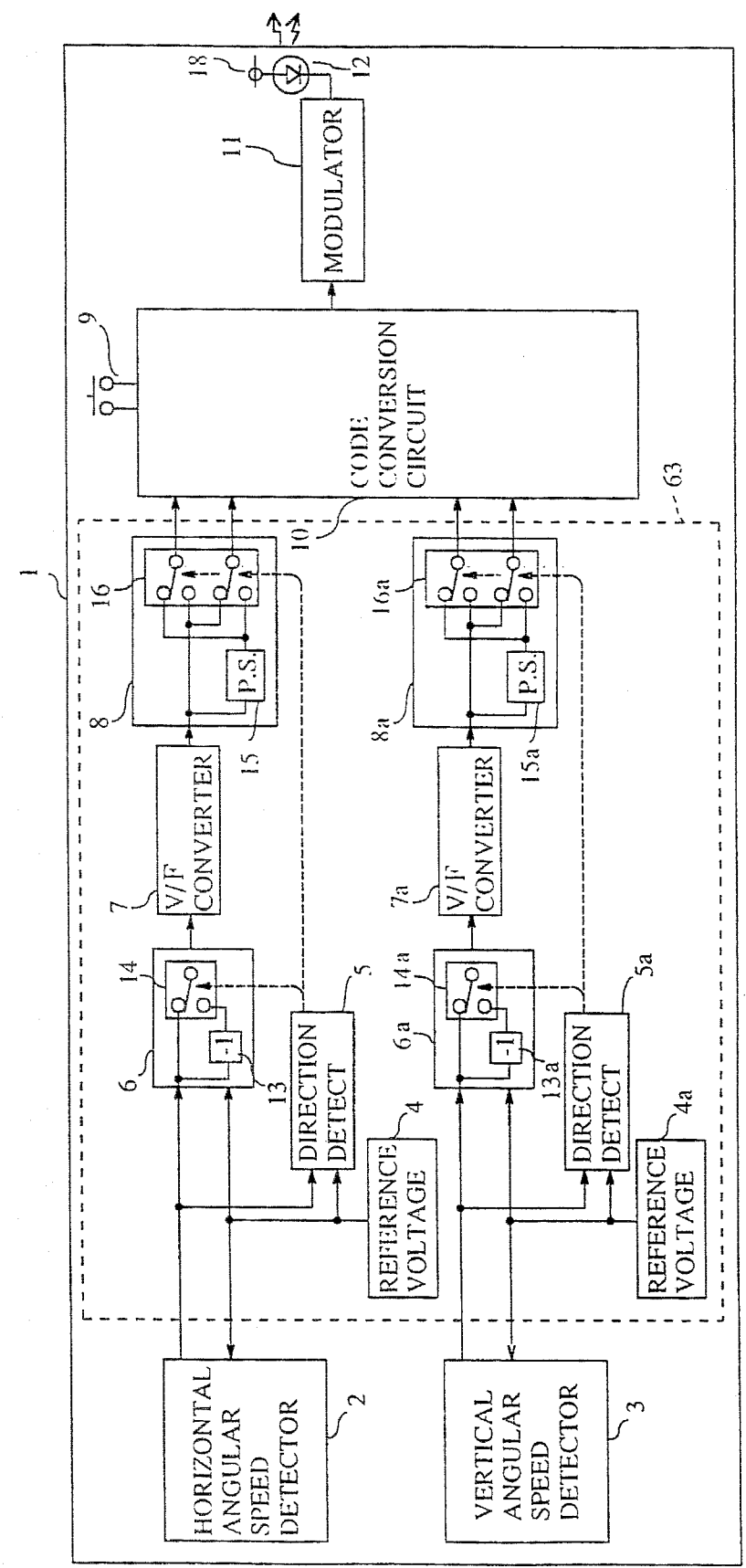
FIG. 16 is a block diagram showing a remote control unit of Embodiment 2.
Figure 17:
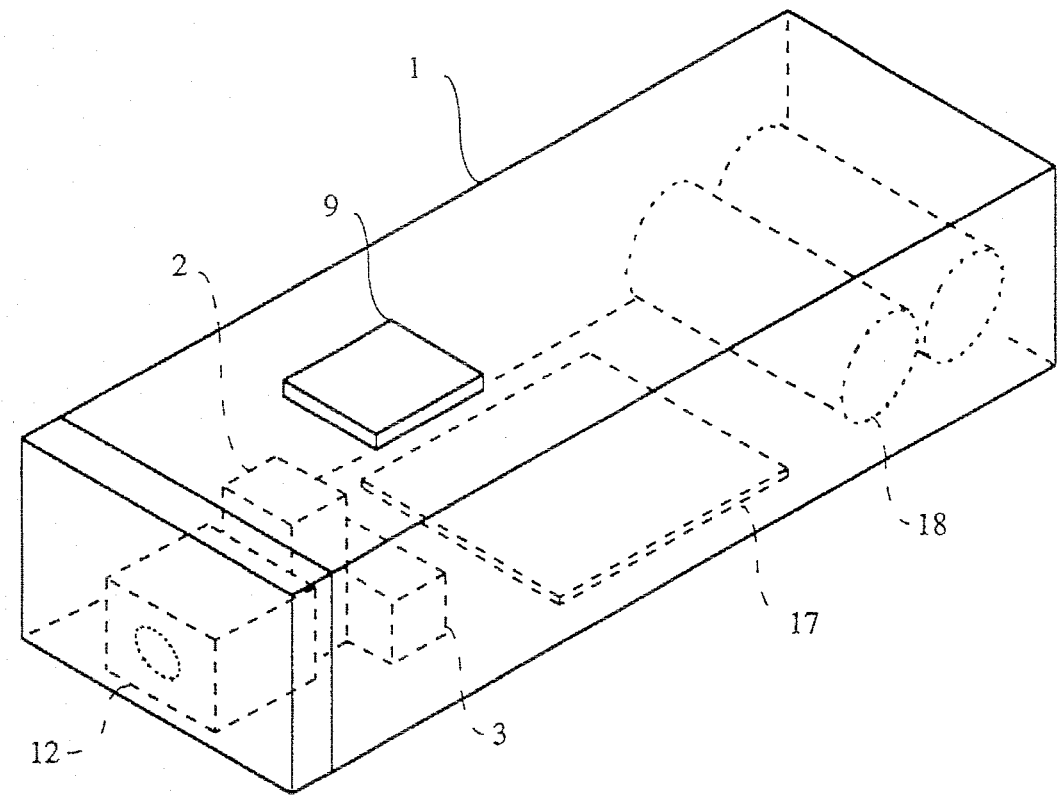
FIG. 17 is a perspective view showing a remote control system of Embodiment 2.

FIG. 16 and FIG. 17 are a block diagram and a perspective view of a remote control unit according to Embodiment 2. In these drawings, reference numerals identical to those in FIG. 1 and FIG. 2 designate identical or corresponding elements. Reference voltage generators 4 and 4a provide voltages equal to the voltages produced by the angular speed detectors 2 and 3, respectively, when they are stationary. The output voltages of the angular velocity detectors produced when the angular velocity detectors are stationary is one half the power supply voltage, and hence the reference voltages are normally set at one half the power supply voltage. Angular speed direction-detecting circuits 5 and 5a comprise a comparator, that detects whether the direction of a change in orientation (rotation) of the remote control unit 1 is forward or reverse. Absolute value detection circuits 6 and 6a receive the output voltages of the angular speed detectors 2 and 3 and produce voltages proportional to the absolute values (magnitudes of the differences of the outputs of the angular speed detectors 2 and 3 from the reference voltages. The absolute value detection circuits 6 and 6a comprise inverting circuits 13 and 13a and switching circuits 14 and 14a.

Voltage-frequency (V/F) conversion circuits 7 and 7a convert the output voltages of the angular speed absolute value detection circuits 6 and 6a into sequences of pulses of frequencies corresponding thereto. Signal processing circuits 8 and 8a receive the sequences of pulses output by the V/F converter circuits 7 and 7a and the outputs of the angular speed direction detection circuits 5 and 5a. The signal processing circuits 8 and 8a produce sequences of pulses equivalent to a pair of sequences of pulses produced by rotary encoders of a mouse and which have a phase dependent on the direction of rotation of the roller of a mouse. The signal processing circuits 8 and 8a comprise phase shifting circuits 15 and 15a, and switching circuits 16 and 16a.

The phase shifting circuits 15 and 15a receive the sequences of pulses from the V/F converters 7 and 7a, and produce second sequences of pulses having a predetermined phase difference with respect to the sequences of pulses from the V/F converters 7 and 7a. For the purpose of distinction, the output of the V/F converters 7 and 7a are called "first sequences of pulses." Each of the switching circuits 16 and 16a selectively assumes a first position in which it produces the first and second sequences of pulses as third and fourth sequences of pulses, and a second position in which it produces the first and second sequences of pulses as fourth and third sequences of pulses. The third and fourth sequences of pulses are equivalent to a pair of sequences of pulses produced by a mouse.

A code conversion circuit 10 receives the sequences of pulses from the signal processing circuits 8 and 8a and the signal from the selection switch 9 and converts the pulses into codes of a format suitable for input to the control processor 324; the control processor 324 being of the type operable in combination with a mouse 103 to move the cursor and select an icon. A modulator 11 modulates the output of the signal conversion circuit 10 into signal suitable for transmission by the signal transmitter 12. The above-described circuits 4 through 11 in combination form a signal processor 17.

Figure 18:
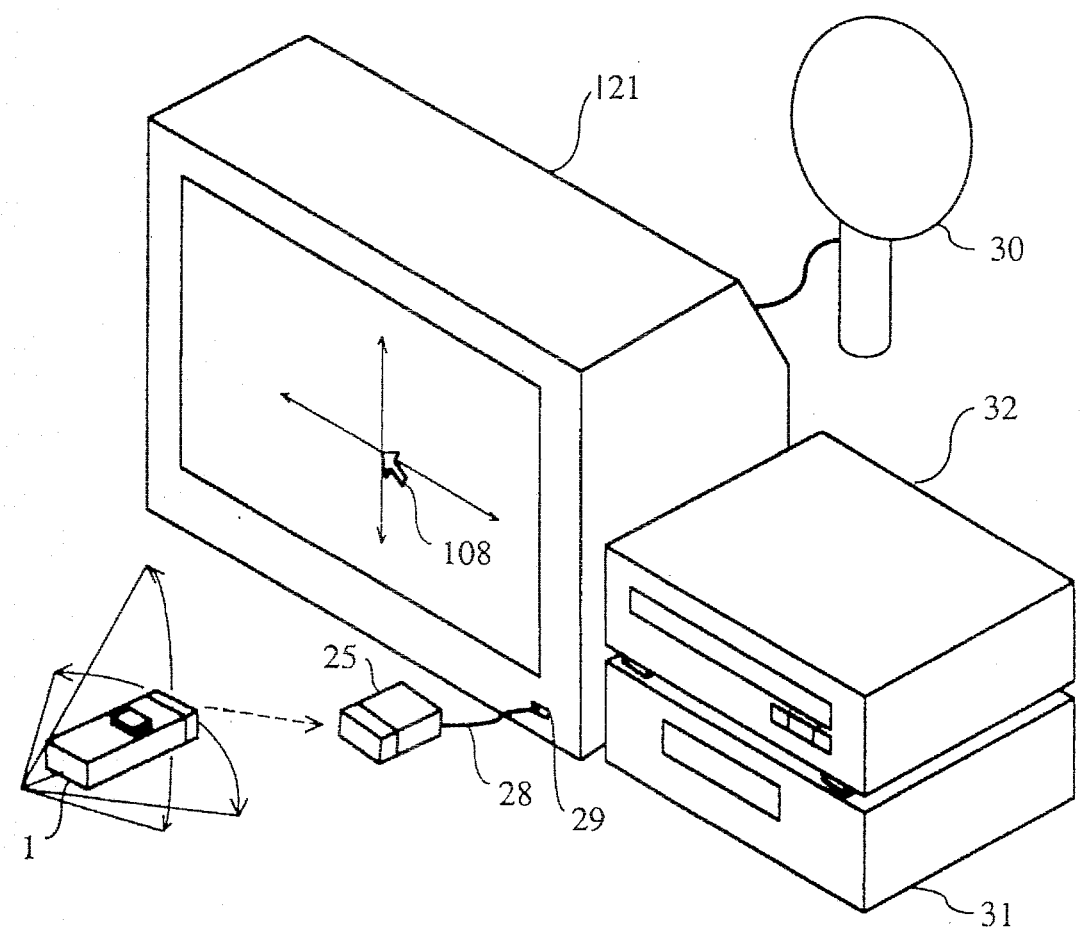
FIG. 18 is a perspective view showing a remote control system of Embodiment 2.
Figure 19:
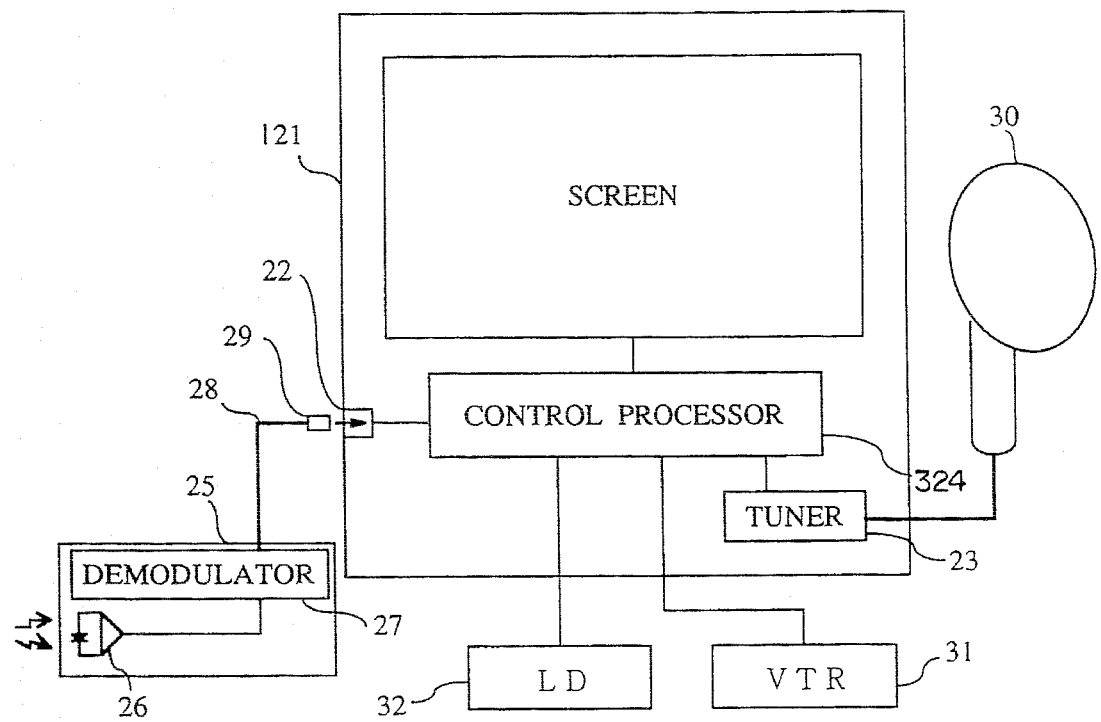
FIG. 19 is a block diagram showing a controlled unit of Embodiment 2.

FIG. 18 is a perspective view showing a remote control system, and FIG. 19 is a block diagram showing the controlled unit. A receiving unit is added to the controlled unit. In these drawings, reference numerals identical to those in FIG. 3 and FIG. 4 designate identical or corresponding members. In these drawings, the menus similar to that shown in FIG. 5 are displayed. The display device 100 is provided with a mouse connection terminal 22, and a control processor 24. If a mouse is connected to the mouse connection terminal 22, the display device 1001 can be controlled by use of the mouse. A receiving unit 25 includes a signal receiver 26 and a demodulator 27 for demodulating the signal detected by the signal receiver 26. A cable 28 and connector 29 couples the receiving unit 25 and the control processor 324.

The following is a description of the operation of the present invention. When angular motion in space toward the front, back, left or right is imparted to the remote control unit 1, the outputs of horizontal and vertical angular speed detectors 2 and 3, which use vibration gyroscopes, vary, in accordance with the angular speed within a range of from one half of the power supply voltage to the full power supply voltage when the gyro rotates in the forward direction and vary from one half of the power supply voltage to 0 V when the gyro rotates in the reverse direction. In other words, the variation is centered on the value of one half of the power supply voltage, which is applied by the reference voltage sources 4 and 4a. The outputs of horizontal and vertical angular speed detectors 2 and 3 and of the reference voltage sources 4 and 4a are input to the angular speed detection circuits 5 and 5a. The angular speed detection circuits 5 and 5a detect the direction of angular motion of the remote control unit 1, and a control signal is then obtained.

Further, outputs of horizontal and vertical angular speed detectors 2 and 3 and of the reference voltage sources 4 and 4a are input to the angular speed absolute value detection circuits 6 and 6a, and inverted by the inverting circuits 13 and 13a. Outputs of the inverting circuits vary from one half of the power supply voltage to 0 V when the gyro rotates in the forward direction, and from one half of the power supply voltage to the full power supply voltage when the gyro rotates in the reverse direction. By switching between the outputs of the inverting circuits and the outputs of the horizontal and vertical angular Speed detectors 2 and 3 at the switching circuits 14 and 14a, in accordance with the control signals output by the direction detection circuits 5 and 5a, and absolute value output can be obtained. By applying the outputs of the switching circuits 14 and 14a to the V/F conversion circuits 7 and 7a, sequences of pulses can be obtained that have a frequency proportional to the absolute value of angular speed.

These sequences of pulses are then applied to the phase shifting circuits 15 and 15a and given a ¼-wavelength phase delay. The switching circuits 16 and 16a operate in accordance with the control signals output by the angular speed direction detection circuits 5 and 5a to perform the switching operation. The outputs of the switching circuits 16 and 16a are output as outputs of the signal processing circuits 8 and 8a. The outputs of the signal processing circuits 8 and 8a are converted at the code conversion circuit 10, in accordance with a format specified by the control processor 324 (of the type which can be operated by a mouse 103), into a code for moving the cursor and selecting an icon. The signal from the code conversion circuit 10 is modulated by the modulator 11, and transmitted by the signal transmitter 12 to the controlled unit 121.

The signal from the signal transmitter 12 is detected by the signal receiver 26 of the receiving unit 25, and demodulated in accordance with a format specified by the control processor 324 into a signal for moving the cursor and selecting an icon. This signal is input to the control processor 324 via the cable 28 and the connector 29. As a result, there is realized a remote control system in which, through (1) angular motion of remote control unit 1 in space toward the front, back, left or right to point toward the desired icon and (2) use of the selection switch 9, instructions can be issued and operation effected, enabling control of a controlled unit that can be controlled by a mouse.

Embodiment 3

Figure 20:
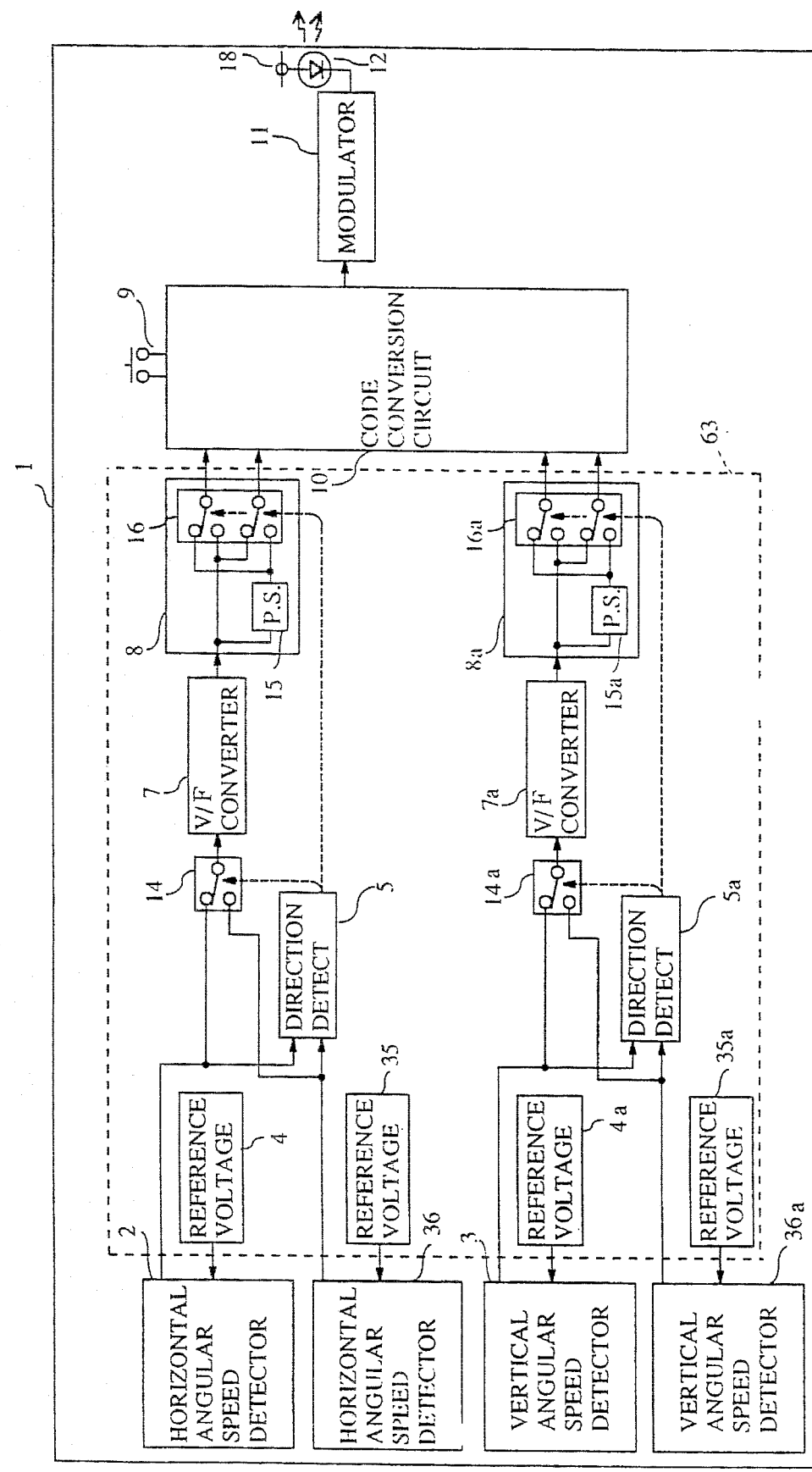
FIG. 20 is a block diagram showing a remote control unit of Embodiment 3.

In Embodiment 2 shown in FIG. 16, the absolute value detection circuit 6 comprises an inverting circuit 13 and a switching circuit 14. As an alternative, it is possible to provide, as shown in FIG. 20, reference voltage sources 35 and 35a applying a voltage equivalent to the reference voltage 4 of the reference voltage sources 4 and 4a. It is possible to further provide angular speed detectors 36 and 36a which are mounted in an orientation opposite to that of the angular speed detectors 2 and 3, which rotate the gyro forward or back in accordance with the angular speed within a range of from one half of the power supply voltage to 0 V when the gyro rotates in the forward direction and within a range of from one half of the power supply voltage to the power supply voltage when the gyro rotates in the reverse direction.

Embodiment 4

Figure 21:
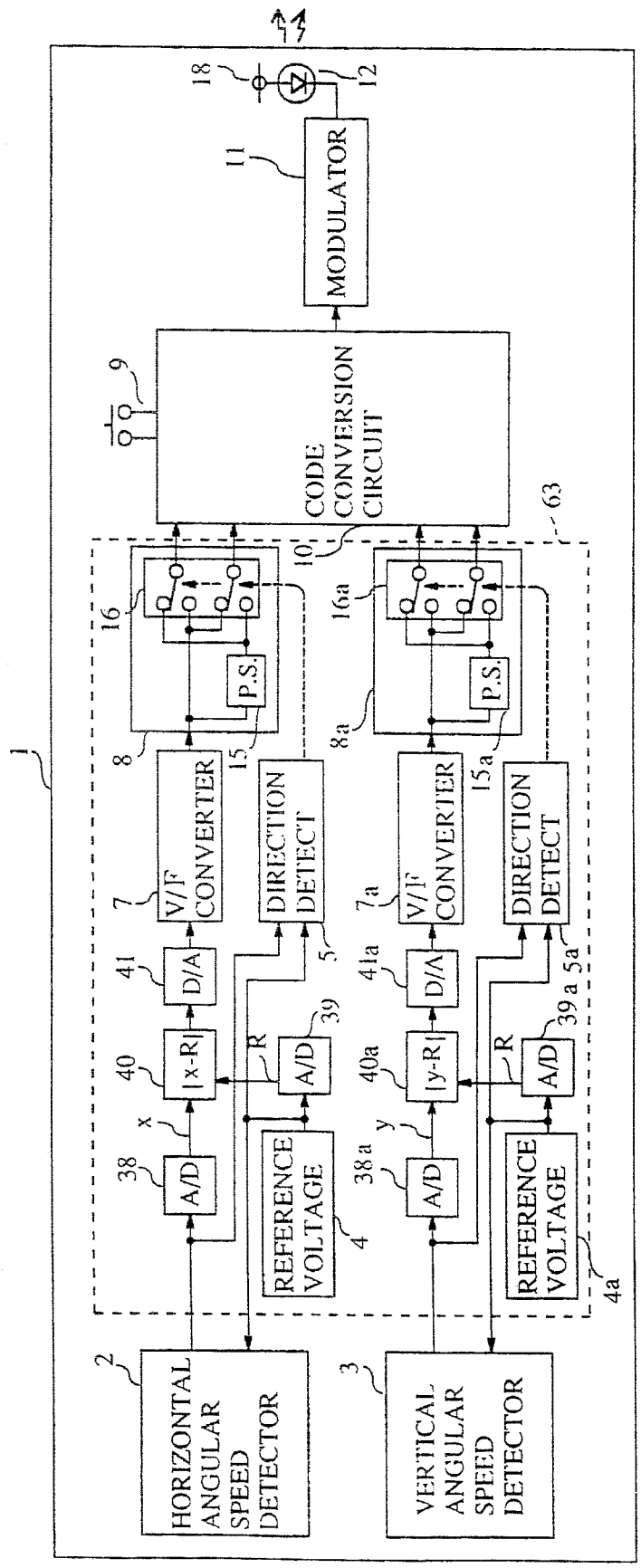
FIG. 21 is a block diagram showing a remote control unit of Embodiment 4.

It is also possible to provide, as shown in FIG. 21, A/D conversion circuits 39 and 39a to convert the outputs of the angular speed detectors 2 and 3 and the reference voltage of the reference voltage sources 4 and 4a into digital signals. And further provide absolute value detection circuits 40 and 40a which are formed of a program microcomputer, and which determine the absolute value by performing conversion in accordance with:

$$\{(x-R)^2\}^{1/2})$$

(where x and R are outputs of the A/D converters 38 and 39, or 38a and 39a, respectively). Also provided are D/A conversion circuits 41 and 41a to convert the outputs of the absolute value detection circuits 40 and 40a into analog signals.

Further, it is equally possible for all or part of the stages at the back of the A/D conversion circuits 38, 38a, 39 and 39a of the signal processor 17 to be formed of digital signal processing circuits, as shown in FIG. 21.

Further, although in the embodiment shown in FIG. 16 above described the signal processing circuit 8 is used to produce a signal equivalent to the output of the rotary encoder of the mouse and input the signal into the code conversion circuit 10, it is also possible to omit signal processing circuit 8, and input the output of the V/F conversion circuits 7 and 7a into the code conversion circuit 10 directly.

Embodiment 5

Figure 22:
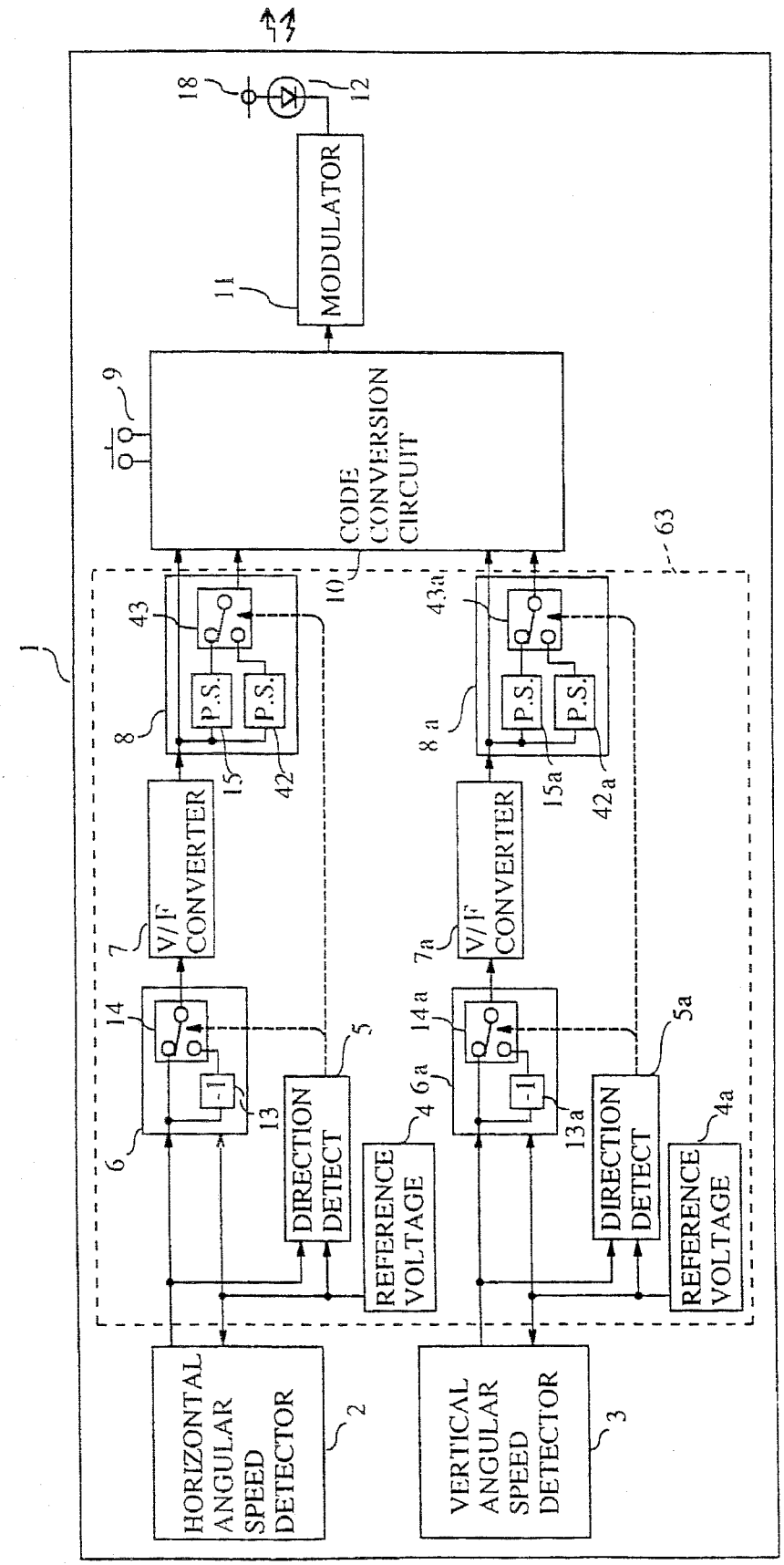
FIG. 22 is a block diagram showing an example of a remote control unit of Embodiment 5.
Figure 23:
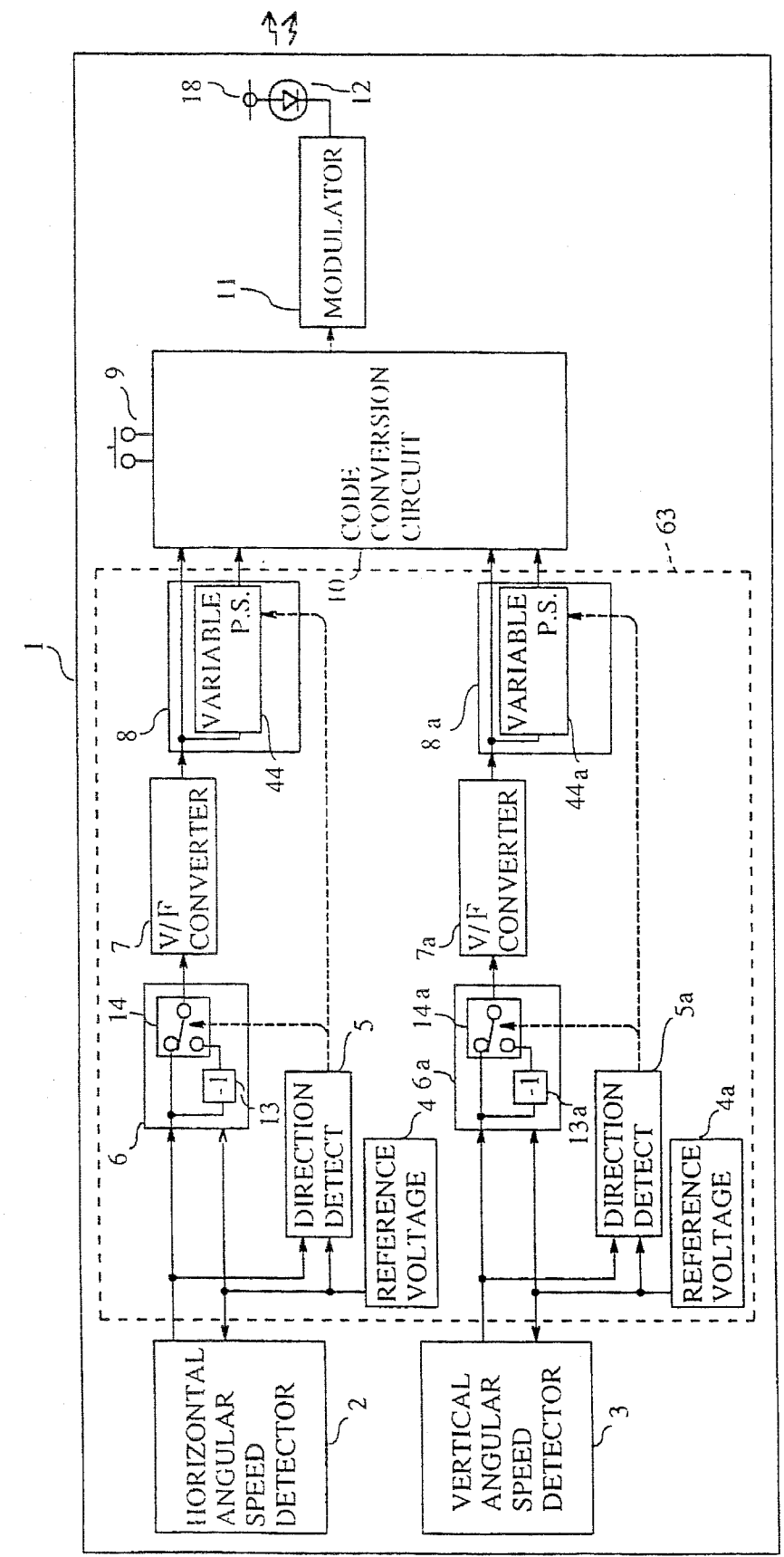
FIG. 23 is a block diagram showing another example of a remote control unit of Embodiment 5.

Further, instead of having the signal processing circuits 8 and 8a comprised of phase shifting circuits 15 and 15a and switching circuits 16 and 16a, it is also possible for them to comprise two phase shifting circuits 15 and 15a and 42 and 42a, as well as, switching circuits 43 and 43a, as shown in FIG. 22. Alternatively, the signal processing circuits 8 and 8a may include variable phase shifting circuits 44 and 44a as shown in FIG. 23.

Embodiment 6

Figure 24:
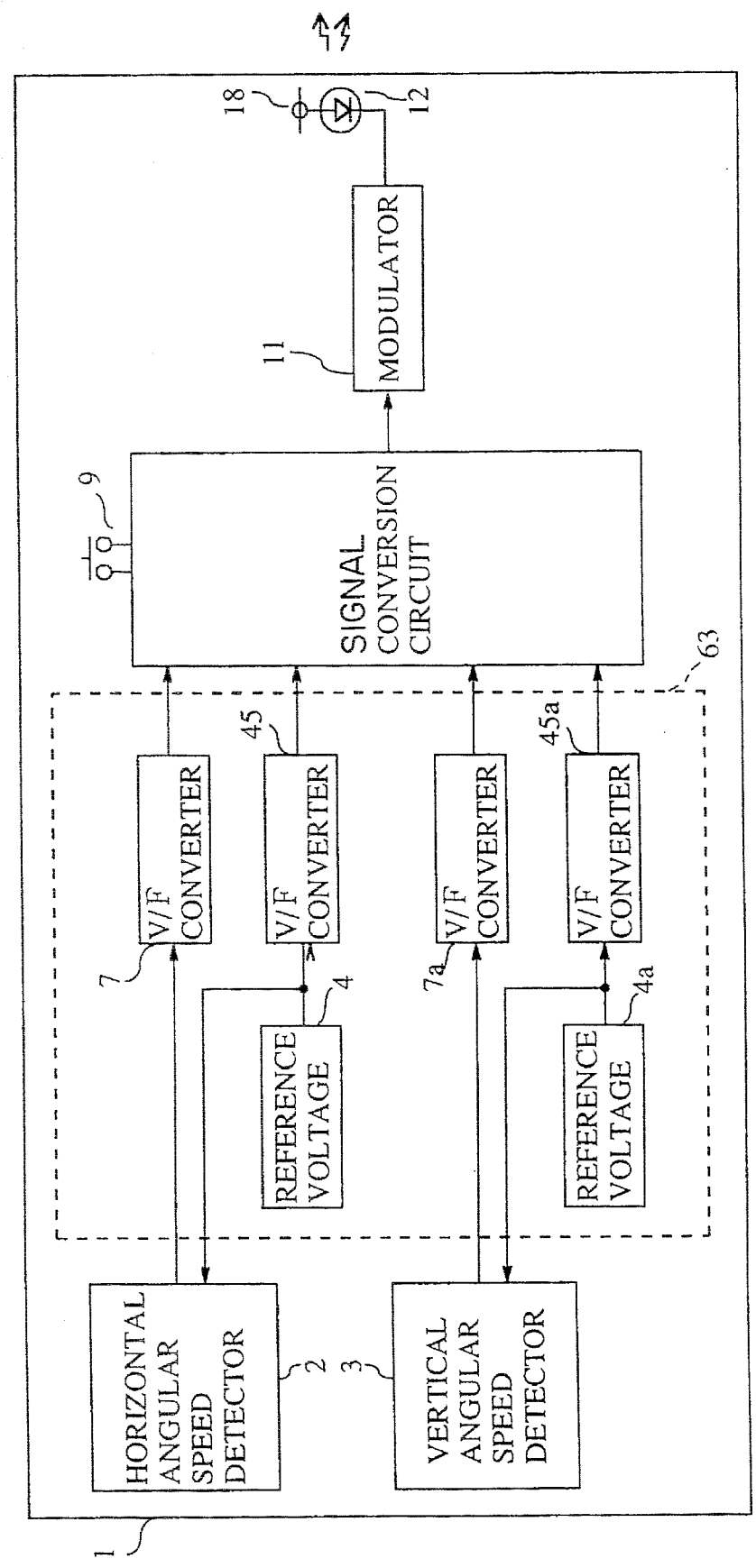
FIG. 24 is a block diagram showing a remote control unit of Embodiment 6.
Figure 25:
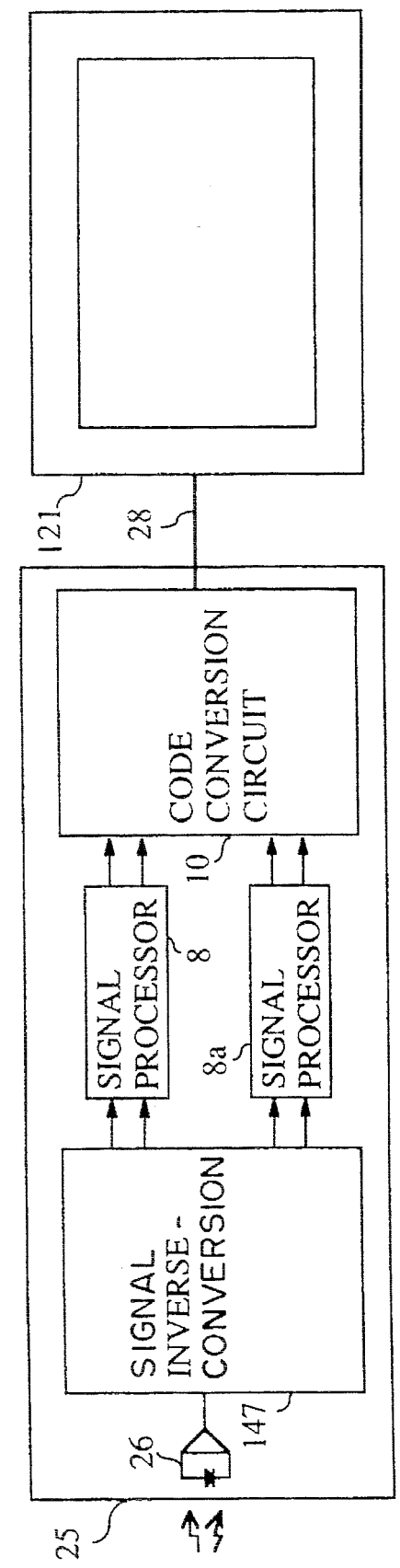
FIG. 25 is a block diagram showing a receiving unit of Embodiment 6.

In the embodiments described above, the outputs of the angular speed detectors 2 and 3 and the selection switch 9 can be converted at the remote control unit 1 according to a format of the control processor 24, into a signal for moving the cursor and selecting an icon. In this embodiment the conversion is performed at the receiving unit 25. Specifically, in FIG. 24, reference numerals 45 and 45a designate V/F conversion circuits that convert reference voltages of the reference voltage sources 4 and 4a into a frequency signal; and 46 designates a signal conversion circuit that converts the signals from the V/F conversion circuits 7, 7a, 45 and 45a and the selection switch 9 into signals that can be transmitted by the modulator 11. In the receiving unit 25 of the remote control system shown in FIG. 25, a reference numeral 147 designates a signal inverse-conversion circuit that inverse-converts the signal detected by the signal receiver 26 into sequences of pulses that were output from the V/F conversion circuits 7, 7a, 46 and 46a.

Embodiment 7

The above embodiment is associated with a problem that a shake of the hand holding the remote control unit 1 is incorporated into the movement of the cursor derived from the information on angular speed detected by the angular speed detecting means. The embodiment described below solves this problem.

Figure 26:
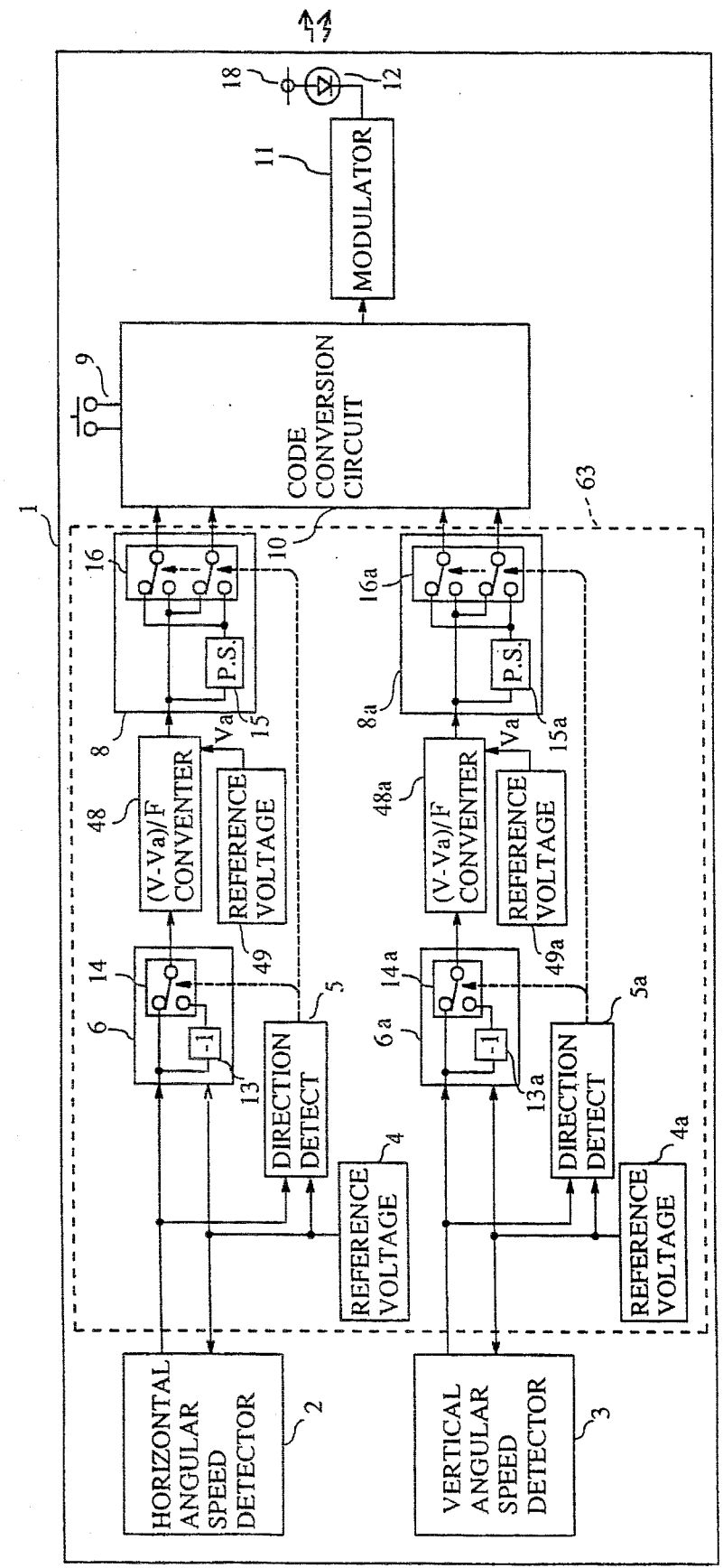
FIG. 26 is a block diagram showing an example of a remote control unit of Embodiment 7.

FIG. 26 shows Embodiment 7 of the present invention wherein reference numerals 48 and 48a designate a means for compensating for a shake of the hand by means of a (V-Va)/F conversion circuit. When the voltage input to the (V-Va)/F conversion circuits 48 and 48a is larger than the voltage Va applied by reference voltage sources 49 and 49a, the (V-Va)/F conversion circuits 48 and 48a output a sequence of pulses of a frequency in accordance with the magnitude of the voltage difference from voltage Va. A shake of a hand becomes most noticeable when the remote control unit 1 is stationary. A shake of a hand at this time can be alleviated by providing that no sequence of pulses is output when the output voltage of the absolute value detection circuits 6 and 6a is minute, but only when the output voltage rises above a certain value. Further, the (V-Va)/F conversion circuits 48 and 48a can easily be configured by setting the voltage input to a comparator since V/F conversion circuits 7 and 7a generally comprise comparators, oneshot multi-vibrator and an accurately switched current source. It is also possible to provide a subtractor or the like, in the stages at the back of the last stage of absolute value detection circuits 6 and 6a.

Figure 27:
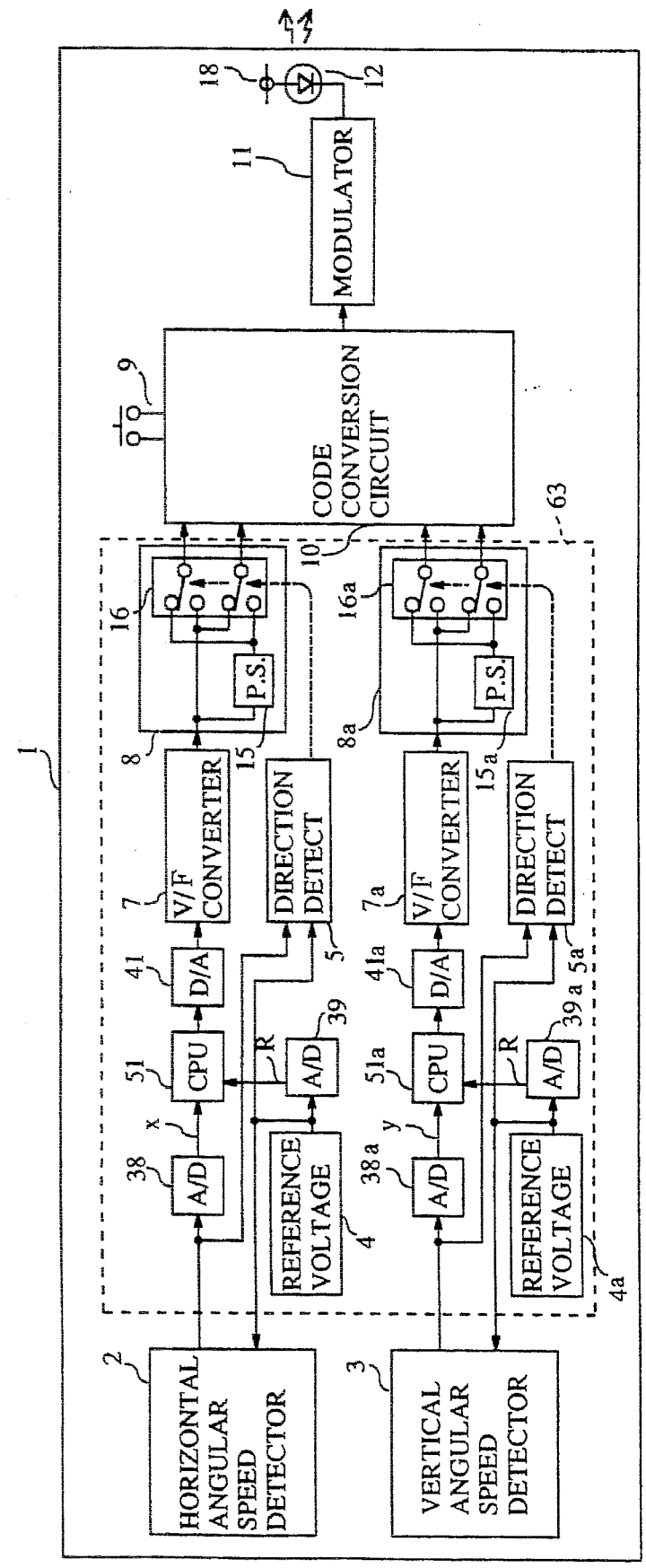
FIG. 27 is a block diagram showing another example of a remote control unit of Embodiment 7.

In the embodiment shown in FIG. 26, compensation for a shake of a hand is provided by replacing the V/F conversion circuits 7 and 7a with the (V-Va)/F conversion circuits 48 and 48a. Instead of (V-Va)/F conversion circuits 48 and 48a, FIG. 27 shows a means using CPUs 51 and 51a for compensating for a shake of a hand. The outputs of the horizontal and vertical angular speed detectors and the reference voltages of the reference voltage sources 4 and 4a are converted into digital signals at the A/D converters 38, 38a, 39 and 39a. The outputs of the A/D converters 38, 38a, 39 and 39a are input to the CPU 51. The algorithm for providing hand-shake compensation means at the CPU 51 may be similar to that for performing the function of the hand-shake compensation means of FIG. 26. The algorithm may alternatively be one for outputting only that angular speed information when it is found that the angular motion is in excess of a given amount in one direction within a given period of time. Another algorithm that may be used is to output the average of the angular speed information at regular time intervals. The output of the CPU 51 is converted by the D/A converters 41 and 41a into analog signals, which are then used to move the cursor; thereby eliminating the effects of a hand-shake.

Embodiment 8

The above embodiment is associated with a problem that because most display device screens are wider than they are high, the magnitude of the angle over which the remote control unit 1 must be rotated for moving the cursor through the entire height and the magnitude of the angle over which the remote control unit must be rotated for moving the cursor through the entire width are different. The following embodiment solves this problem.

Figure 28:
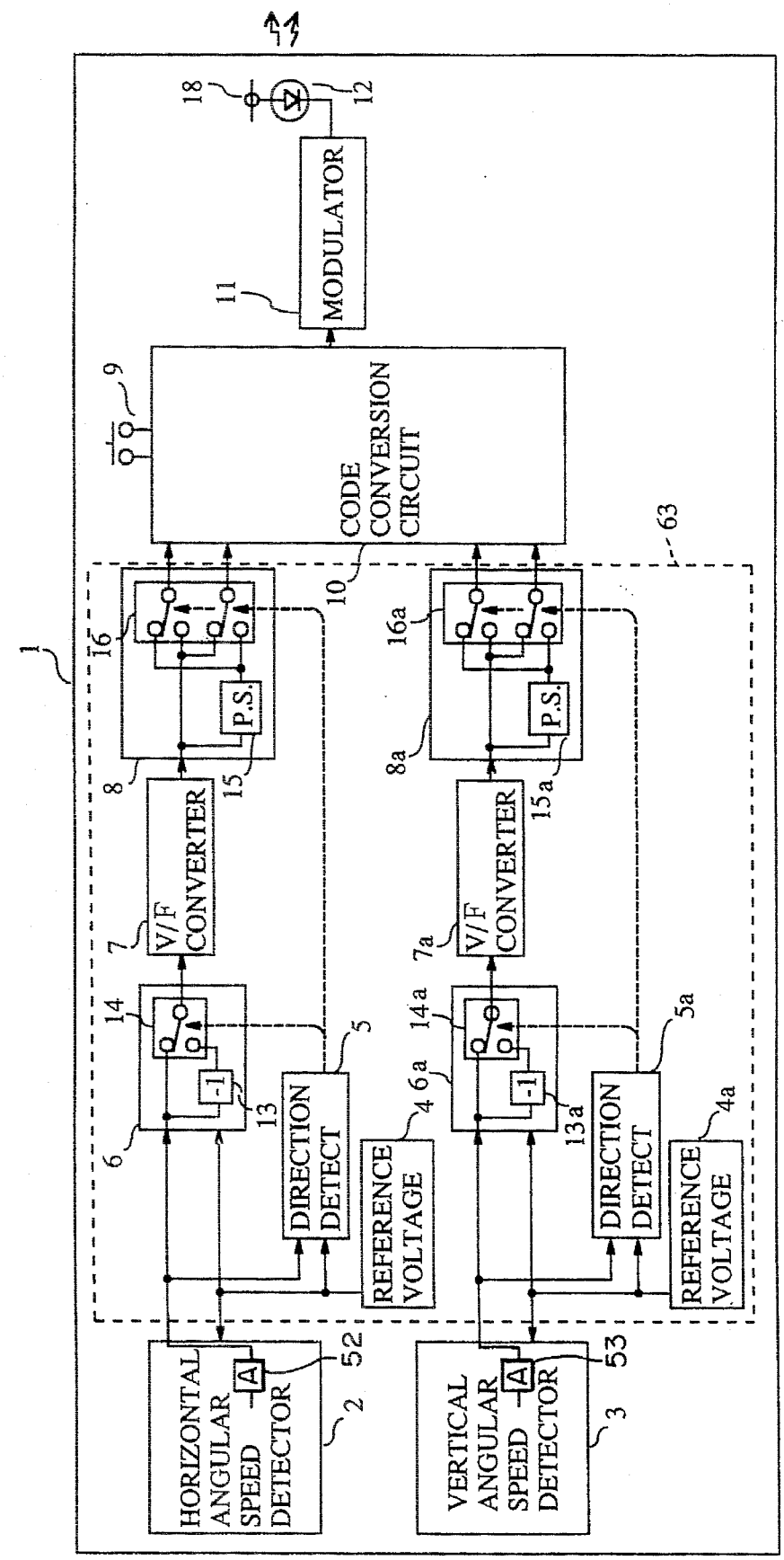
FIG. 28 is a block diagram showing a remote control unit of Embodiment 8.

FIG. 28 shows Embodiment 8 of the present invention, wherein reference numerals 52 and 53 designate the amplifiers in the stages at the back of the horizontal and vertical angular speed detectors 2 and 3. Since the screen of the display device 21 is normally wider than it is high, it is possible, using the amplifiers 52 and 53, to make the horizontal angle-position conversion constant for the pointing of the remote control unit 1 larger than the vertical angle-position conversion constant; thereby obtaining a natural sensation for the angular motion in the horizontal and vertical directions and movement of the cursor 68 relating to the horizontal and vertical movements. Further, although in the example given, the amplifiers 52 and 53 have been added, it is also possible, provided the horizontal angle-position conversion constant of the remote control unit 1 is made larger than the vertical angle-position constant, to obtain a similar effect, for example, by making the conversion constant of the V/F conversion circuit 6 larger than that of the V/F conversion circuit 6a.

Embodiment 9

The above embodiment is associated with a problem that, in moving the cursor in accordance with the angular speed information detected by the angular speed detection means of the remote control unit, the cursor moves in proportion to the change in the angle of the remote control unit. The position on a flat display device, however, is not proportional to the change in angle of the remote control unit, resulting in a positional discrepancy between the position on the screen at which the remote control unit is directed and the position of the cursor after movement. This causes an unnatural sensation in the positioning operation. The following embodiment solves this problem.

Figure 29:
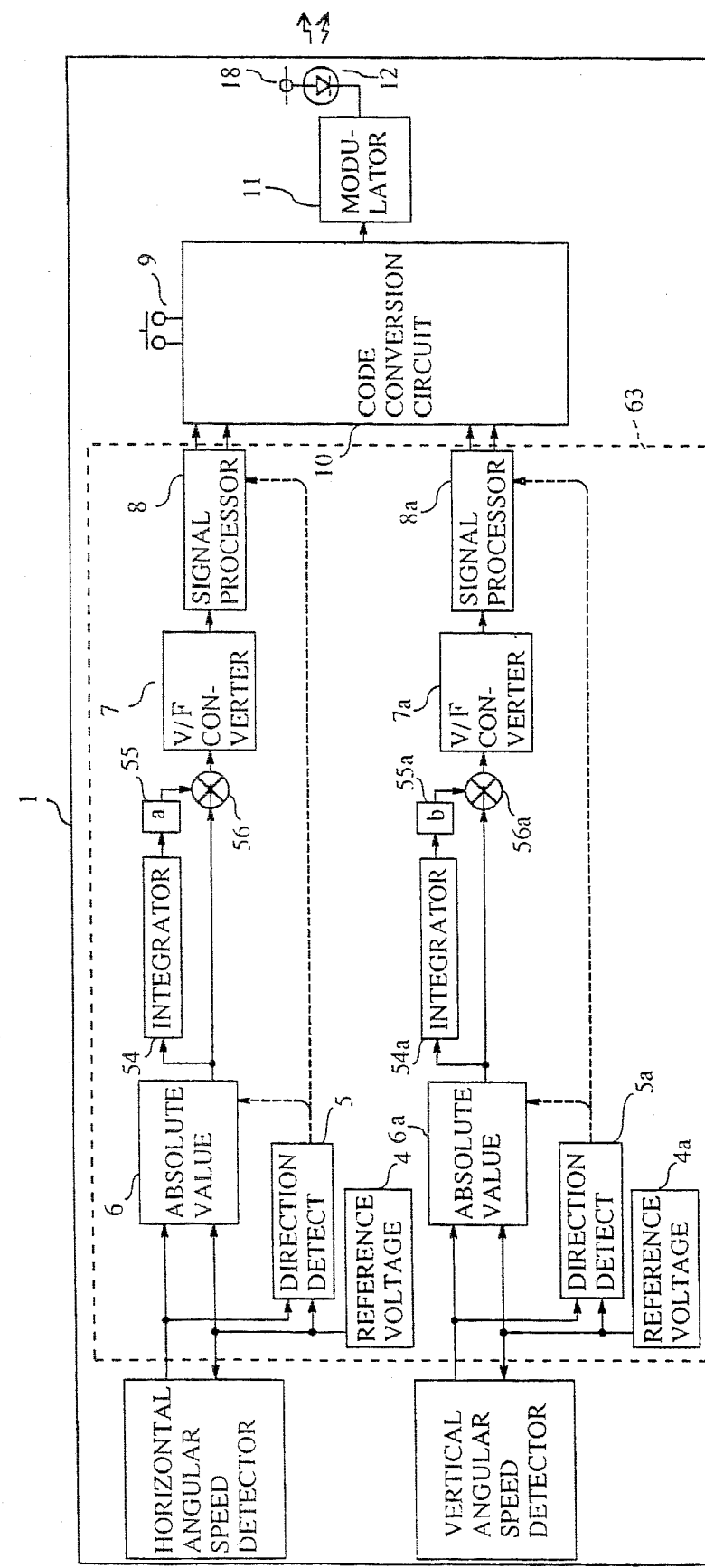
FIG. 29 is a block diagram showing a remote control unit of Embodiment 9.
Figure 30:
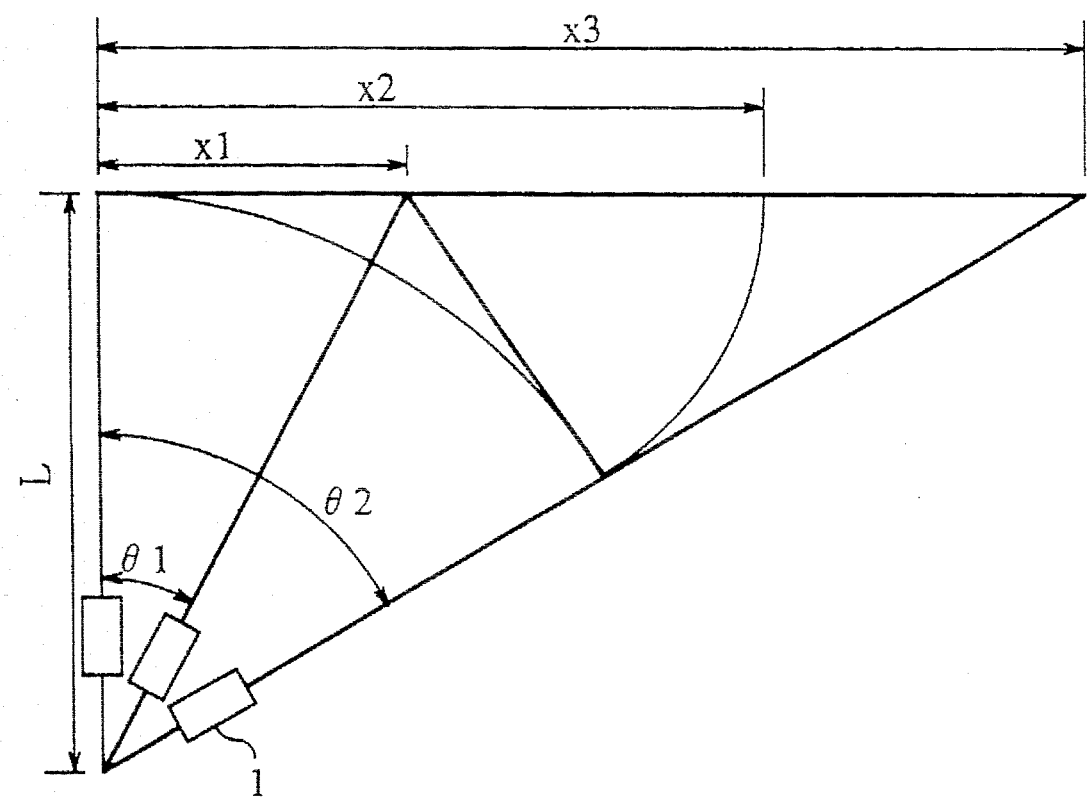
FIG. 30 is a diagram showing the relationship between the amount of angular motion and the amount of cursor movement.

FIG. 29 shows Embodiment 9 of the present invention, wherein reference numerals 54 and 54a designate integrators; 55 and 55a designate amplifiers and 56 and 56a designate multipliers. FIG. 30 shows an example of the relationship between the amount of angular motion of the remote control unit 1 and the amount of cursor movement wherein, x1 is the amount of the cursor movement by angle Θ1, x2 is the amount of the cursor movement by angle Θ2, and x3 is the amount of movement to the point to which the remote control unit is pointing after a change in orientation of Θ2. These are related with the distance L of the remote control unit to the display device by the following equations:

$x1=1\text{-}tan\Theta 1$ $x2=2\times 1=2L\text{-}tan\Theta 1$ $X3=L\text{-}tan\Theta 2$ When, for example in FIG. 30, Θ1 is 30°, $X2\colon X3=\frac{2}{3}\colon 1$ Thus it can be seen that though it was intended to point to position x3 from x1, the movement that occurred was only to position x2, or ⅔ of that amount.

Accordingly, as shown in FIG. 29, by (1) multiplying, at the multiplier 56, the angular speed information from the absolute value detection circuit 6 with the angle information obtained by integrating the angular speed information by means of the integrator 54, and (2) by arranging that when the cumulative amount of angular motion increases, the amount of cursor movement relative to the amount of angular motion will increase, it is possible to obtain a natural sensation for the angular motion of the orientation of the remote control unit 1 and for the movement of cursor. If, however, a variable gain amplifier whose gain varies in proportion to tane to the angular motion of 8, is used, x2 and x3 in FIG. 30 are kept equal to each other, and the effect of more natural movement will obviously be obtained. Further, although in this embodiment the means of varying the angle-position conversion constant is provided by processing the signal from the remote control unit 1, it is also possible for it to be provided by the receiving unit 25 of the remote control unit or by control processor 24. Specifically, in the event that it is provided by the control processor 24, it is possible to vary the angle-to-position conversion coefficient in accordance with the position on the screen at which the cursor movement begins.

Embodiment 10

The above embodiment is associated with a problem that, once the power to the remotely controlled unit is turned on, operation can be effected simply by moving the cursor displayed on the display device screen and by the selection switch for selecting icons; whereas, because of additional buttons, such as that for turning on the power, the number of switches on the remote control unit is increased.

By employing an arrangement in which activating the selection switch 9, when power to the remotely controlled unit is in the standby state, initiates supply of power to the remotely controlled unit, causing the opening menu to appear on the screen of display device 21 or 121, it is possible to eliminate power supply switch 127, limited-directivity photo-emitter 122 and limited-directivity photo-detector 132 of the present invention shown in FIG. 2 and FIG. 3.

Embodiment 11

The above embodiment is associated with a problem that, during the period in which power to the remote control unit is turned on, the cursor moves whenever the orientation of the remote control unit is changed. Thus, the cursor moves even in response to actions such as laying down the remote control unit that are not intended to effect cursor movement. As a result it is necessary to check the position of the cursor at which it is displayed on the display device screen before starting to move the cursor. The embodiment described below solves this problem.

Figure 31:
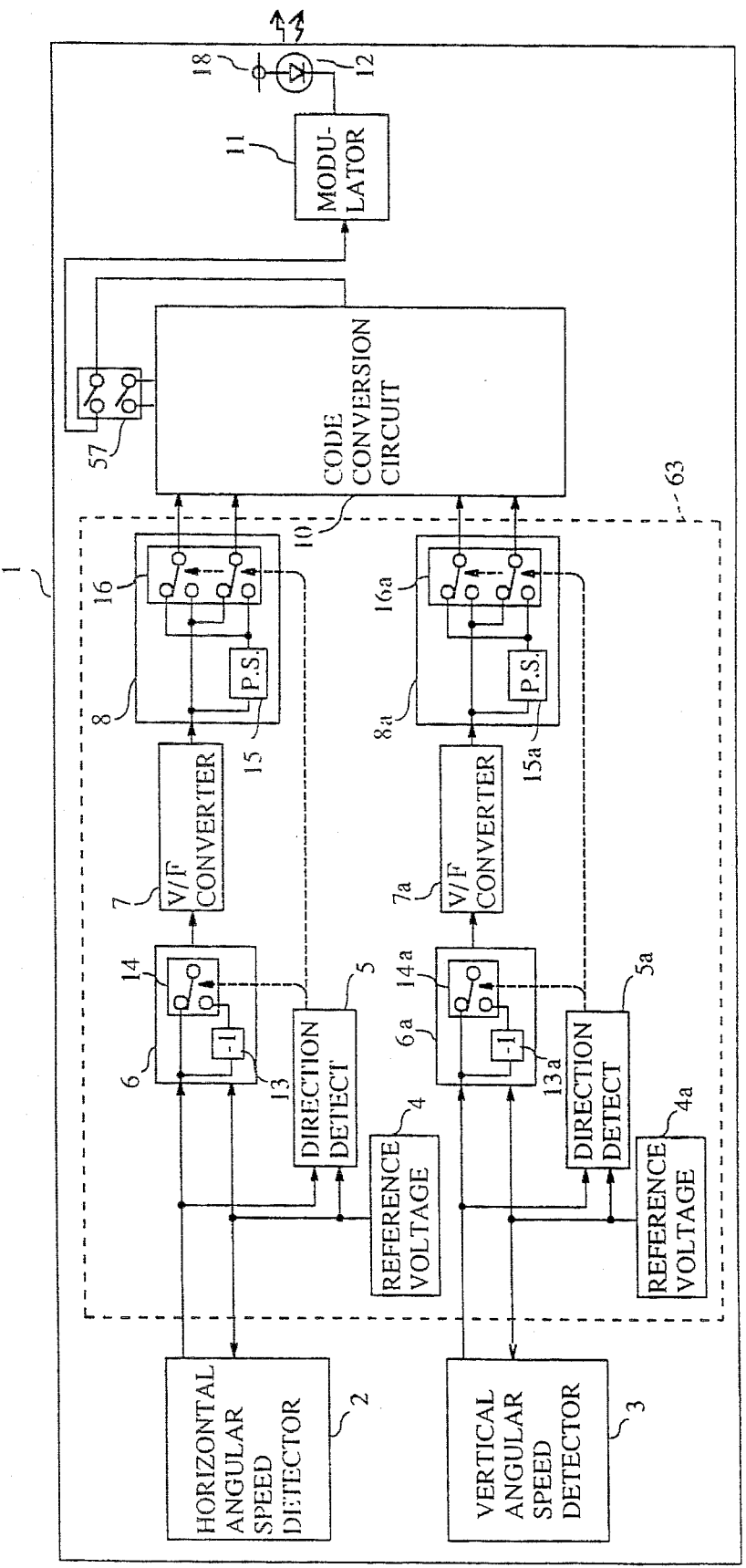
FIG. 31 is a block diagram showing a remote control unit of Embodiment 11.

FIG. 31 shows Embodiment 11 of the present invention wherein a reference numeral 57 designates a two-stage selection switch (double action tact switch) which, when its first-stage switch (first push) is pressed, makes it possible to move cursor 68 in accordance with a change in orientation of the remote control unit 1. When the two-stage selection switch's second stage is pressed, the icon 67 indicated by cursor 108 is selected. This makes it possible to eliminate power supply switch 127 of the present invention shown in FIG. 2. Without the above described arrangement, a power switch may be required to turn off the power supply when it is desired to avoid movement of the cursor when, for instance, the remote control unit is placed on a table. Although in this embodiment the signal to the modulator 11 is passed when the first-stage switch is pressed, it is also possible to effect control in such a way that no output is produced by the absolute value detection circuits 6 and 6a, V/F conversion circuits 7 and 7a, etc. Further, it will be preferable for the two-stage selection switch 57 to produce a click at the first and second stages to allow its operation to be confirmed.

Embodiment 12

The above embodiment is associated with a problem that power to the remote control unit is turned on continuously during operation, increasing the consumption of electric power. The embodiment described below solves this problem.

Figure 32:
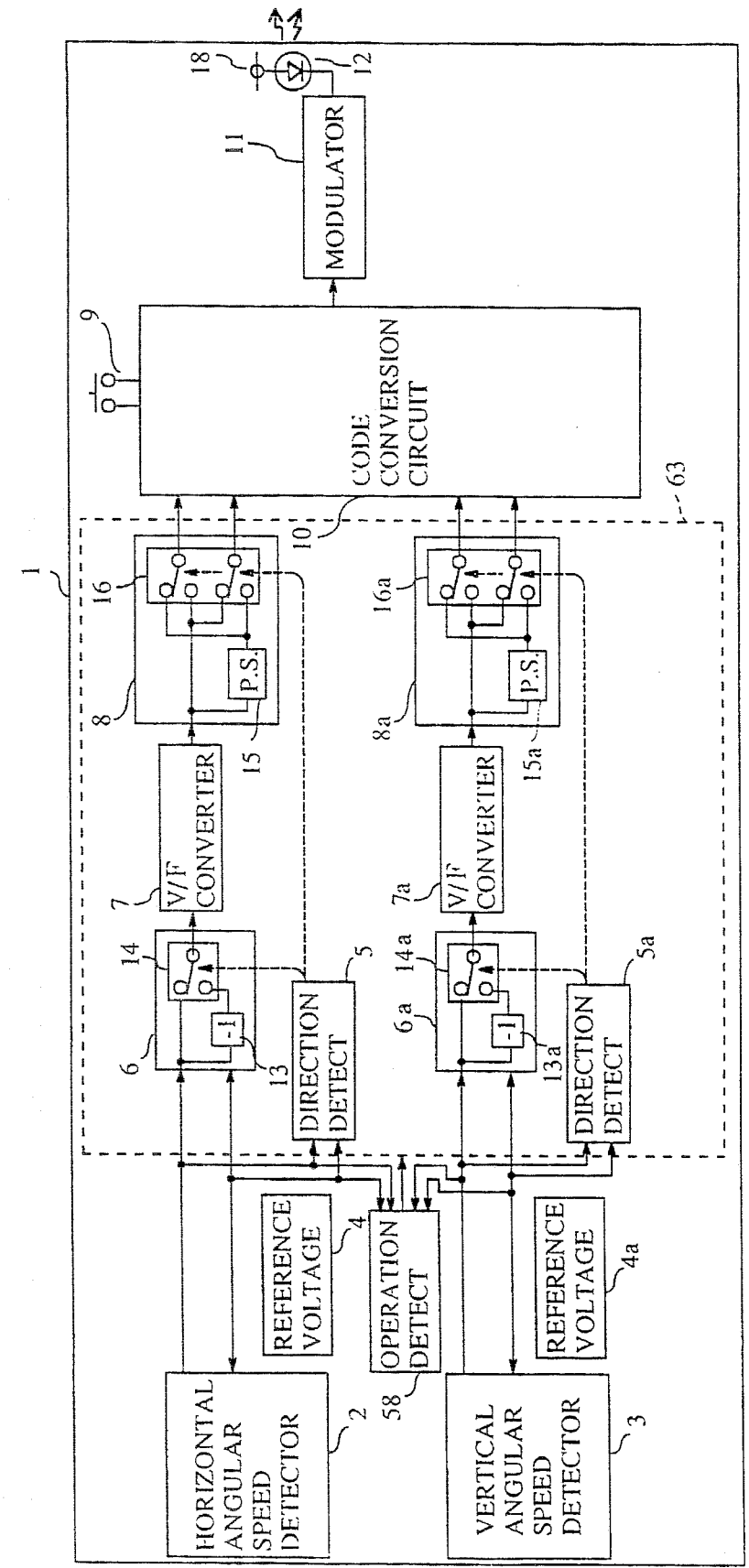
FIG. 32 is a block diagram showing a remote control unit of Embodiment 12.

FIG. 32 shows another embodiment of the invention. In the figure, reference numeral 58 designates an operation state detecting circuit for producing a control signal indicative of whether the angular speed of the remote control unit is more than a predetermined threshold value (small value). This control signal is used for on-off control over power supply to a circuitry 63. When the angular speed of the angular motion of the remote control unit is equal to or greater than the predetermined threshold value, power is supplied to the circuitry 63 and the remote control unit is partially or entirely energized. When the angular speed is less than the threshold value, the power supply to the circuitry 63 is terminated. In this way, power consumption can be reduced.

Embodiment 13

Figure 33:
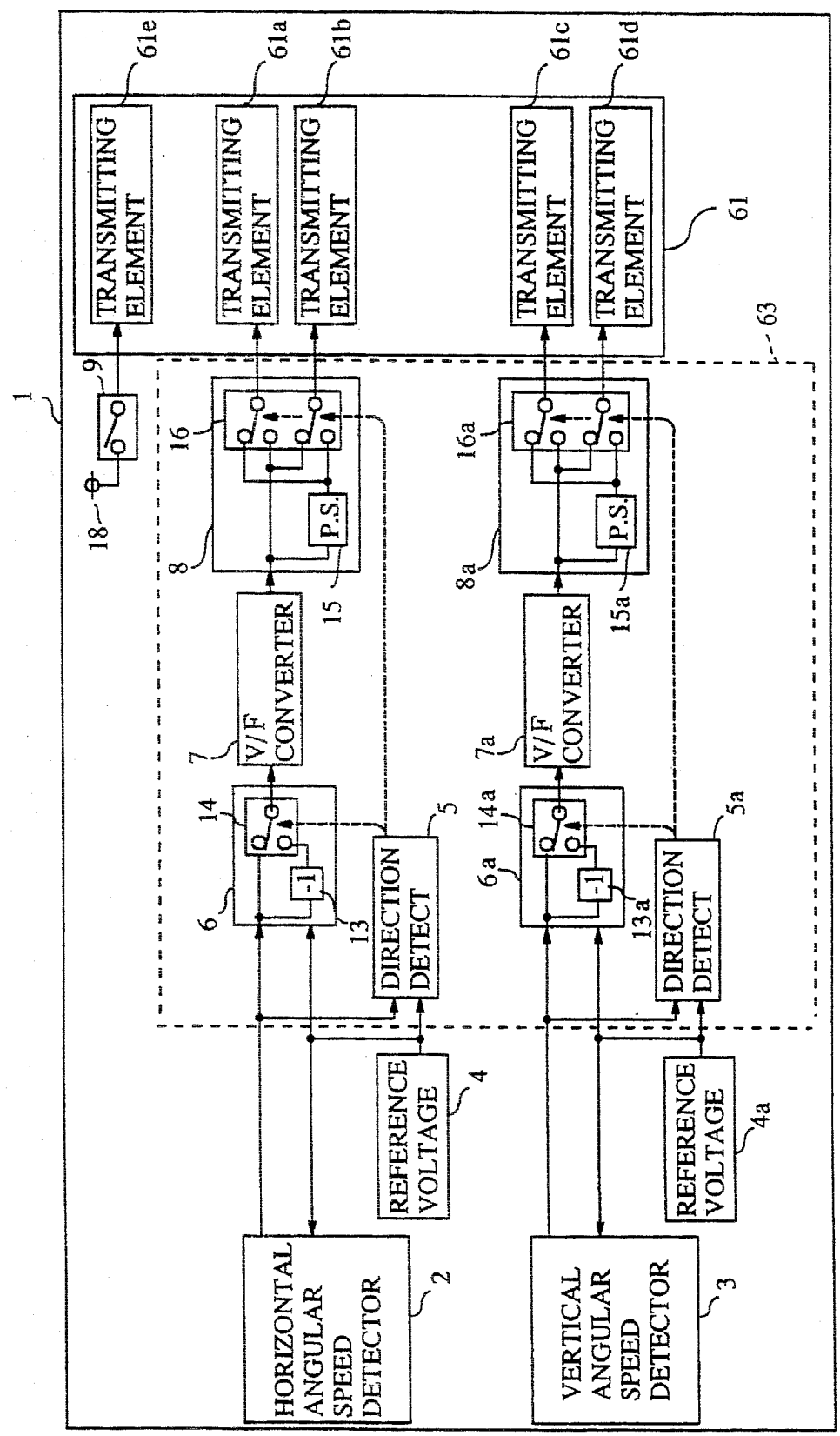
FIG. 33 is a block diagram showing a remote control unit of Embodiment 13.
Figure 34:
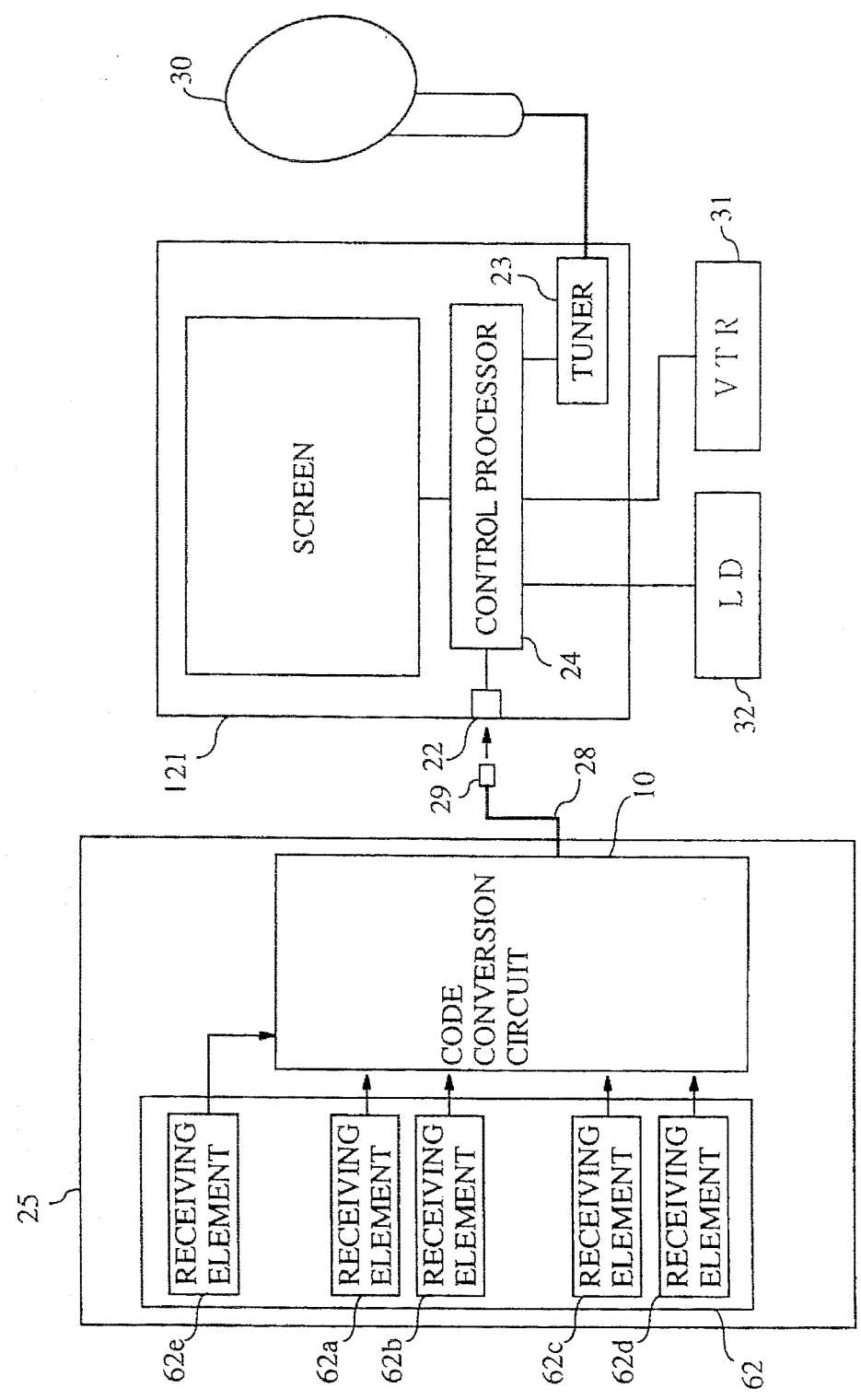
FIG. 34 is a block diagram showing a remote control unit of Embodiment 13.
Figure 35:
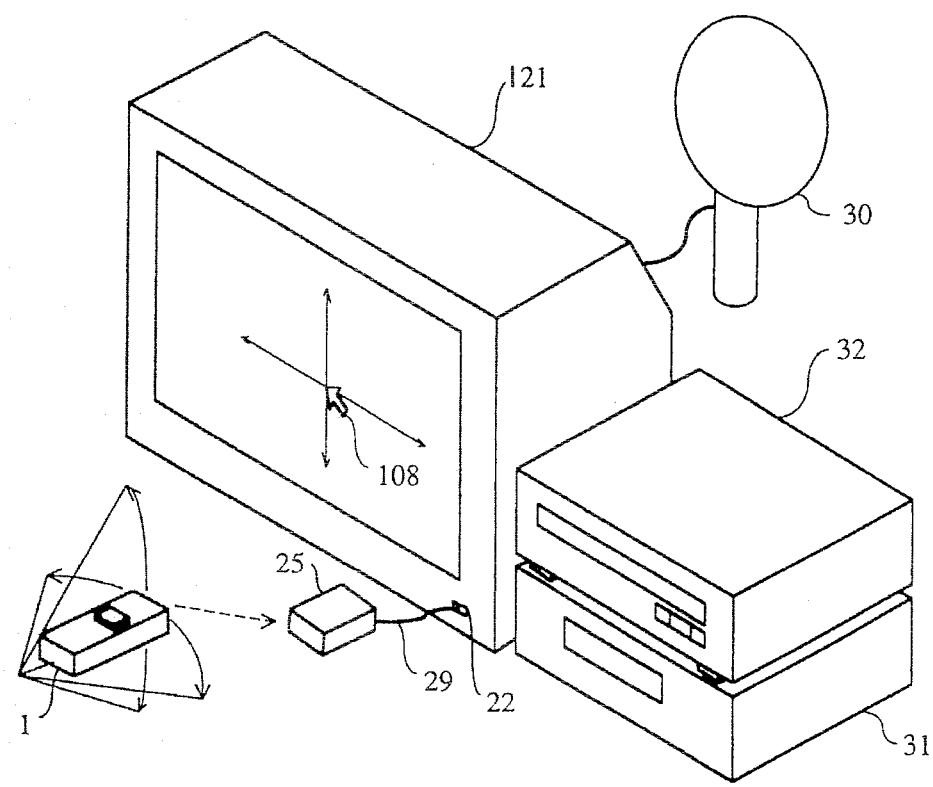
FIG. 35 is a perspective view showing a remote control system of Embodiment 13.
Figure 36:
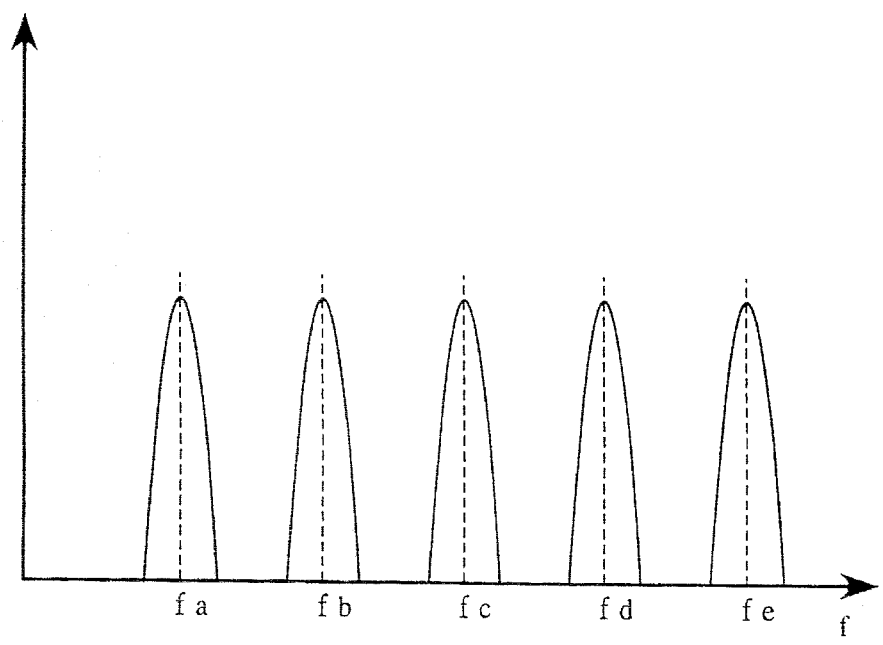
FIG. 36 is a diagram showing the frequencies used for transmission by the transmitter of Embodiment 13.

FIG. 33 is a block diagram showing the remote control unit according to Embodiment 13 of the present invention; FIG. 34 is a block diagram showing the remotely controlled unit; and FIG. 35 is a perspective view showing the remote control system. In these drawings, reference numerals identical to those of the previously described embodiments designate identical or corresponding members. A reference numeral 61 designates a transmitter that modulates, e.g., amplitude-modulates, and transmits in parallel a plurality of signals from the signal processing circuits 8 and 8a and the selection switch 9. The transmitter 61 includes transmitting elements 61a through 61e. These transmitting elements 61a through 61e, respectively, transmit radio waves of individually different frequencies fa through fe, as shown, for example, in FIG. 36. A reference numeral 63 designates a signal conversion means that converts the output of the horizontal and vertical angular speed detectors 2 and 3 into a sequence of pulses equivalent to the sequence of pulses generated by a rotary encoder, and, in the Embodiment 13, comprises direction detection circuits 5 and 5a, absolute value detection circuits 6 and 6a, V/F conversion circuits 7 and 7a, and signal processing circuits 8 and 8a.

In FIG. 34, a reference numeral 25 designates the receiving unit of a remote control system, and 62 designates a receiver that receives in parallel a plurality of signals. The receiver 62 includes receiving elements 62a through 62e. These receiving elements 62a through 62e, respectively, are so configured as to receive radio waves, ultrasonic waves or light beams of individually different frequencies fa through fe.

The following is a description of the operation of this Embodiment 13. When angular motion in space toward the front, back, left or right is imparted to the orientation of the remote control unit 1, the outputs of the horizontal and vertical angular speed detectors 2 and 3 are converted into sequences of pulses equivalent to the sequences of pulses generated by the rotary encoder by signal conversion means 63. This sequence of pulses and the signal from the selection switch 9 are transmitted in parallel by the transmitter 61.

The signal from the transmitter 61 is received by the receiver 25 and output as the sequence of pulses and the signal from the selection switch 9. This signal is input to code conversion circuit 10 and converted into code according to a format specified by the control processor 24, and is then input to the control processor 24. As a result, there is realized a remote control system in which, through angular motion of the remote control unit 1 in space toward the front, back, left or right of the desired icon and the use of the selection switch 9, instructions can be issued and operation effected, enabling control of a controlled unit that is designed primarily for control by a mouse.

In a remote control system configured in this way, it is possible to eliminate the modulator for modulating a plurality of the output signals of the code conversion circuit into a form suitable for transmission through a single signal transmitter 12, and the demodulator 27 that demodulates the received signal into a plurality of signals. Further, since the code conversion circuit 10 is located not in the remote control unit 1 but in the receiving unit 25, the code conversion circuit 10 may be formed to produce codes suitable for input to the particular control processor 24 to which the receiver unit 25 (including the code conversion circuit 10) is connected. As a result, the remote control unit 1 can be used, regardless of the standard of the control processor 24. That is, the remote control unit need not be configured individually for each standard of control processor.

Further, although the transmitting elements 61a through 61e, respectively, are configured as transmitting elements for radio waves of individually different frequencies fa through fe, they may also be configured as transmitting elements for ultrasonic waves or light beams of individually different frequencies fa through fe.

Embodiment 14

Figure 37:
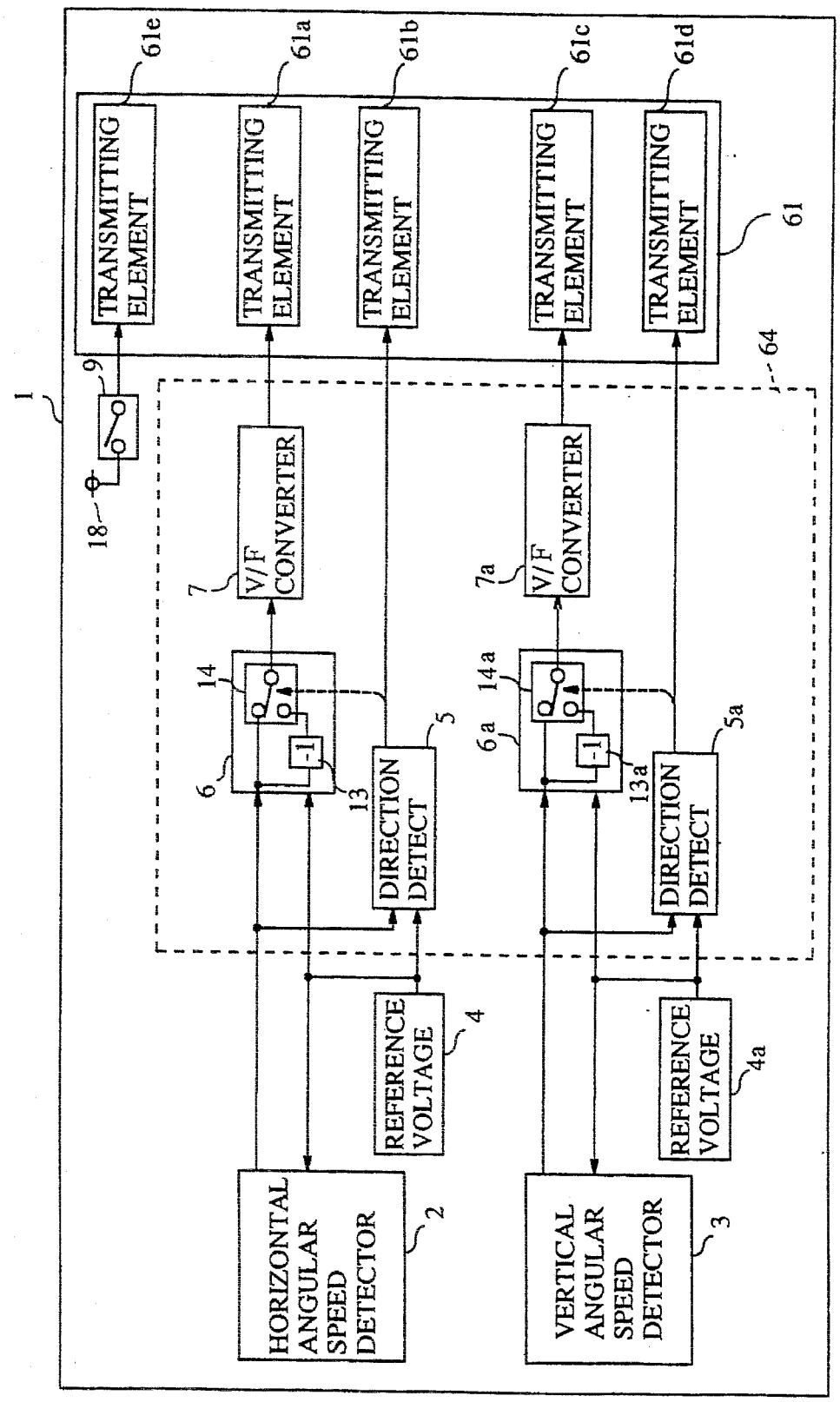
FIG. 37 is a block diagram showing a remote control unit of Embodiment 4.
Figure 38:
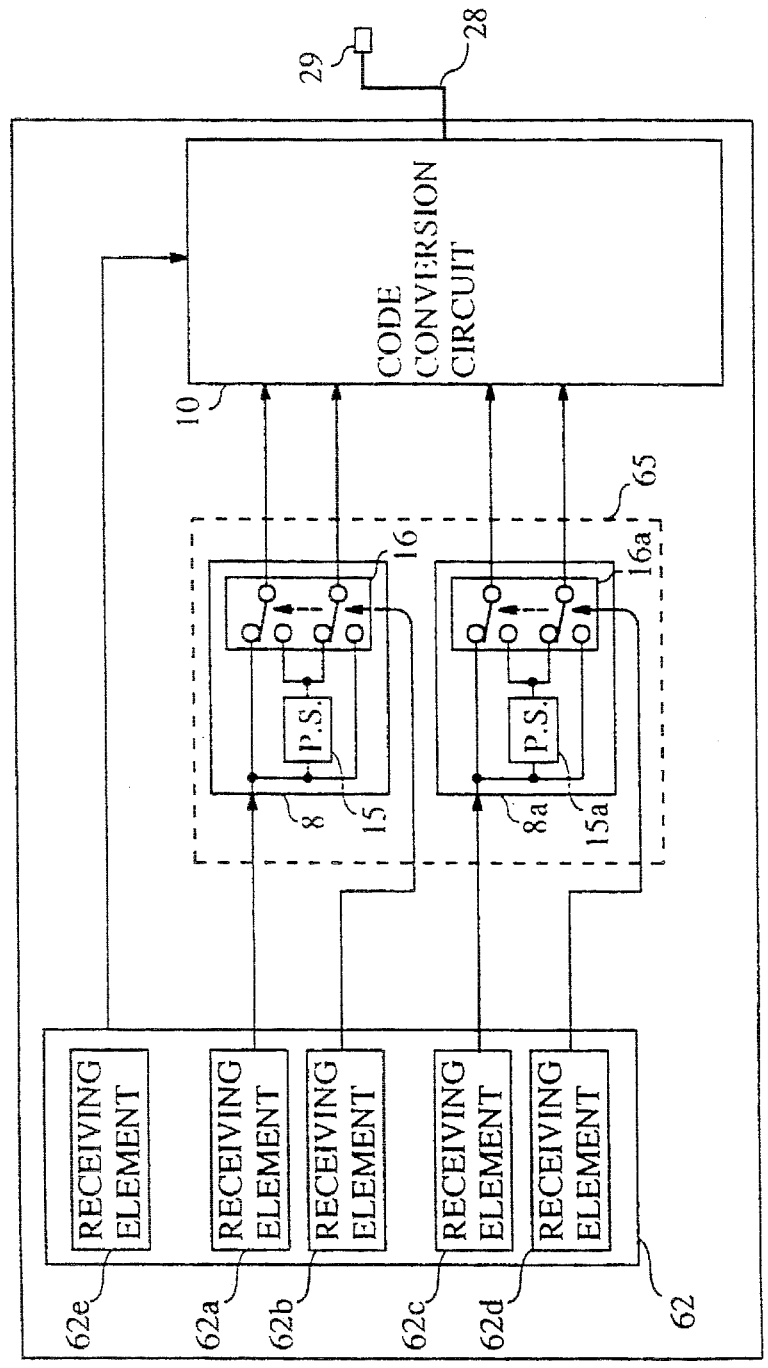
FIG. 38 is a block diagram showing a receiving unit of Embodiment 14.

In the Embodiment 14 above described, signal conversion means 63 comprises direction detection circuits 5 and 5a, absolute value detection circuits 6 and 6a, V/F conversion circuits 7 and 7a and signal processing circuits 8 and 8a. In this Embodiment 14, the signal processor circuits 8 and 8a, which form a part of the signal conversion means 63, are provided in receiving unit 25. FIG. 37 is a block diagram showing the remote control unit according to this Embodiment 14, and FIG. 38 is a block diagram showing the receiving unit. In these drawings, a reference numeral 64 designates a signal processing section comprising direction detection circuits 5 and 5a, absolute value detection circuits 6 and 6a, and V/F conversion circuits 7 and 7a; and 65 designates a signal conversion means in the receiving unit comprising signal processing circuits 8 and 8a.

In this Embodiment 14, the power consumption of the remote control unit is reduced from that of the Embodiment 13 above described by the amount of power consumed by the signal processing circuits 8 and 8a, lengthening the useful life of the batteries used in the power supply 15. And since in this case the output signal of the signal conversion means 64 is a sequence of pulses similar to that of the signal conversion means 63 in the Embodiment 13 above described, a similar transmitter 61 can be used.

Embodiment 15

Figure 39:
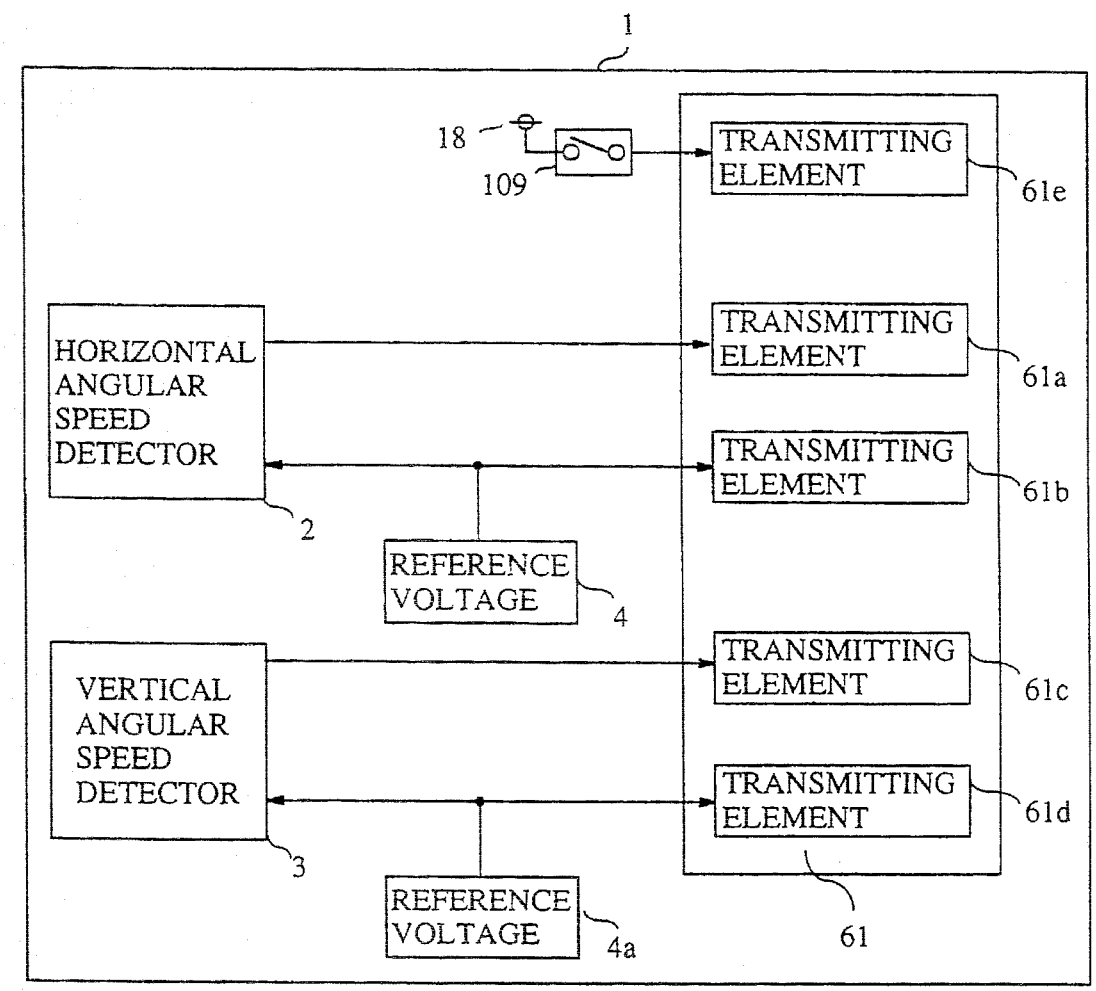
FIG. 39 is a block diagram showing a remote control unit of Embodiment 15.
Figure 40:
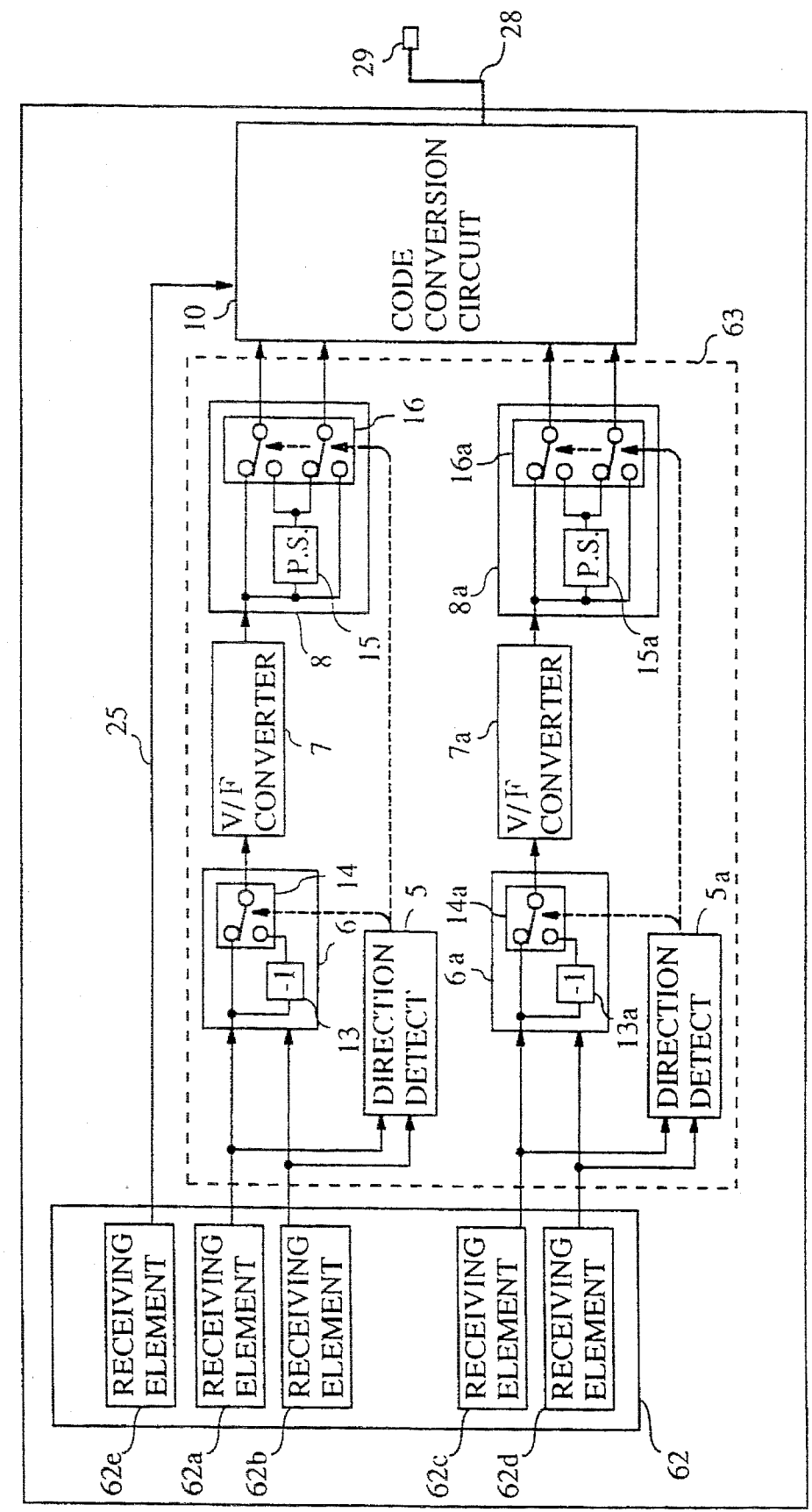
FIG. 40 is a block diagram showing a receiving unit of Embodiment 15.

In the Embodiment 14 above described, the receiving unit 25 is provided with a receiver-side signal conversion means 65 comprising signal processing circuits 8 and 8a, which form a part of the signal conversion means 63, but in this Embodiment 15, as shown in FIG. 39 and FIG. 40, signal conversion means 63 is provided not in the remote control unit 1 but in the receiving unit 25.

In this Embodiment 15, the power consumption of the remote control unit is further reduced from that of the Embodiment 14 described above by the amount of power consumed by the direction detection circuits 5 and 5a, the absolute value detection circuits 6 and 6a, and V/F conversion circuits 7 and 7a. This further lengthens the useful life of the batteries used in the power supply 18. Since in this case, however, the signal input to the transmitter 61 is not a sequence of pulses but an analog signal, the transmitter 61 must be of a type capable of transmitting analog signals.

Further, by using the carrier wave as the reference, the transmitting elements 61b and 61d for the reference voltage sources 4 and 4a may be eliminated, and by combining the outputs of the vertical and horizontal angular speed detectors 2 and 3, into a signal similar to that of a stereo signal, the transmitting elements 61a and 61c may be integrated.

Embodiment 16

Figure 41:
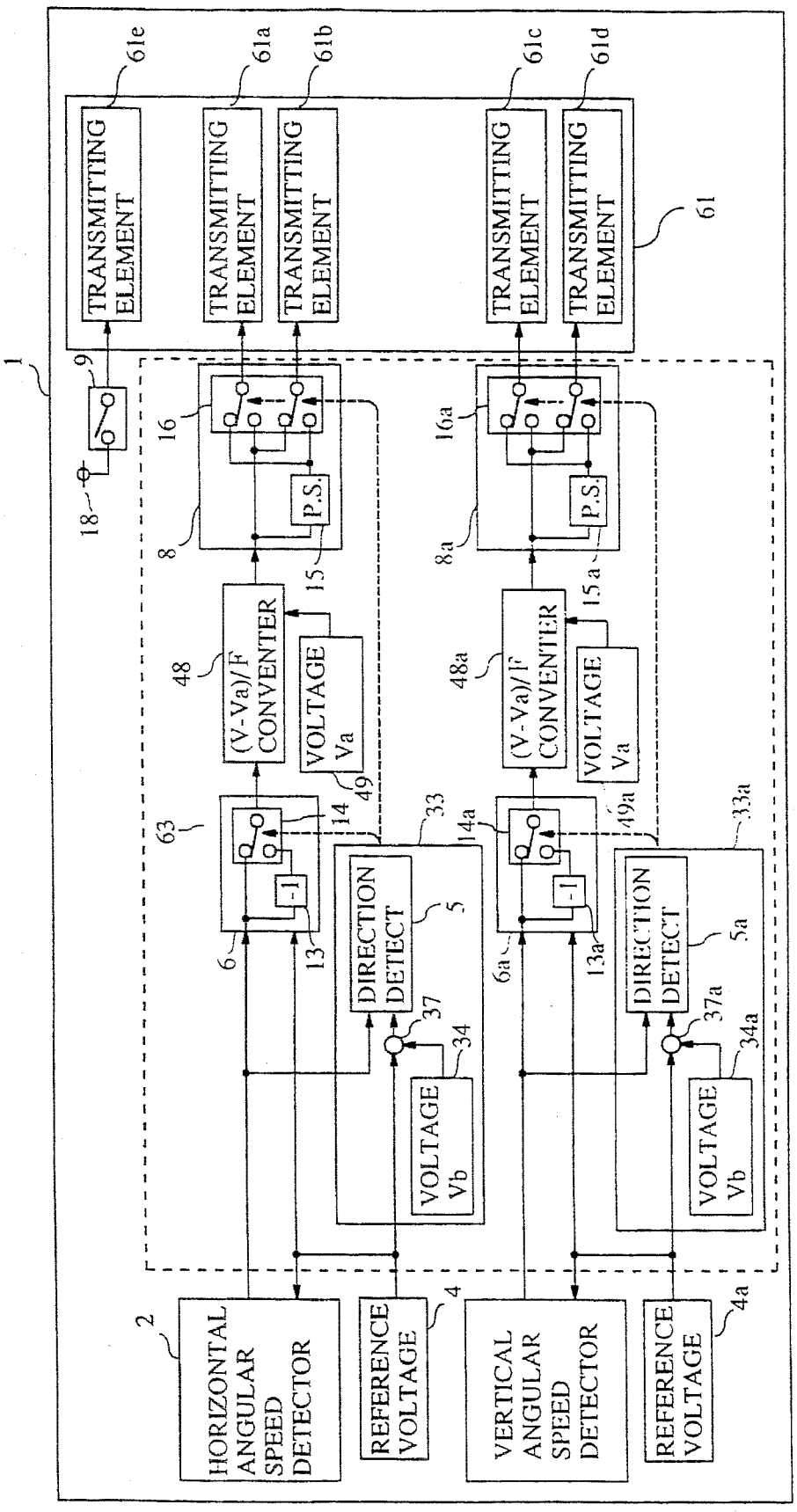
FIG. 41 is a block diagram showing a remote control unit of Embodiment 16.
Figure 42A:
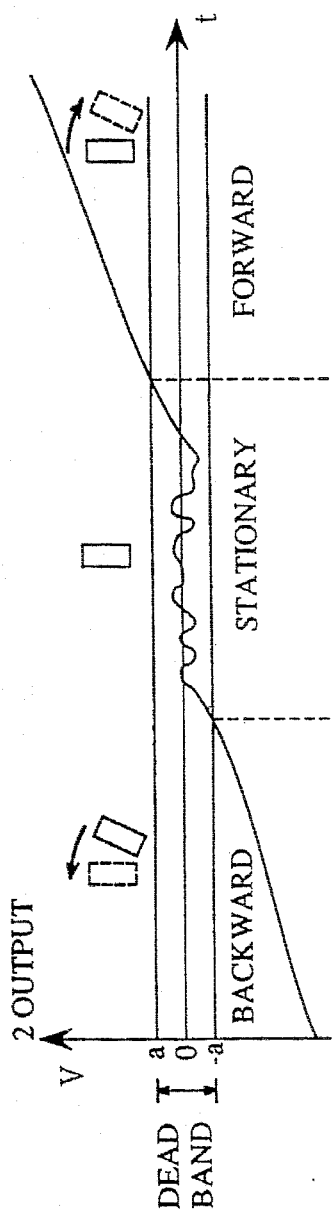
FIG. 42A to FIG. 42D are diagrams showing examples of output signals of the direction detecting circuit of Embodiment 16.
Figure 42B:
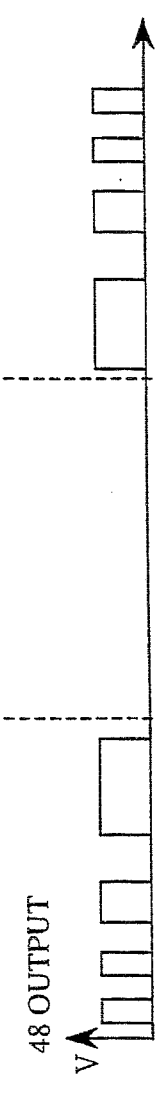
Figure 42C:
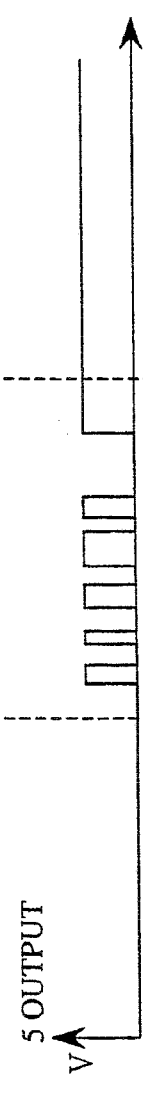
Figure 42D:
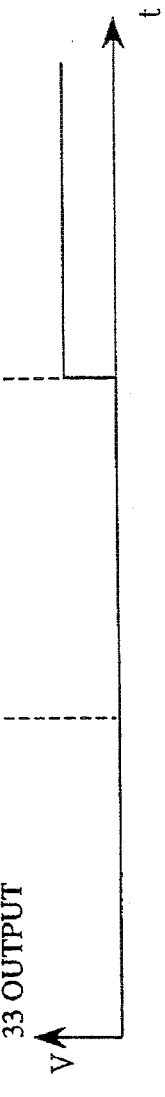

FIG. 41 is a block diagram showing the remote control unit of Embodiment 16 of the present invention, wherein reference numerals 33 and 33a designate direction detecting and hand-shake compensation circuits comprising direction detection circuits 5 and 5a, reference voltage sources 34 and 34a and adders 37 and 37a. FIG. 42C shows an example of the output signal of the direction detecting and hand-shake compensation circuit 33 which is output when the remote control unit 1 is moved in one direction, stopped and then moved in the reverse direction. As shown by the output of the angular speed detector 2 in FIG. 42A, an oscillation occurs due to a hand-shake of the remote control unit in the stationary state. As shown in FIG. 42B, this oscillation does not appear at the output of the (V–Va)/F conversion circuit due to its dead band. The output of the direction detection circuit 5 of the previously described embodiment, which is shown in FIG. 42C, contains pulses due to a hand-shake during the stationary state. Consequently, if switching circuit 14 is controlled by the output of the direction detection circuit 5 of the previously described embodiment, the pulses shown in FIG. 42C are superimposed onto the output of the (V–Va)/F conversion circuit.

In the detection and hand-shake compensation circuits 33 and 33a, the reference voltages are offset by means of the adders 37 and 37a in the amount of voltage Vb of the reference voltage sources 34 and 34a. As a result, the effect on the direction detection circuits 5 and 5a due to a hand-shake disappears.

As a modification to the above embodiment, it is possible to use the reference voltage sources 49 and 49a as the reference voltage sources 34 and 34a by setting Vb=Va.

Embodiment 17

Figure 43:
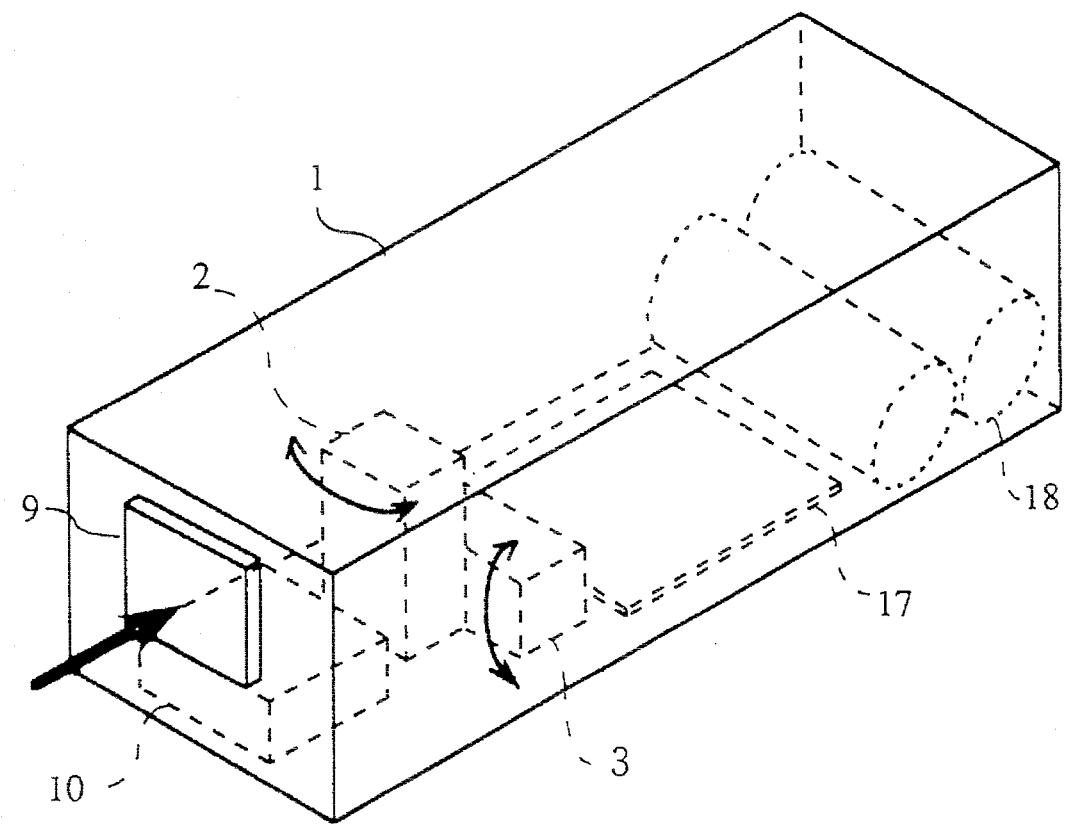
FIG. 43 is a perspective view showing a remote control unit of Embodiment 17.

FIG. 43 is a perspective view showing a remote control unit according to an Embodiment 17 of the present invention, in which the selection switch 9 is provided such that it is pressed in a direction normal to the horizontal and vertical directions (the angular motions of which are detected by the angular speed detectors 2 and 3). According to this Embodiment 17, the motion of the remote control unit 1 that is caused by the pressing of the selection switch 9 does not contain any component of change in orientation detected by the angular speed detectors 2 and 3. Thus, pressing the selection switch 9 does not affect the position of cursor 51.

Embodiment 18

Figure 44A:
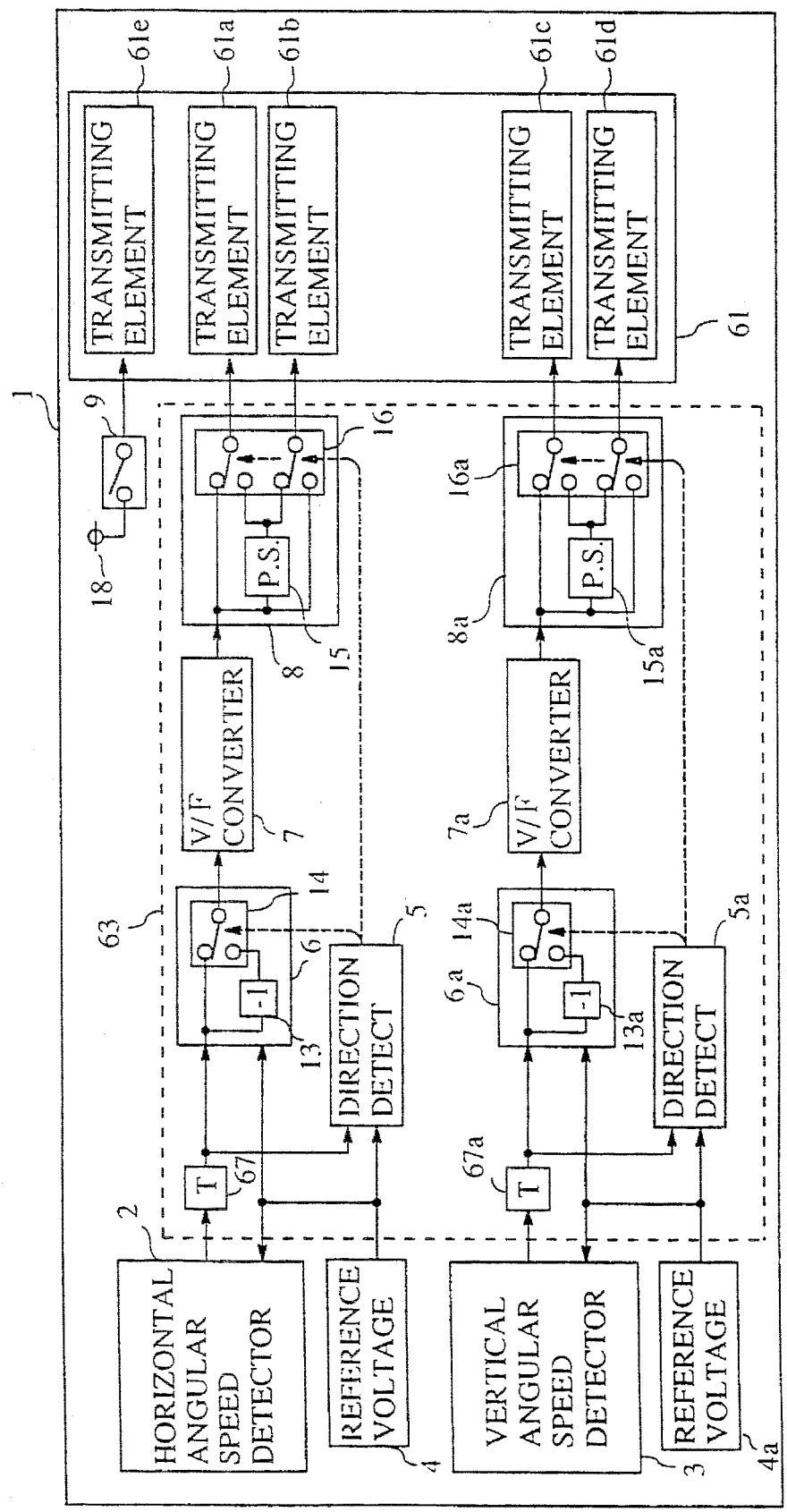
FIG. 44A is a block diagram showing a remote control unit of Embodiment 18.
Figure 44B:
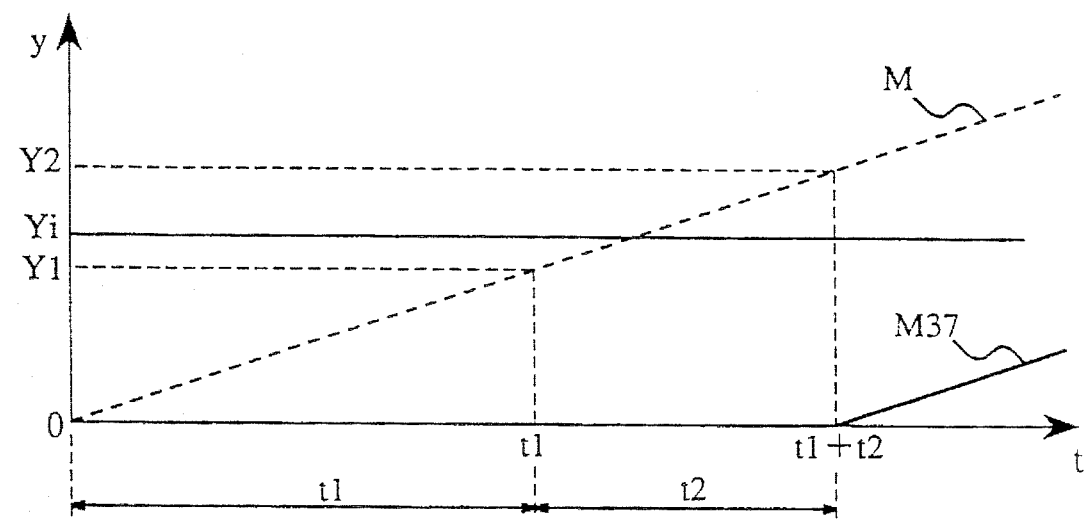
FIG. 44B is a diagram illustrating the operation of the remote control unit of Embodiment 18.

FIG. 44A and FIG. 44B show Embodiment 18 of the present invention. FIG. 44A is a block diagram showing the remote control unit according to this Embodiment 18, wherein reference numerals 37 and 37a designate delay circuits that delay the output of angular speed detectors 2 and 3 by a time t. FIG. 44B shows the operation of a device according to Embodiment 18, wherein t1 designates the period of time required to press the selection switch 9 until contact is initiated; t2 designates the period of time from the time at which the selection switch 9 makes contact until the time at which execution of the action of the icon has been confirmed (i.e., the delay time from the contact at the selection switch 9 in FIG. 44A until the code conversion of the signal at the code conversion circuit 10 in FIG. 34); Y1 designates the distance through which the cursor 108 moves during time period tl due to a change in orientation of the remote control unit 1 as a result of pressing on it; Y2 designates the distance through which the cursor 108 moved during time period t1+t2 due to a change in orientation of the remote control unit 1 as a result of pressing on it; Yi designates the distance by which the cursor 108 moves beyond the icon; M designates the distance through which the cursor 108 would move if the delay circuits 37 and 37a were not provided; and M37 designates the distance which the cursor 108 moves when the delay time t of the delay circuits 37 and 37a is equal to t1+t2.

The following is a description of the operation thereof. As shown in FIG. 44B, if the delay circuits 37 and 37a were not provided, the distance Y2 through which the cursor 108 moves until after the elapse of time t1+t2 would exceed Yi, the icon could not be selected. When the delay circuits 37 and 37a are provided, however, the movement of the cursor 108 does not occur as shown by M37 until after the elapse of t1 and t2. The icon is therefore selected by the selection switch 9. The result is that the effect of pressing the selection switch 9 on the position of the cursor 108 is eliminated.

In the above description, it is assumed that the selection switch 9 is pressed in a state in which the cursor 108 is on the icon and is stationary. This assumption holds in most cases because in many cases the cursor is moved to the desired icon and there is some delay before the selection switch 9 is pressed.

Further, instead of providing both delay circuits 37 and 37a for delaying the outputs of both of the angular speed detectors 2 and 3, it is also possible to provide a single delay circuit to delay only the output of the angular speed detector for the direction in which the remote control unit 1 is undesirably rotated by the pressing of the selection switch 9.

Embodiment 19

Figure 45B:
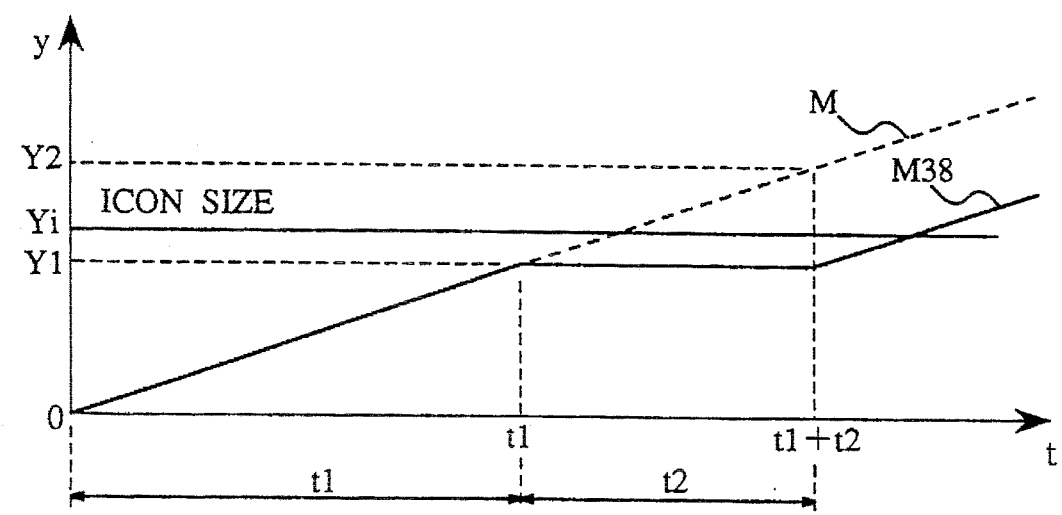
FIG. 45B is a diagram illustrating the operation of the remote control unit of Embodiment 19.

FIG. 45A and FIG. 45B show Embodiment 19 of the present invention. FIG. 45A is a block diagram showing the remote control unit according to this Embodiment 19, wherein reference numerals 68 and 68a designate switching circuits that are switched to the Low position from the instant that the selection switch 9 is connected until the elapse of time t due to the action of the delay circuit 67. FIG. 45B shows the operation of a device according to this Embodiment 19, wherein M38 designates the distance through which the cursor 108 moves when the delay time t of the delay circuit 67 is equal to t1+t2.

The following is a description of the operation. As shown by M38 in FIG. 45B, if the switching circuit 68 is provided, the cursor 108 moves up to Y1 for the time t1 but does not move from t1 to t2. The distance through which the cursor 108 must move is less than the distance along M through which the cursor would move if the switching circuit 68 were not provided. The result is that the effect of pressing the selection switch 9 on the position of the cursor 108 is reduced.

Further, if the delay time t1+t2 shown in the Embodiment 18 is replaced with t1 and an arrangement is made to effect delay time from t1 to t2 in this Embodiment 19, it is possible to reduce the degradation in the response due to delaying the output of the angular speed detectors 2 and 3.

Embodiment 20

Figure 46:
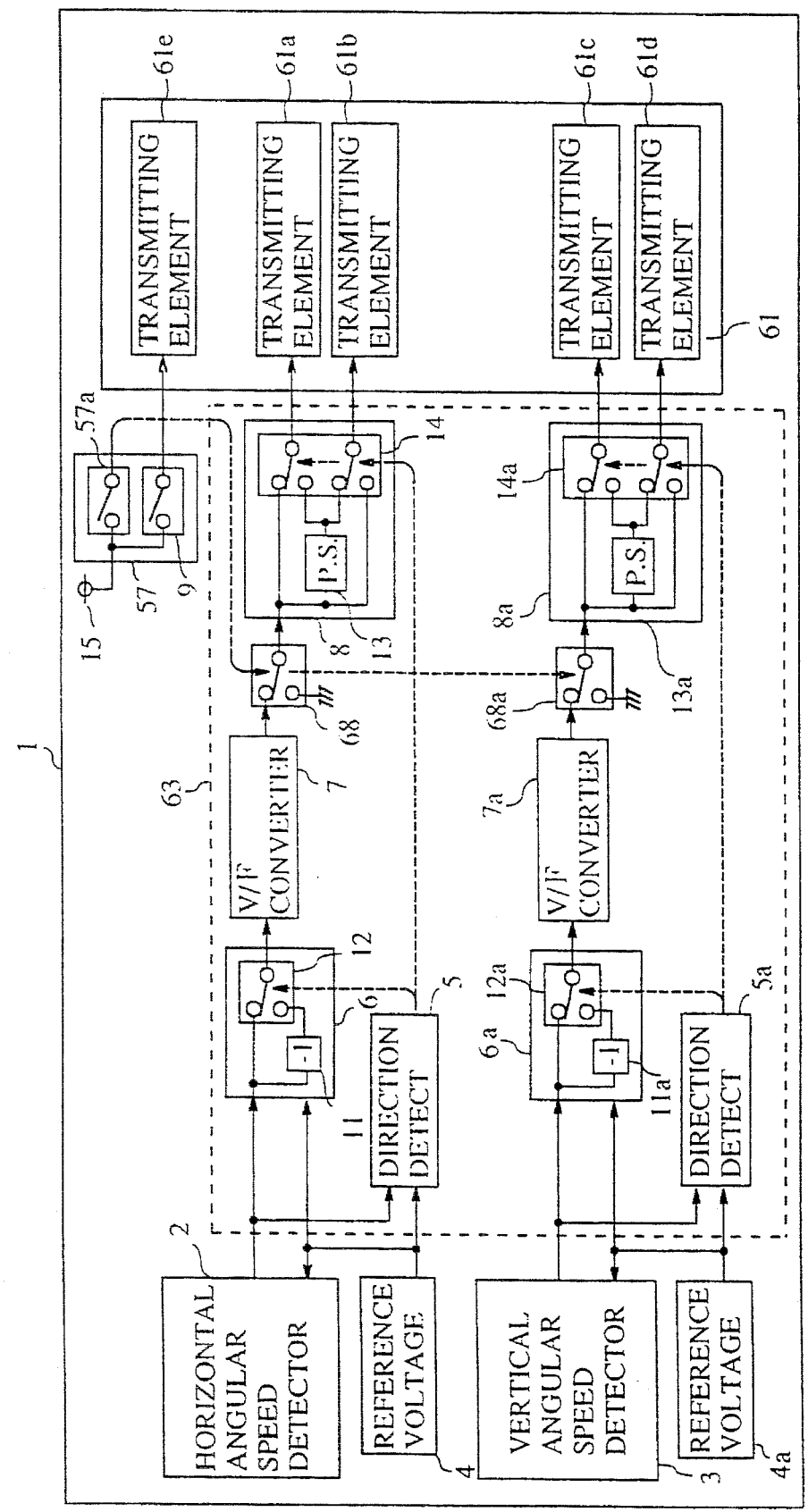
FIG. 46 is a block diagram showing a remote control unit of Embodiment 20.

FIG. 46 is a block diagram showing the remote control unit according to Embodiment 20 of the present invention, wherein a reference numeral 57 designates a two-stage selection switch. Reference numeral 57a designates a first-stage switch of the two-stage switch 5. The on-off control of the first-stage switch 57a is activated either at a touch or with a slight pressure. As a result, the force required to activate the first-stage switch 57a of the two-stage selection switch 57, which must be pressed continuously to move the cursor to a position over the icon, is reduced or made unnecessary. The force required to press the second-stage switch of the two-stage switch 9 is reduced to a level of the force required to activate a single-stage switch. Accordingly, fatigue of the finger is reduced.

Embodiment 21

Figure 47:
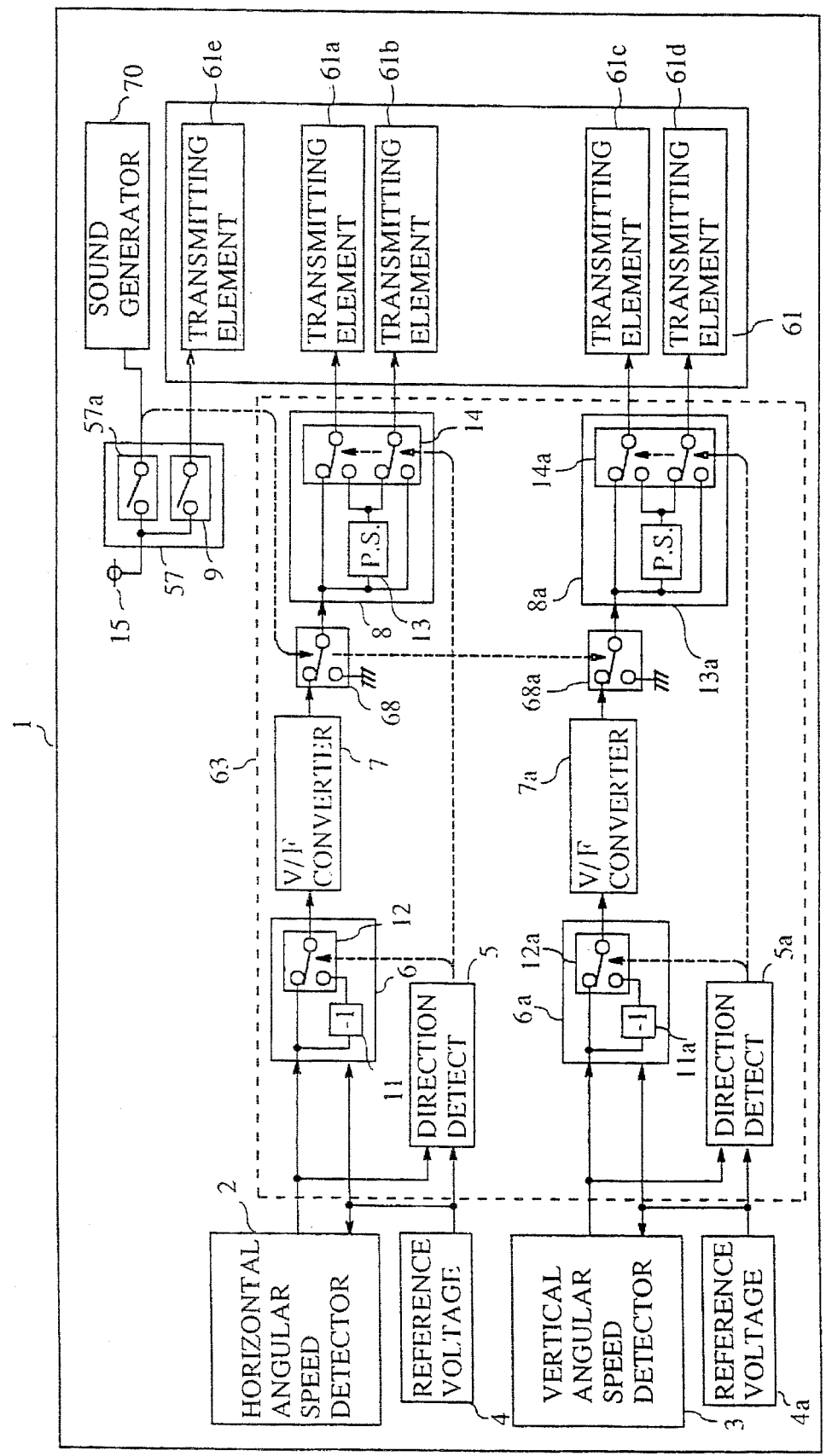
FIG. 47 is a block diagram showing a remote control unit of Embodiment 21.

FIG. 47 is a block diagram showing the remote control unit according to Embodiment 21 of the present invention, wherein a reference numeral 70 is a sound generator. The sound generator 70 is so configured that sound is emitted at the instant at which the action of moving the cursor is enabled with the pressing of the first-stage switch, at the instant at which the action of moving the cursor is disabled by releasing finger pressure, or during the period in which the action of moving the cursor is possible with the pressing of the first-stage switch. By means of this sound generator 70, it is possible to confirm that first-stage contact has been made, even when the switch used offers little or no tactile sensation.

Embodiment 22

Figure 48:
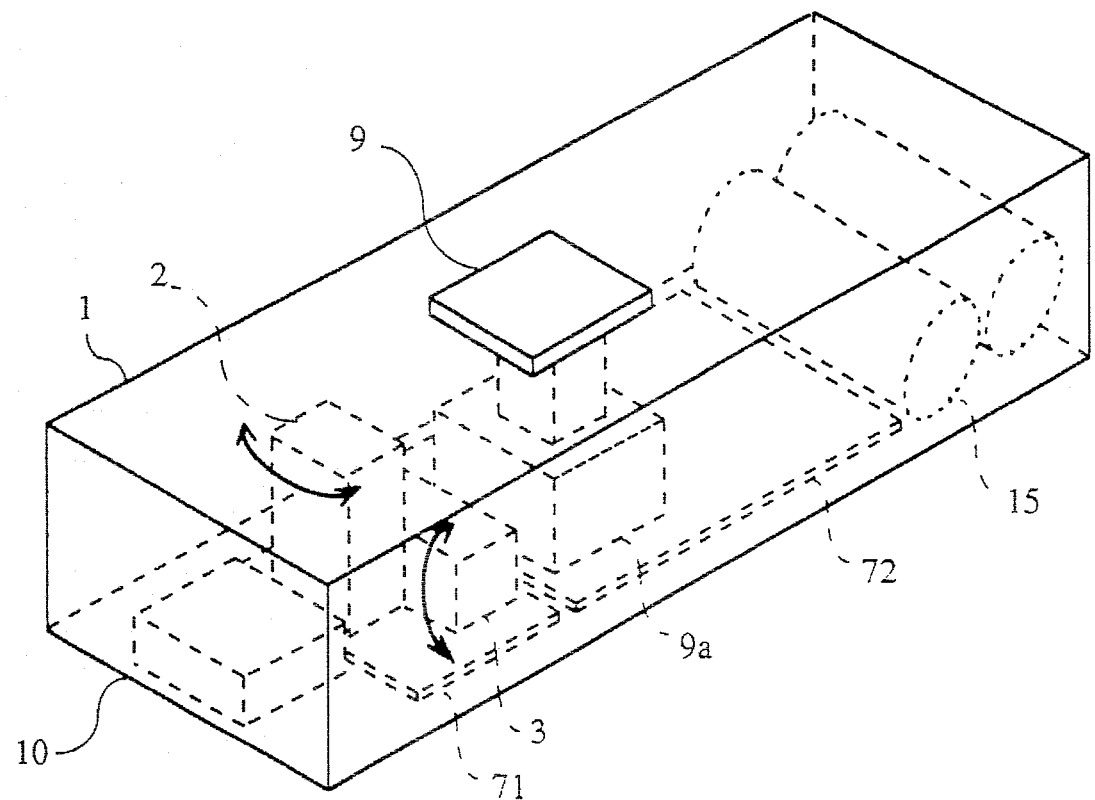
FIG. 48 is a perspective view showing a remote control unit of Embodiment 22.

FIG. 48 is a perspective view of a remote control unit according to Embodiment 22 of the present invention, wherein a reference numeral 71 designates a mounting plate for the angular speed detectors 2 and 3; 72 designates a mounting plate for the selection switch 9; and 9a designates the structural portion of the selection switch 9 that is mounted to plate 72. The plates 71 and 72 are fixed, e.g., by means of screws, to an outer casing of the remote control unit 1 separately and individually.

The following is a description of the operation thereof. If the selection switch 9 is provided to produce a click to allow tactile confirmation of the operation of an icon, the vibration from the click is detected by the angular speed detectors 2 and 3 and the cursor 108 will move. If, however, the mounting plates of the angular speed detectors 2 and 3 and the selection switch 9 are provided separately as plates 71 and 72, movement of the cursor 108 as a result of the clicking of the selection switch 9 can be prevented.

Embodiment 23

Figure 49:
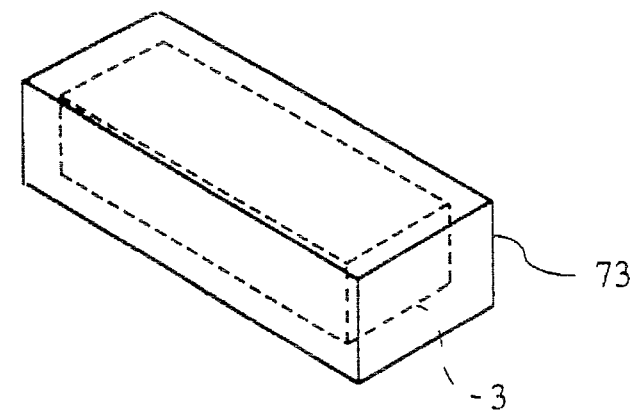
FIG. 49 is a perspective view showing an angular speed detector of Embodiment 23.

FIG. 49 is a perspective view of a remote control unit according to Embodiment 23 of the present invention, wherein a reference numeral 73 designates vibration-damping material for the angular speed detectors 2 and 3. By mounting the angular speed detectors 2 and 3 with the interposition of a vibration-damping material such as, for example, polyethylene foam, it is possible to prevent transmission of the vibration due to clicks to the angular speed detectors 2 and 3. It is also possible to eliminate the effects of vibrations due to a hand-shake, impact and the like.

Embodiment 24

Figure 50:
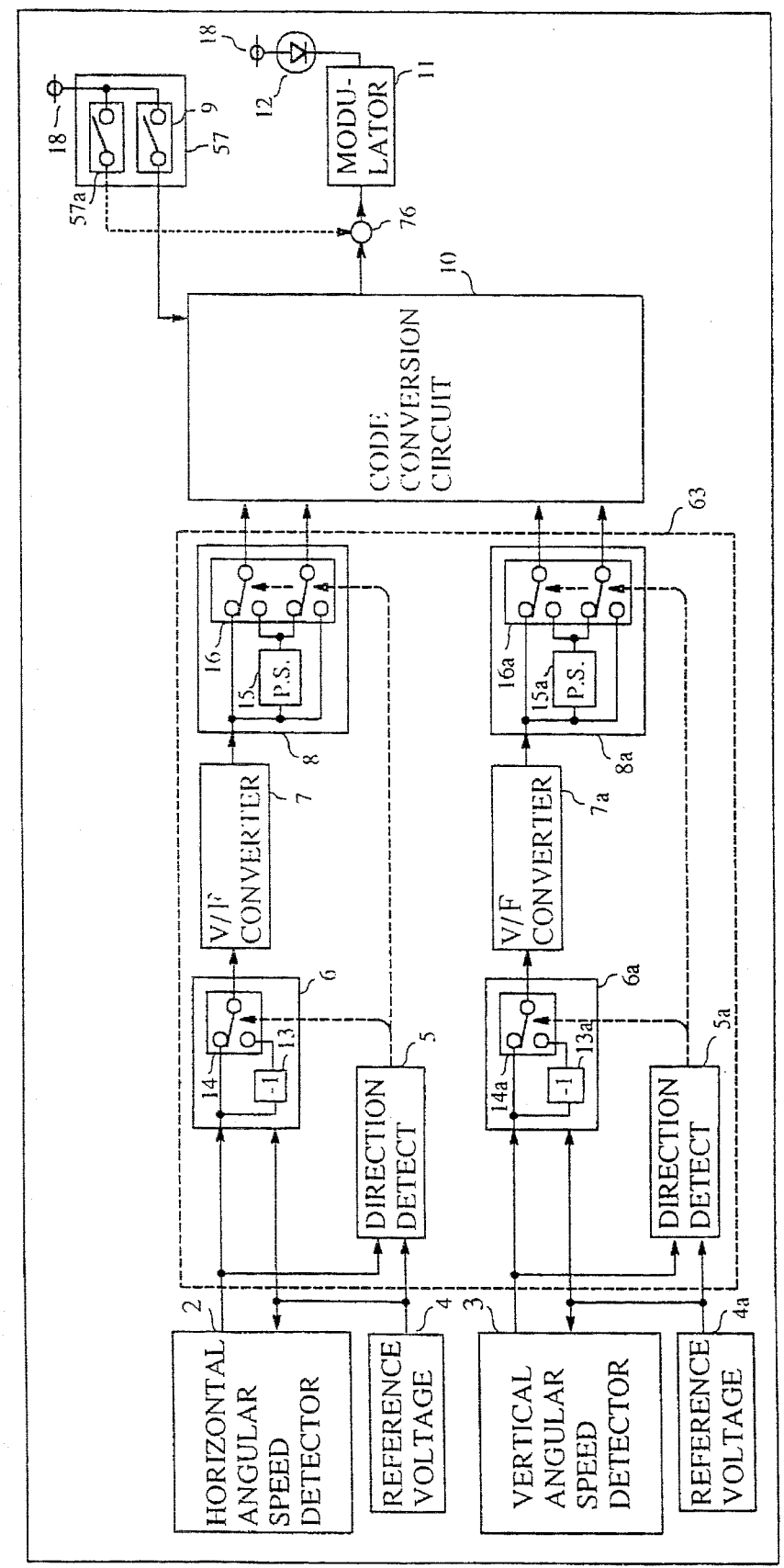
FIG. 50 is a block diagram showing a remote control unit of Embodiment 24.
Figure 51:
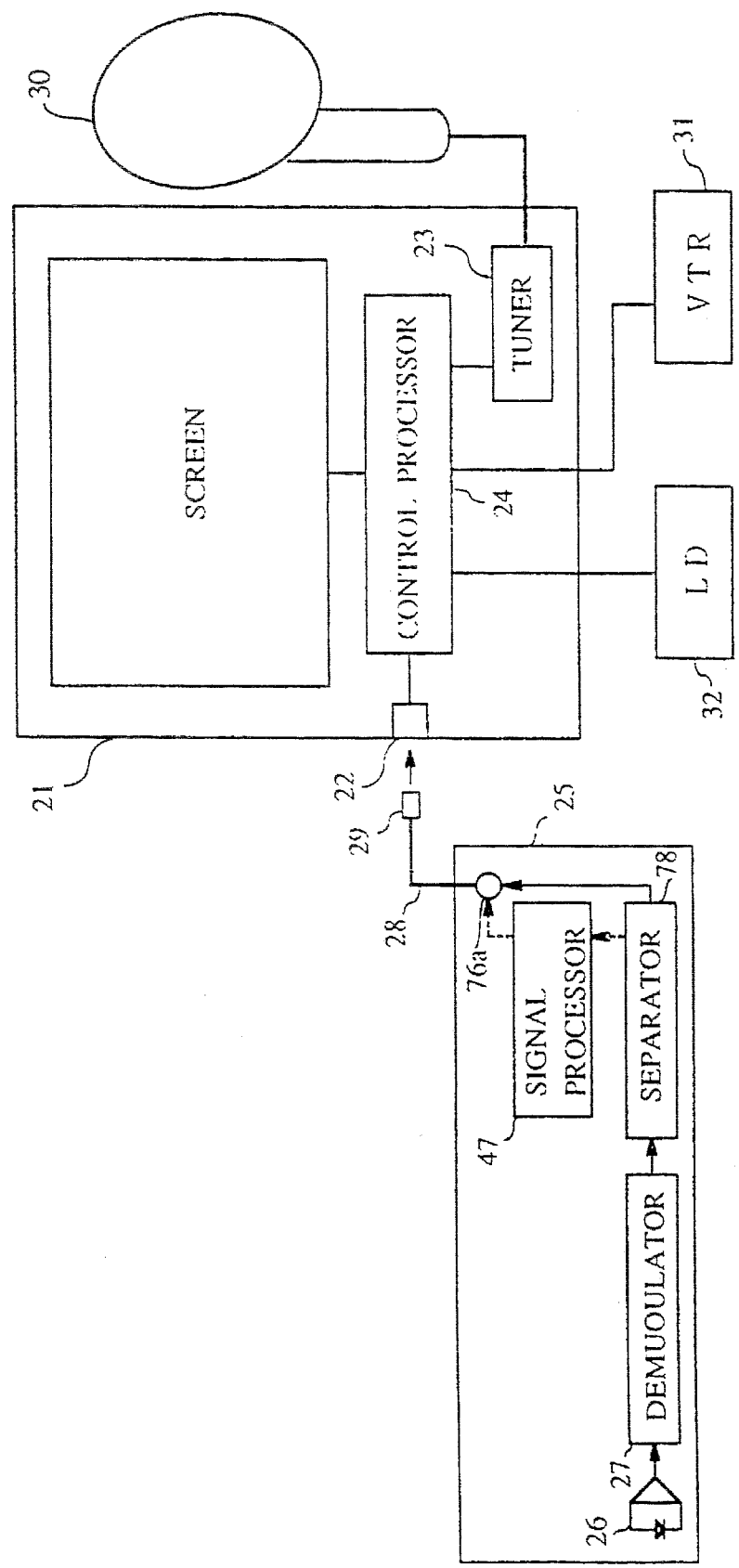
FIG. 51 is a block diagram showing a controlled unit of Embodiment 24.

FIG. 50 and FIG. 51 show Embodiment 24 of the present invention. FIG. 50 is a block diagram showing a remote control unit provided with a synthesizing circuit 76 for synthesizing a signal due to a first-stage pressing action on a two-stage selection switch to produce a signal suitable for transmission by the signal transmitter 12. FIG. 51 is a block diagram showing a controlled unit that is operated by a signal due to the first-stage pressing action on a two-stage selection switch. In the drawings, a reference numeral 47 is a signal processor that converts a signal from a switch for moving the cursor into a signal for switching the power supply on, or selecting a specific icon. If the first-stage pressing action is applied to the two-stage selection switch, that first-stage signal is synthesized by the synthesizer circuit 76 and transmitted by the signal transmitter 12. After being received by the receiving unit 25, the first-stage is separated by the signal separator circuit 78 and input to the signal processor 47. The signal processor 47 converts the first-stage signal into a signal for, for example, switching the power supply on or selecting a specific icon. The first-stage signal is then again synthesized by the synthesizing circuit 76a and input to the display device 100. In this way, power on and icon selection operations can be simplified.

Embodiment 25

Figure 52:
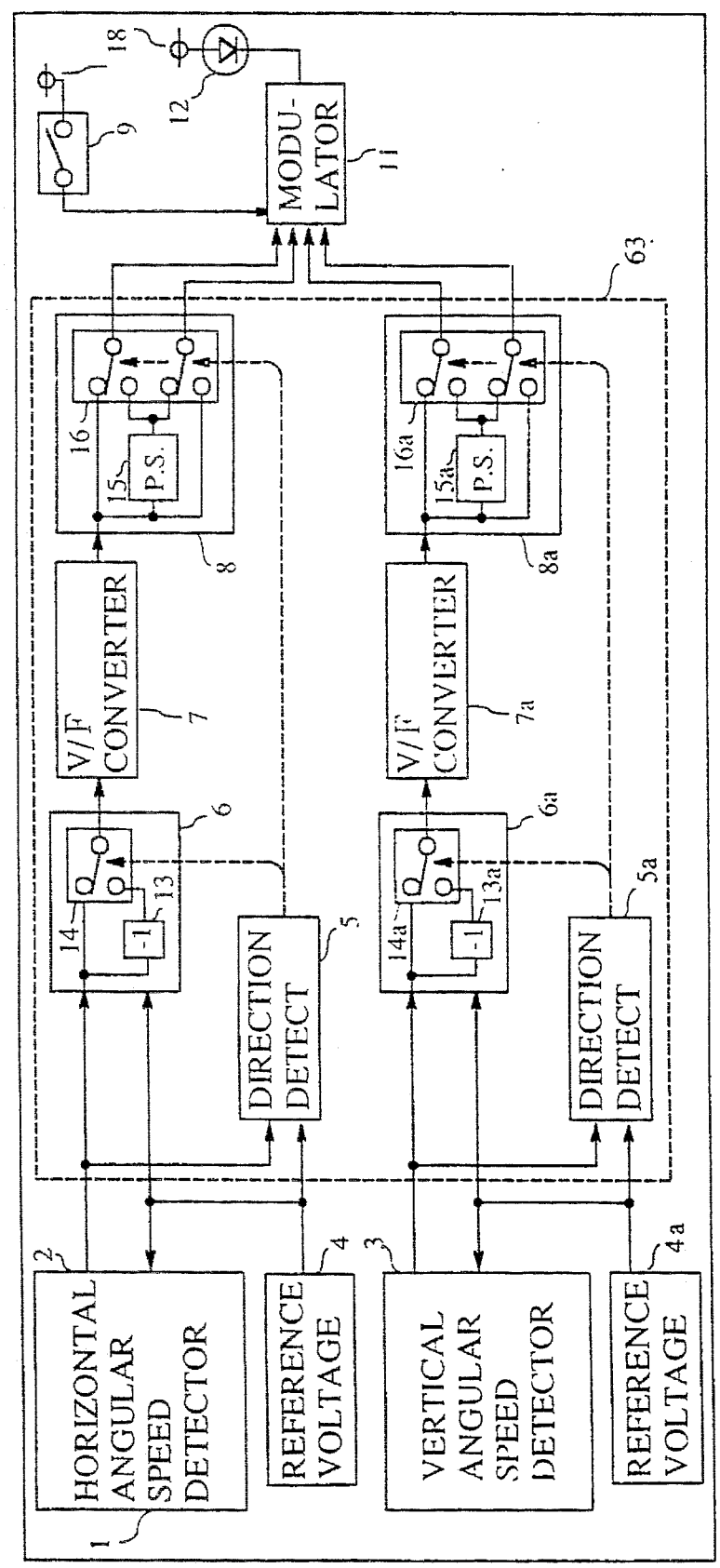
FIG. 52 is a block diagram showing a remote control unit of Embodiment 25.
Figure 53:
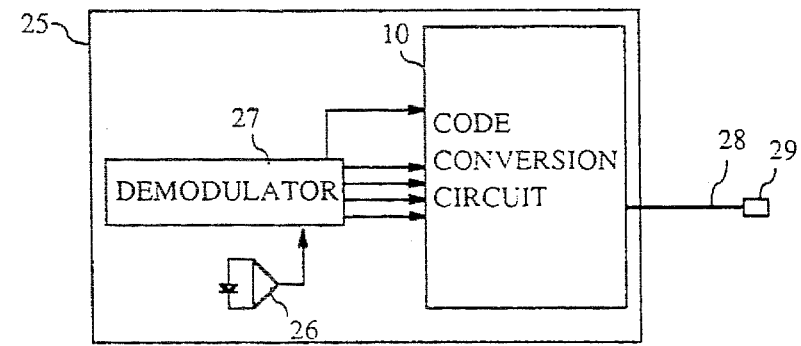
FIG. 53 is a block diagram showing a receiving unit of Embodiment 25.

FIG. 52 and FIG. 53 show Embodiment 25 of the present invention. FIG. 52 is a block diagram showing a remote control unit, and FIG. 53 is a block diagram showing its receiving unit, which includes the conversion circuit 10 in the remote control unit of the previously described embodiment. As a result, even where various receiving unit 25 are provided with different code conversion circuits 10 which use different codes according to the particular control processor, identical remote control units 1 can be used with any type of receiving unit 25.

Embodiment 26

Figure 54:
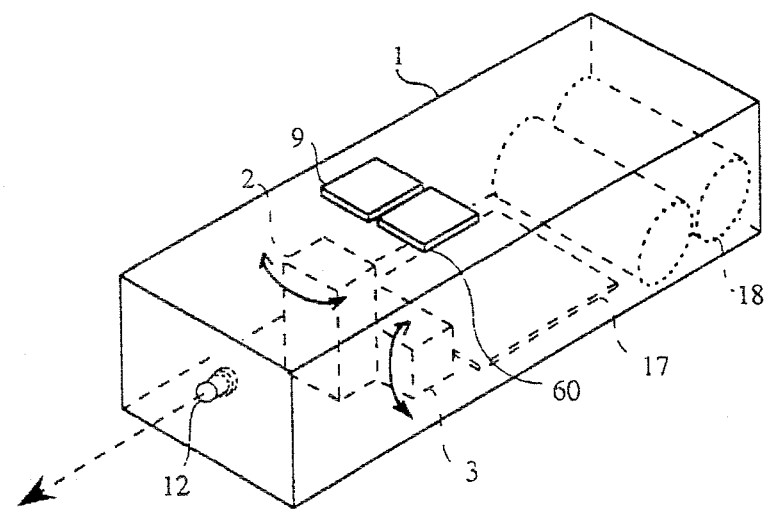
FIG. 54 is a perspective view showing a remote control unit of Embodiment 26.

FIG. 54 is a perspective view of a remote control unit according to Embodiment 26 of the present invention, which is provided with two independent switches, one for moving the cursor and one for selecting icons displayed on the screen. Reference numeral 60 designates a move button for controlling cursor movement. While move button 60 is held down, the cursor can be moved by moving the remote control unit 1. As a result, an icon can be selected by a pressing action without a strong pressing force that is required when the two-stage switch 57 is employed. In the configuration above described, dragging of the cursor is not taken into account. If the move switch 60 is used as is, and the selection switch 9 is replaced with a two-stage selection switch 57, and it is so arranged that pressing the first stage 57a causes selection of an icon, and pressing the second stage switch causes movement of the cursor and selection of an icon, thus, dragging is also possible.

Embodiment 27

Figure 55:
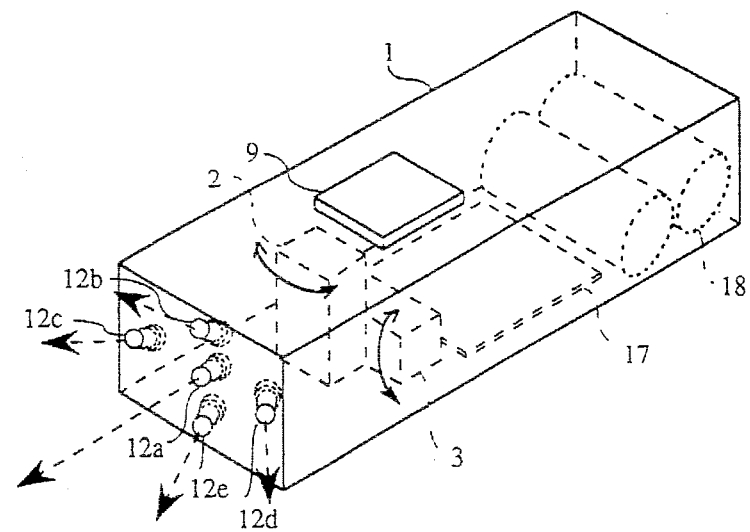
FIG. 55 is a perspective view of a remote control unit of Embodiment 27.

FIG. 55 is a perspective view of a remote control unit according to Embodiment 27 of the present invention, wherein reference numerals 12a through 12e designate limited-directivity signal transmitting elements formed, for example, of a light emitting diode. The limited-directivity signal transmitting element 12a is mounted so that it points in the direction of the axis of the remote control unit 1, and limited-directivity signal transmitters 12b through 12e are mounted to point in different directions centered on the direction of the axis of the remote control unit 1. In other words, the limited-directivity signal transmitting elements 12a through 12e are directed generally in the direction of the axis of the remote control unit, but in diverging directions centered on the direction of the axis of the remote control unit. As a result, even if the axis of the remote control unit 1 is shifted a way from the direction of the receiving unit 25 (direction of a line connecting the remote control unit and the receiving unit 25), one or other of the limited-directivity signal transmitting elements 12b through 12e will point at the receiving unit 25. This allows receiving unit 25 to receive the signals transmitted by the remote control unit at all times. The number of the limited-directivity signal transmitting elements may be other than five.

Embodiment 28

Figure 56:
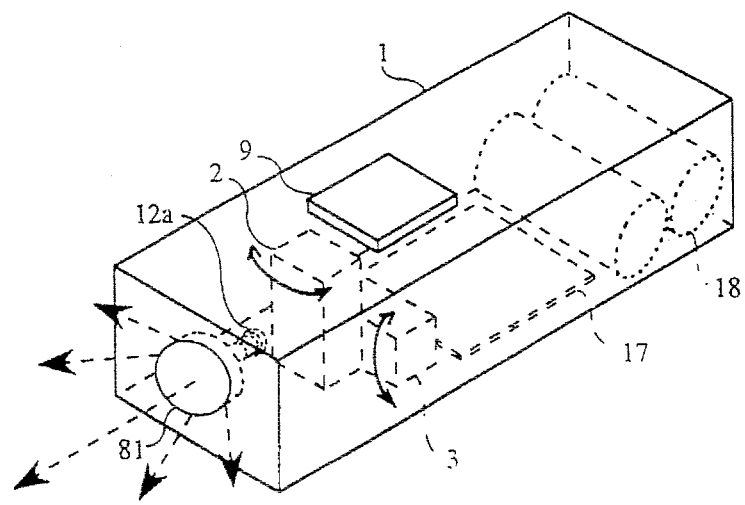
FIG. 56 is a perspective view of a remote control unit of Embodiment 28.

FIG. 56 is a perspective view showing a remote control unit according to Embodiment 28 of the present invention, wherein a reference numeral 81 designates a concave lens mounted in front of limited-directivity signal transmitter 12a. The mounting of concave lens 81 enables the signal from the limited-directivity signal transmitter 12a to be more widely transmitted so that even if the remote control unit 1 is not pointing at the receiving unit 25, the receiving unit 25 will be able to receive the signals transmitted by the remote control unit.

Embodiment 29

Figure 57:
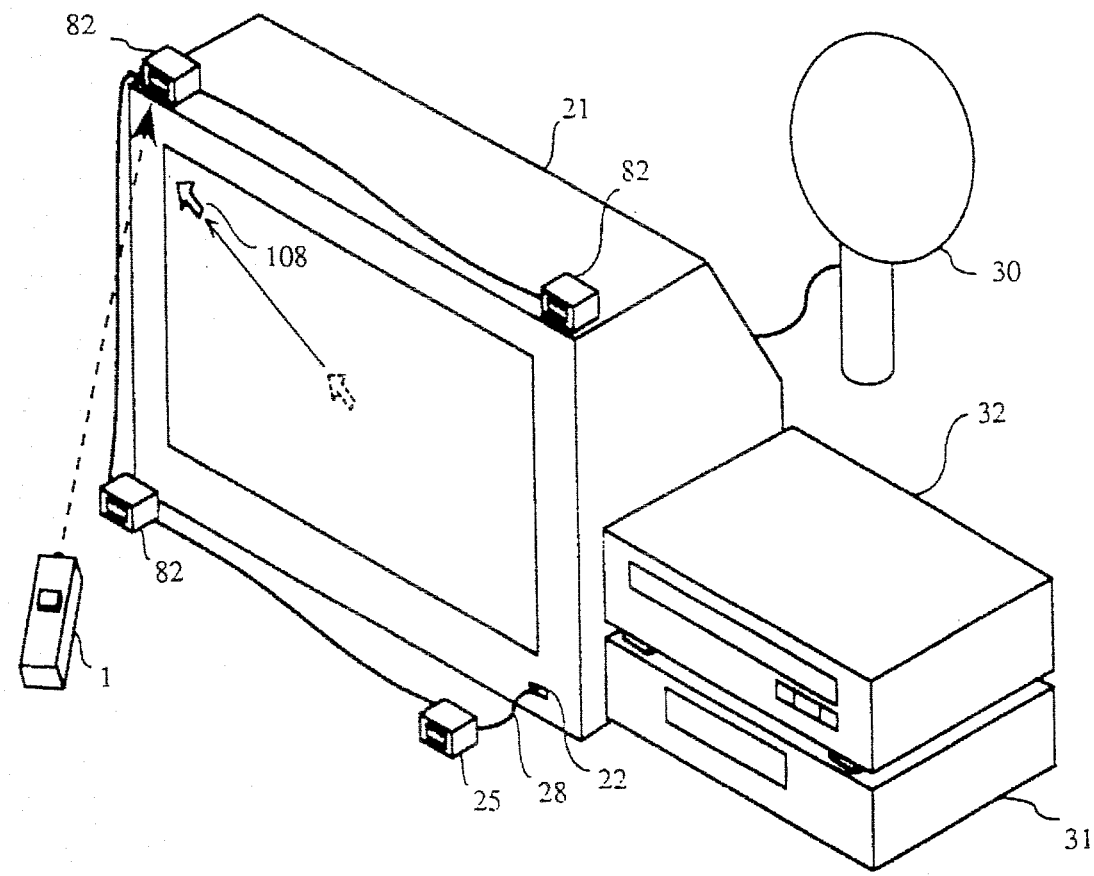
FIG. 57 is a perspective view of a remote control unit of Embodiment 29.
Figure 58:
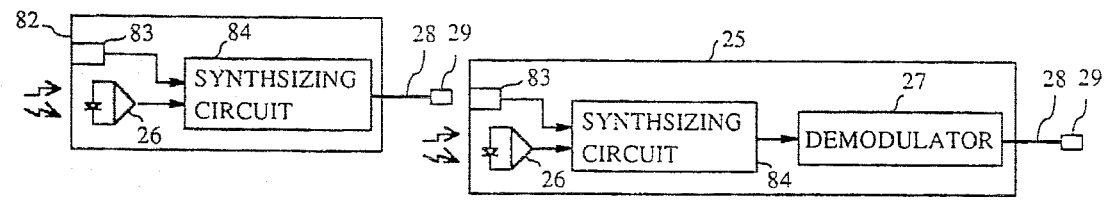
FIG. 58 is a block diagram showing a receiving unit of Embodiment 29.

FIG. 57 and FIG. 58 show Embodiment 29 of the present invention. FIG. 57 is a perspective view of a remote control system provided with a plurality of receiving units. FIG. 58 is a block diagram showing the receiving unit. As illustrated in FIG. 57, the receiving unit 25 comprises a receiver 26, a connector input terminal 83 for connection with an additional receiving unit 82, a synthesizing circuit 84 for synthesizing the output of the receiver 26 and the signal input through the connector input terminal 83, and a modulator 27 for modulating the output of the synthesizing circuit 85. The synthesizing circuit 84 may comprise an OR gate where the signal receiver is active High, or an AND gate where the signal receiver is active Low. By the action of the synthesizing circuit, the signal received by the signal receiver 26 of the receiving unit 25 or the signal received by the signal receiver 26 of the additional receiving unit 82 is output to the modulator 27, modulated by the modulator 27, and then output.

The additional receiving unit 82 also comprises a receiver 26, a connector input terminal 83 for connection with another additional receiving unit 82, and a synthesizing circuit 84 for synthesizing the output of the receiver 26 and the signal input through the connector input terminal 83. By the action of the synthesizing circuit, the signal received by the signal receiver 26 of the additional unit 82 or the signal received by the signal receiver 26 of the above-mentioned another additional receiving unit 82 is output to the modulator 27, modulated by the modulator 27, and then output.

By providing a suitable number of additional receiving units 82, and disposing them as well as the receiving unit 25 along the periphery of the display device 100, reception of the signal from the remote control unit 1 is ensured regardless of the orientation of the remote control unit 1.

Embodiment 30

Figure 59:
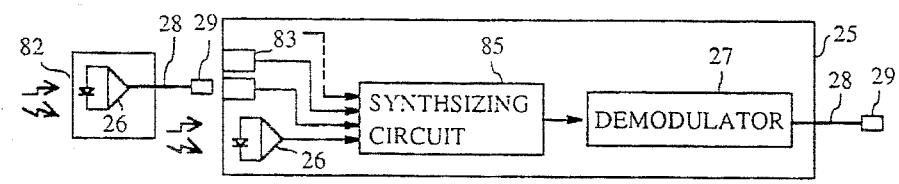
FIG. 59 is a block diagram showing a receiving unit of Embodiment 30.

FIG. 59 is a block diagram showing a receiving unit according to Embodiment 30 of the present invention, wherein a reference numeral 85 designates a multiple-input additional synthesizer circuit. Each additional receiving unit 82 consists solely of the signal receiver 26. This embodiment, by providing the multiple-input synthesizer circuit 85 in the receiving unit 25, renders the structure of the additional receiver 82 simpler than in the case of the Embodiment 29.

Embodiment 31

Figure 60:
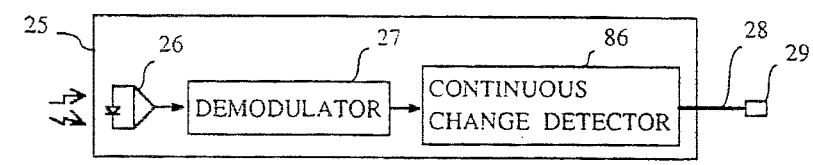
FIG. 60 is a block diagram showing a receiving unit of Embodiment 31.

FIG. 60 is a block diagram showing a receiving unit according to Embodiment 31 of the present invention, wherein a reference numeral 86 designates a continuous change detection circuit which serves to enable cursor movement only when the remote control unit is moved continuously. Specifically, only when the received and demodulated signal continues to have a magnitude exceeding a predetermined value for more than a predetermined period is the remote control unit 1 recognized as truly "moving" or the movement of the remote control unit 1 recognized as one proper for causing cursor movement. If not, e.g., if the signal exceeds in magnitude the predetermined value, but does not continue to do so for more than the predetermined period, then the movement of the remote control unit is disregarded, and the signal is treated as a noise. With such an arrangement, it is possible to prevent undesired movement of the cursor that would occur as a result of noise having a level near the threshold of the signal receiver 26.

Embodiment 32

Figure 61:
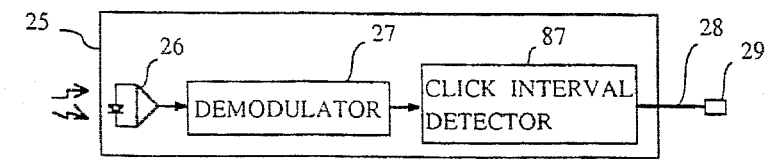
FIG. 61 is a block diagram showing a receiving unit of Embodiment 32.

FIG. 61 is a block diagram showing a receiving unit according to Embodiment 32 of the present invention, wherein a reference numeral 87 designates a click interval detection circuit. The click interval detection circuit 86 accepts the on signal from the selection switch 9 only when the time interval between successive on signals from the selection switch is longer than a given value since the noise which is generated near the threshold level of the signal receiver 26 at the instant when the signal input to the signal receiver 26 is shifted away from the signal receiver 26 is shorter than the time interval between successive pressings of the selection switch 9 by a finger, the click interval detecting circuit 87 can prevent erroneous selection of an icon.

Embodiment 33

In the various embodiments described above, the orientation of the remote control unit 1 is changed to move the cursor. In the embodiments described below, the cursor is moved on the basis of the movement of the remote control unit, other than the change in orientation.

Figure 62:
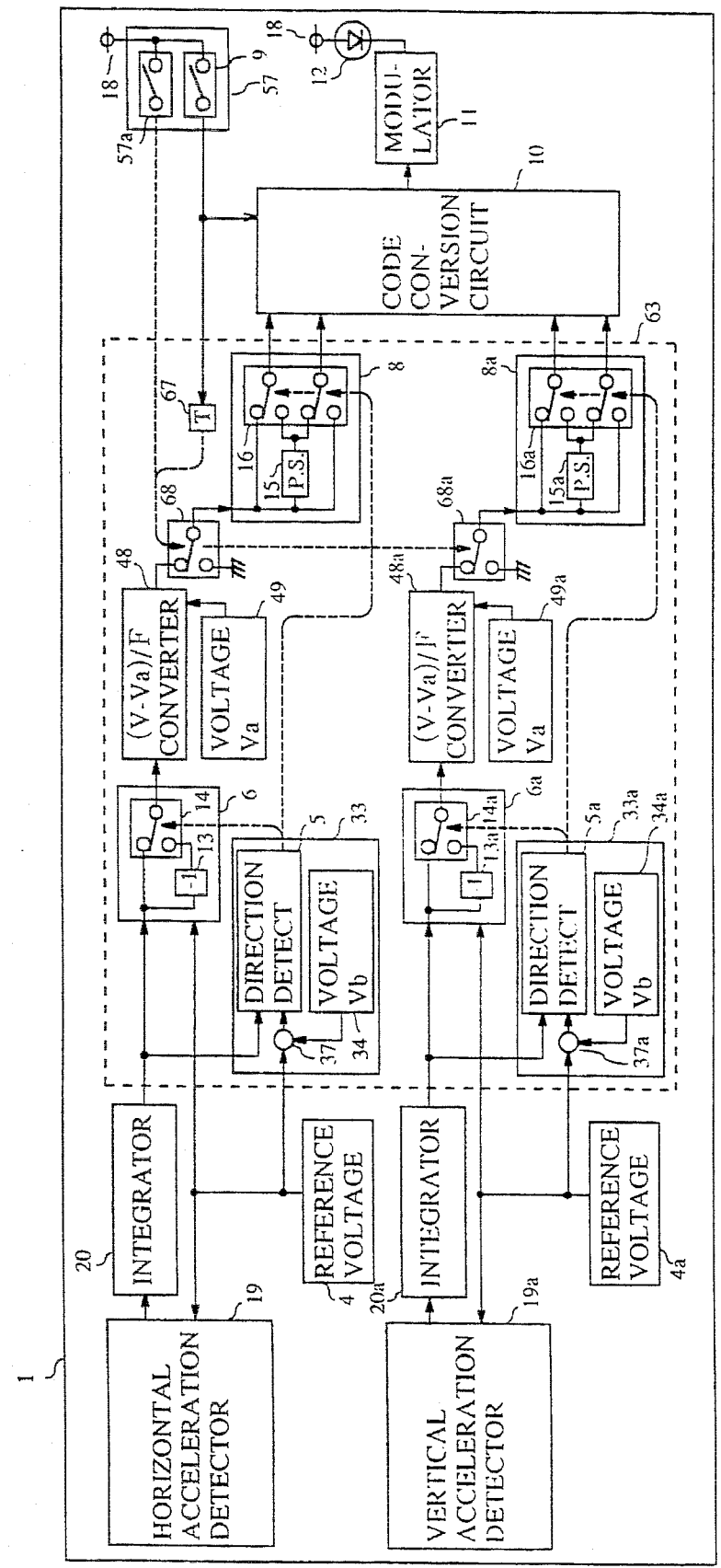
FIG. 62 is a block diagram showing a receiving unit of Embodiment 33.
Figure 63:
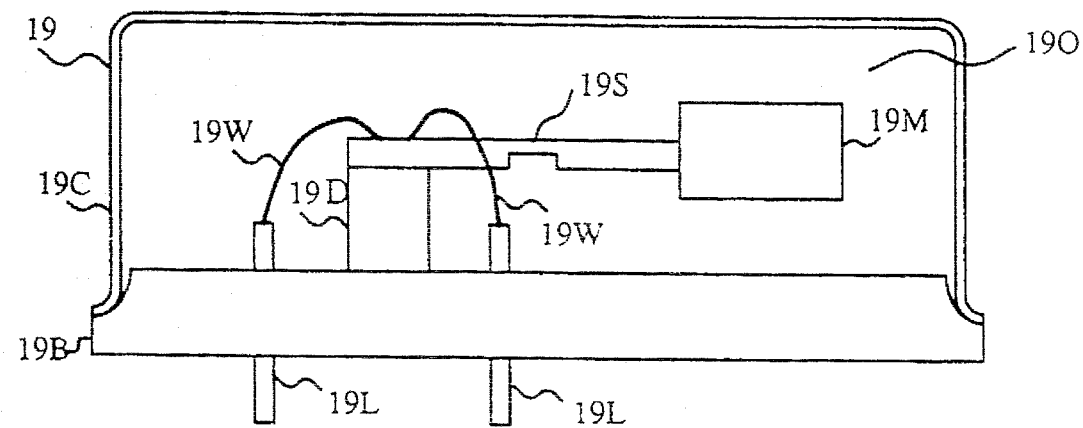
FIG. 63 is a diagram showing an example of an acceleration detector.
Figure 64:
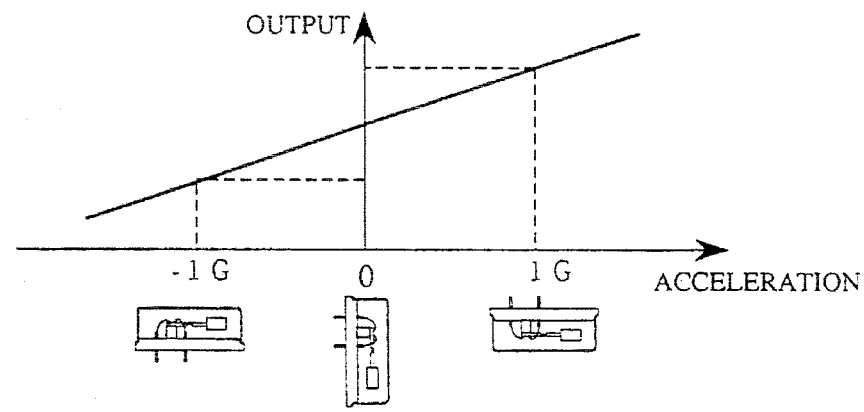
FIG. 64 is a diagram showing the output of the acceleration detector.

FIG. 62 is a block diagram showing the remote control unit according to Embodiment 33 of the present invention. In FIG. 62, reference numerals identical to those in the previously described embodiments designate identical or corresponding members. Reference numerals 19 and 19a designate acceleration detectors for detecting the horizontal and vertical acceleration, respectively, in the form of electrical signals; and 20 and 20a are integrating circuits that integrate the outputs of the acceleration detectors 19 and 19a into velocity signals. FIG. 63 shows an example of the acceleration detector 19, wherein a reference numeral 19B designates a base, 19C a cap, 19D a seat, 19L a terminal, 19M a weight, 19O oil, 19S a sensor and 19W a wire. FIG. 64 is a drawing showing the output of acceleration detector 19.

The following is a description of the operation of the present invention. If acceleration is applied to the acceleration detector 19, force acts on weight 19M and is transmitted to the Sensor 19S. The sensor 19S consists of a piezoresistance semiconductor that senses mechanical strain as changes in electrical resistance. As a result, acceleration can be converted into an electrical signal, as shown in FIG. 64. However, the earth's gravity is acting continuously on the sensor 19S so that the output voltage of the acceleration detector 19 when stationary will differ according to the direction in which it is mounted. When the remote control unit 1 is moved toward the front, back, left or right in space to point at the desired icon, the acceleration signals output from the acceleration detectors 19 and 19a are converted by the integrating circuits 20 and 20a into velocity signals. These signals are converted at the signal conversion means 63 into sequences of pulses equivalent to the sequences of pulses generated by the rotary encoders in a mouse. This sequence of pulses and the signal from the selection switch 9 are input to the code conversion circuit 10 and converted into a code signal according to the standard of control processor 324. This signal is modulated by the modulator 11 and transmitted by the signal transmitter 12 to the controlled unit.

The signal conversion means 63 includes direction detection and hand-shake compensation circuits 33 and 33a, (V−Va)/F conversion circuits 48 and 48a, delay circuit 67 and switching circuits 68 and 68a, and the selection switch 9, which is formed as the two-stage selection switch 57. It is therefore possible to move the cursor in accordance with the movement of the remote control unit in horizontal and vertical directions and select an icon. Moreover, it is possible to realize an improvement in operational convenience in a remote control system that is capable of controlling a remotely controlled unit that can be controlled by a mouse.

Although, the reference voltage sources 4 and 4a for the acceleration detectors 19 and 19a are configured separately, they may also be incorporated within the acceleration detectors 19 and 19a.

Embodiment 34

Figure 65:
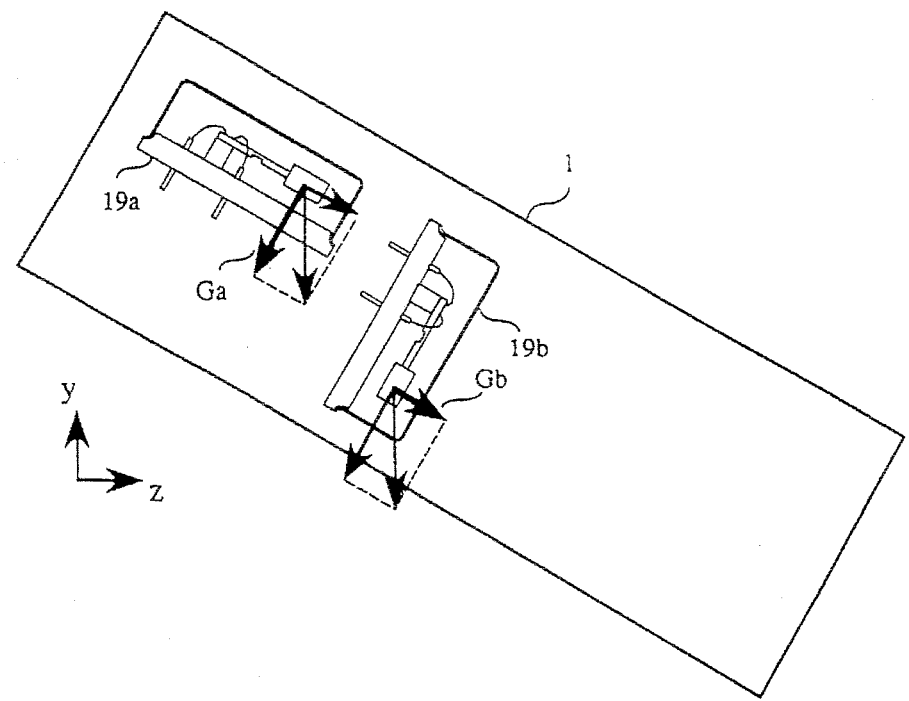
FIG. 65 is a diagram for explaining the operation of Embodiment 34.
Figure 66:
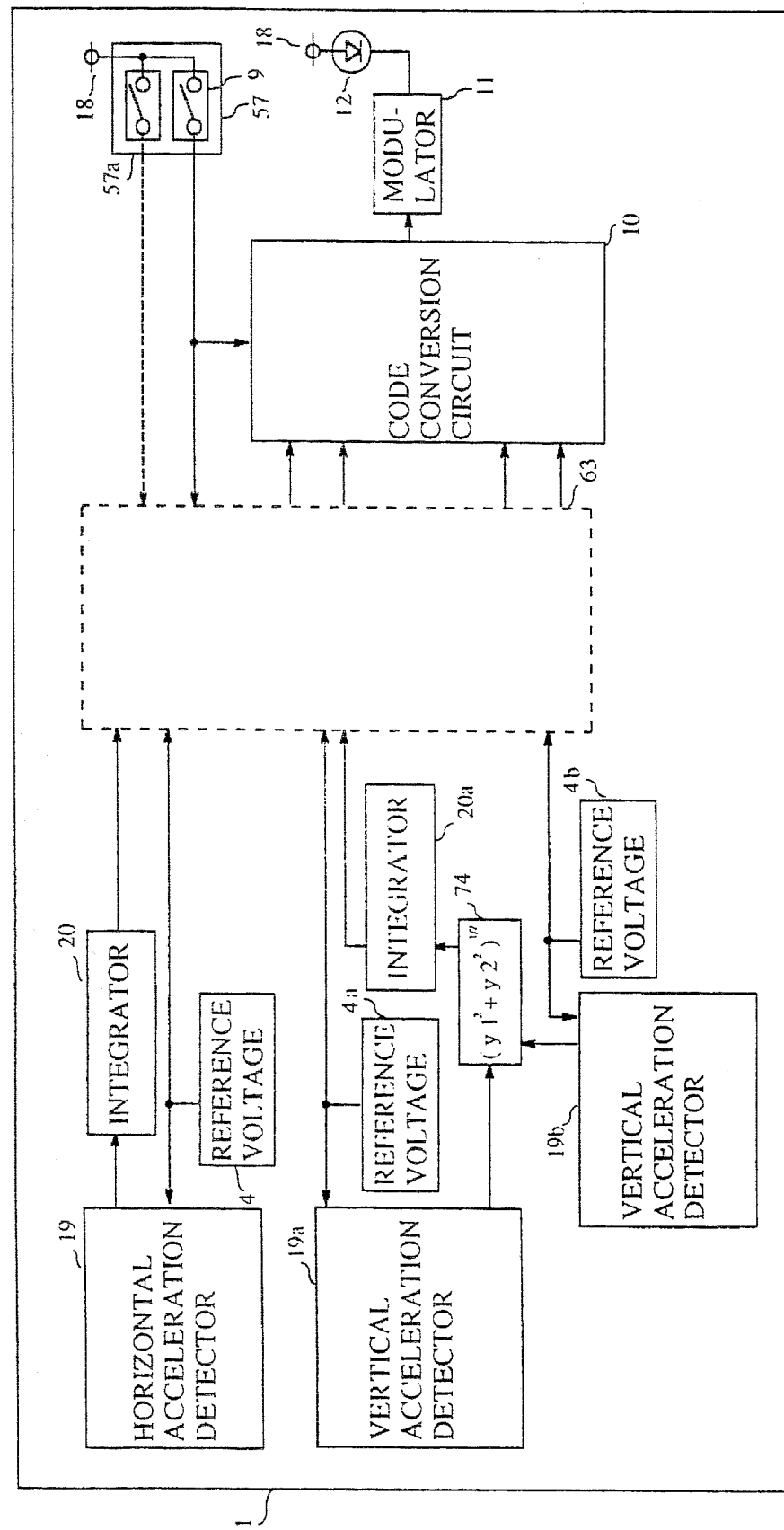
FIG. 66 is a block diagram showing a remote control unit of Embodiment 34.

FIG. 65 and FIG. 66 show Embodiment 34 of the present invention. FIG. 65 shows the gravitational acceleration detected by a vertical acceleration detector that is inclined within plane y-z, and FIG. 66 is a block diagram showing a remote control unit provided with two vertical acceleration detectors. In FIG. 65, a reference numeral 19b designates the second vertical acceleration detector, Ga and Gb designate the gravitational acceleration components detected by the acceleration detectors 19a and 19b, respectively. In FIG. 66, a reference numeral 74 designates an inclination-cancelling circuit that outputs the square root $(y1^2+y2^2)^{1/2}$ of the signals y1 and y2 output by the two vertical acceleration detectors 19a and 19b. In Embodiment 33 above described, detection of vertical acceleration was accomplished by a single acceleration detector 19a. As a result, since the voltage output of acceleration detector 19 when stationary varies with the changes in its inclination due to the earth's gravity, it is necessary to keep the remote control unit 1 at a constant inclination during operation. If, however, a vertical acceleration detector is configured, as in this embodiment, the output voltage due to the earth's gravity when stationary remains constant even if the inclination is changed. The need to take account of the inclination of the remote control unit 1 is therefore eliminated.

Although in the embodiment described, means for eliminating the effect of inclination is provided in the vertical acceleration detector, such means may be similarly provided in the horizontal acceleration detector to eliminate the effect of change in inclination in plane x-y.

Embodiment 35

Figure 67:
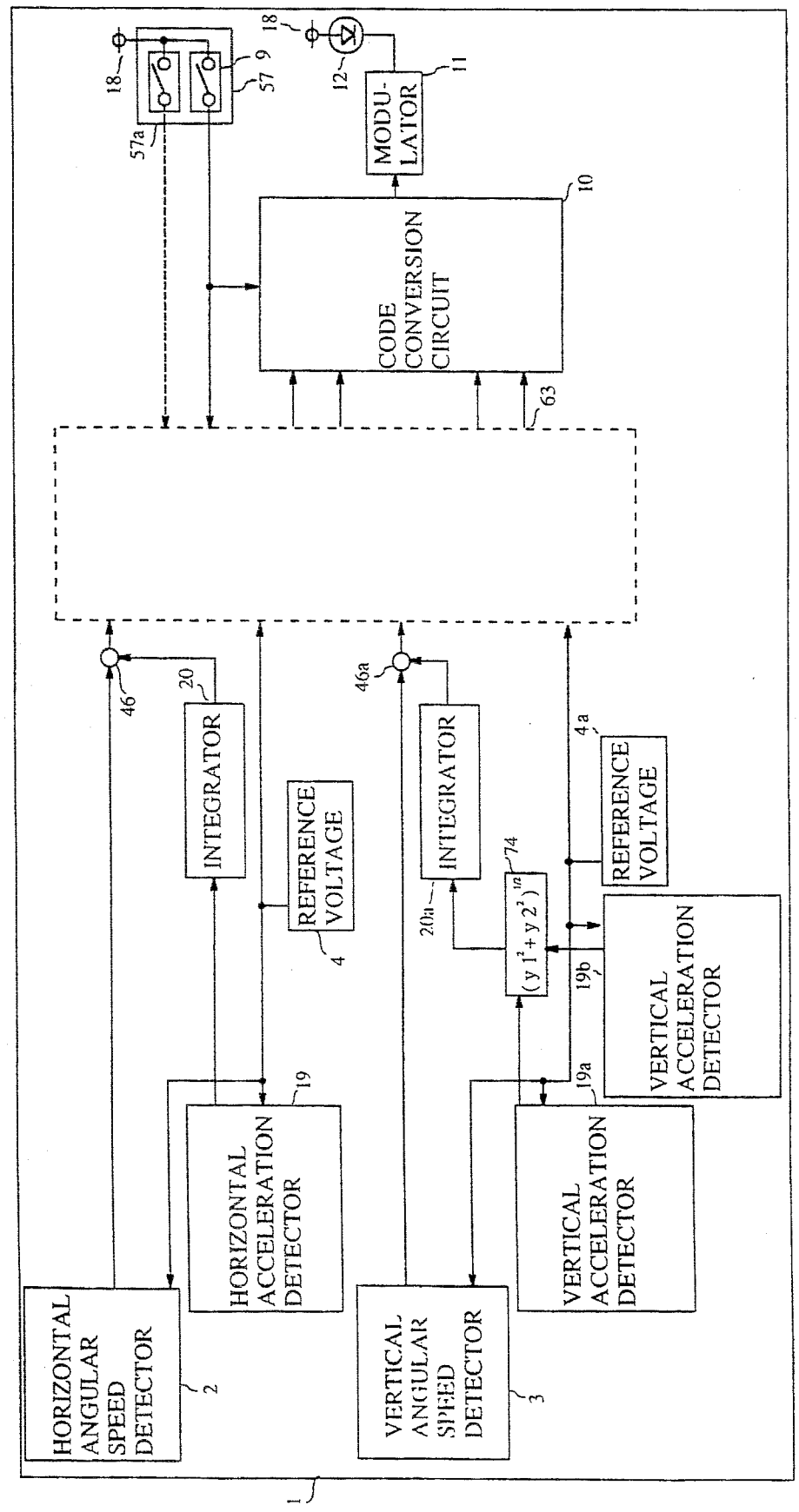
FIG. 67 is a block diagram showing a remote control unit of Embodiment 35.

FIG. 67 is a block diagram showing a remote control unit according to Embodiment 35 of the present invention. This embodiment is provided with vertical and horizontal acceleration detectors and angular speed detectors. In FIG. 67, reference numeral 46 and 46a designate adders that add the outputs of integrating circuits 20 and 20a and angular speed detectors 2 and 3. In the Embodiment 33 above described, detection of the movement of the remote control unit 1 is accomplished solely by an acceleration detector, with the result that, in the event that the value of the acceleration due to change in orientation of the remote control unit is identical with the value of the acceleration due to translation movement, unaccompanied by change in orientation, both are detected as the same value and the cursor moves by the same amount. However, where the orientation of the remote control unit is changed, it is preferable that the cursor be moved to the position at which the remote control unit is pointing. In contrast, when the movement of the control unit is in translation, unaccompanied by change in orientation, it is desired that the cursor be moved to the extent of the translation movement of the remote control unit. This means that the amount of movement of the cursor when the remote control unit changes its orientation must be greater than the amount of movement of the cursor when the remote control unit is moved in translation.

Accordingly, the adoption of the configuration shown in FIG. 67 makes it possible to move the cursor by an output detected solely by the acceleration detector, for the translational movement of the remote control unit, unaccompanied by a change in orientation, or by the additive output of both the acceleration detector and the angular speed detector, for a change in orientation combined with translation movement. In adding the outputs of the integrating circuits 20 and 20a and the angular speed detectors 2 and 3, respectively, by means of the adders 46 and 46a, input signal gain adjustment and reference voltage adjustment will be performed.

In the embodiment above described, translation movement, unaccompanied by change in orientation, and changes in movement involving a change in orientation are added. But it is equally possible to device a configuration such that the gains used for the cursor movement responsive to the translation movement is increased when the change in orientation is also present. It is further possible for the vertical acceleration detector to be similar to that of the Embodiment 34.

Embodiment 36

Figure 68:
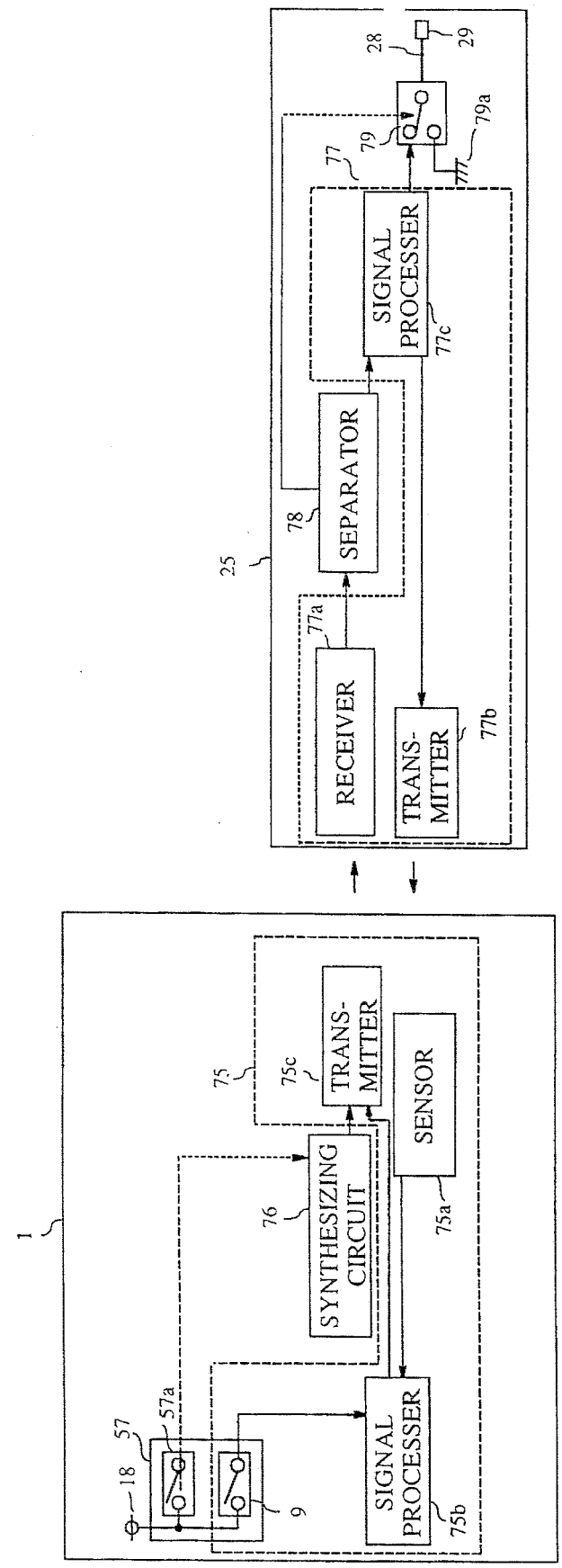
FIG. 68 is a block diagram showing a remote control unit and a receiving unit of a remote control system of Embodiment 36.

FIG. 68 shows Embodiment 36 of the present invention. The left half of FIG. 68 shows the remote control unit of a remote control system using the position detection system and provided with a switch for moving the cursor. The right half of FIG. 68 shows the receiving unit of the remote control system provided with the switch for moving the cursor. As illustrated, a remote control section 75 of this embodiment comprises a sensor 75a, a signal processing circuit 75b, and a transmitter 75c. A signal synthesizing circuit 76 synthesizes the signal from the first-stage switch 57a of the two-stage selection switch 57 with the signal transmitted by the transmitter 75c. The signal synthesizing circuit 76 is composed of an encoder for performing time-axis compression of the signals and multiplexing of the signals.

A receiver 77 comprises a receiving element 77a, a transmitter 77b and a signal processing circuit 77c. A signal separator circuit 78 extracts the signal that originates from the first stage 57a, from the signal received by the receiver 77a, and is composed for example of a decoder. A switching circuit 79 selects either the output of the signal processing circuit 77c or the node of a ground potential.

The light beam signal emitted from the transmitter 77b of the receiver 77 is detected by the sensor 75a of the remote control unit 75. The sensor 75a comprises an image pick-up device composed for example of a two-dimensional CCD array, picks up the image of the light signal from the transmitter 77b, determines the position of the light from the transmitter 77b within the area of the image pick-up device, and determines the position of the remote control unit 1 relative to the receiving unit 25 and hence relative to the display device 100. The signal indicative of the position of the remote control unit 1 is converted at the signal processing circuit 75b into a signal of the cursor 108, and output via the transmitter 75c. This output is received by the receiver 77a, and sent to the signal processing circuit 77c. Responsive to this signal, the signal processing circuit 77c produces a signal for moving the cursor.

The signal of the first-stage switch 57a of the two-stage switch as shown in FIG. 68 is passed through the synthesizing circuit 76 and the signal separator circuit 78, and is used to control the switching circuit 79. As a result, when it is desired to maintain the position of the cursor 108, the first-stage 57a of the two-stage switch is kept off so that the switching circuit 79 selects the node 79a of ground potential. When it is desired to move the cursor 108, the first-stage 57a of the two-stage switch is kept on, so that the switching circuit 79 outputs the signal from the remote control section 75 and the receiver section 77.

With the above arrangement, it is possible to improve the operating convenience through use of a two-stage selection switch, even with a remote control unit using the position detection system.

The position is detected by the use of a light emitting element and an image pick-up device. Any other type of system for determining position can be used instead.

Embodiment 37

Figure 69:
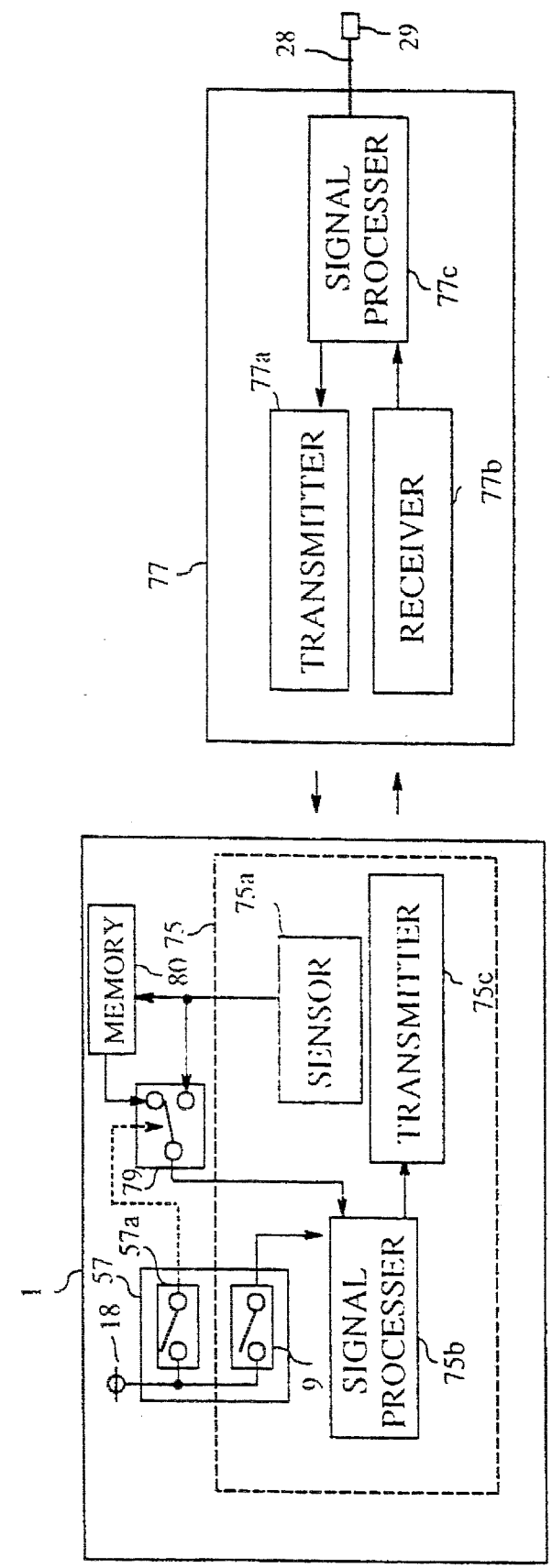
FIG. 69 is a block diagram showing a remote control unit and a receiving unit of a remote control system of Embodiment 37.

FIG. 69 shows a remote control unit and the receiving unit of the position detection type. The reference numerals identical to those in FIG. 68 designate identical or corresponding members. A memory 80 stores the output of the sensor 75a at the instant when the first-stage switch 57a of the two-stage switch 57 is turned off, and keeps outputting the stored output of the sensor 75a. The switching circuit 79 selects the output of the sensor 75a when the first-stage switch 57a is on. When the first-stage switch 57a is off, the switching circuit 79 selects the output of the memory 80. The output of the switching circuit 79 is sent to the signal processing circuit 75b. As a result, after the switch 57a is turned off, the position of the cursor 108 is unchanged. Effects similar to those of Embodiment 36 are therefore obtained.

Embodiment 38

Figure 70:
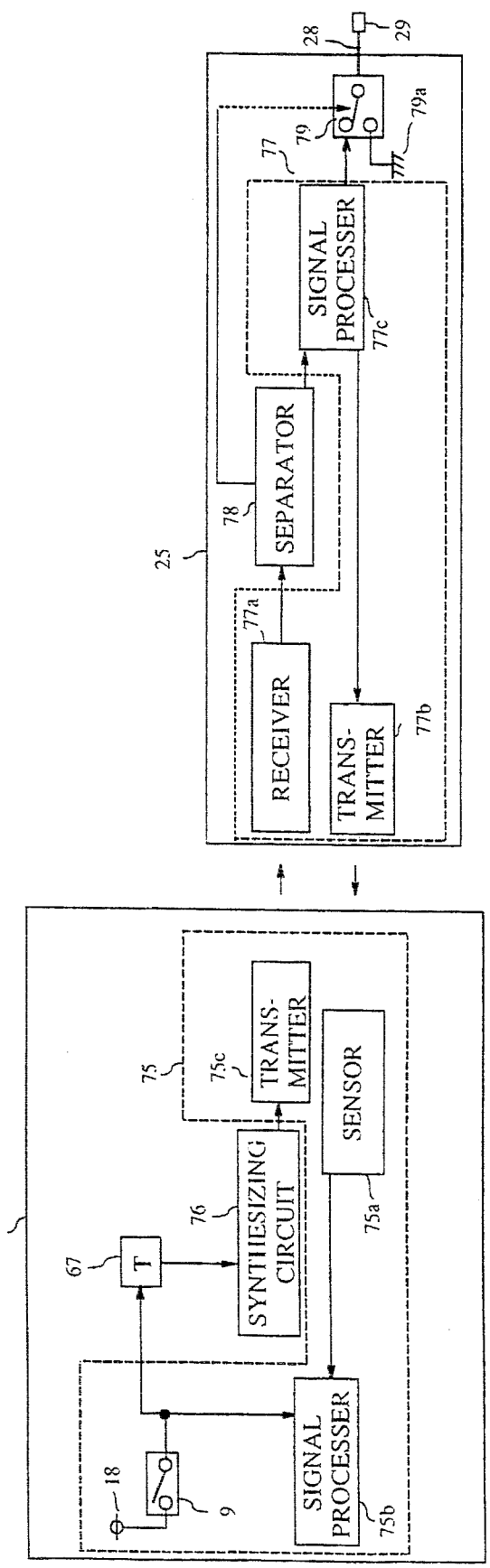
FIG. 70 is a block diagram showing a remote control unit and a receiving unit of a remote control system of Embodiment 38.

FIG. 70 shows the remote control unit and receiving unit of a remote control system of Embodiment 38. In FIG. 70, a timer 67b is responsive to the selection switch 9, and outputs, for a predetermined time period after the selection switch 9 is turned on, a signal indicating that it is in such a predetermined time period. For example, the timer 67b produces a signal which is at a predetermined level for the predetermined time period. The synthesizing circuit 76 synthesizes the output signal of the timer 67b with the signal from the signal processing circuit 75b. The signal from the timer 67b is separated by the signal separator circuit 78, and used for control over the switch 79. That is, the switch 79 prevents output of the signal (of the signal from the signal processing circuit 77c) for moving the cursor for the above-mentioned time period, although it produces a signal indicating that the selection switch is pressed. With such an arrangement, when the selection switch 9 is turned on to select an icon, the signal indicating the position of the remote control unit 1 is not output from the switching circuit 79 for the predetermined time period after the turning-on of the selection switch 9. That is, for a period after the selection switch 9 is pressed for selecting an icon and the selection of the icon is completed, the cursor 108 is not moved. As a result, the effects of the pressing action of the selection switch 9 on the position of the cursor is eliminated.

The timer described above may be used in the remote control systems of the previously described embodiments of the other types.

Embodiment 39

Figure 71:
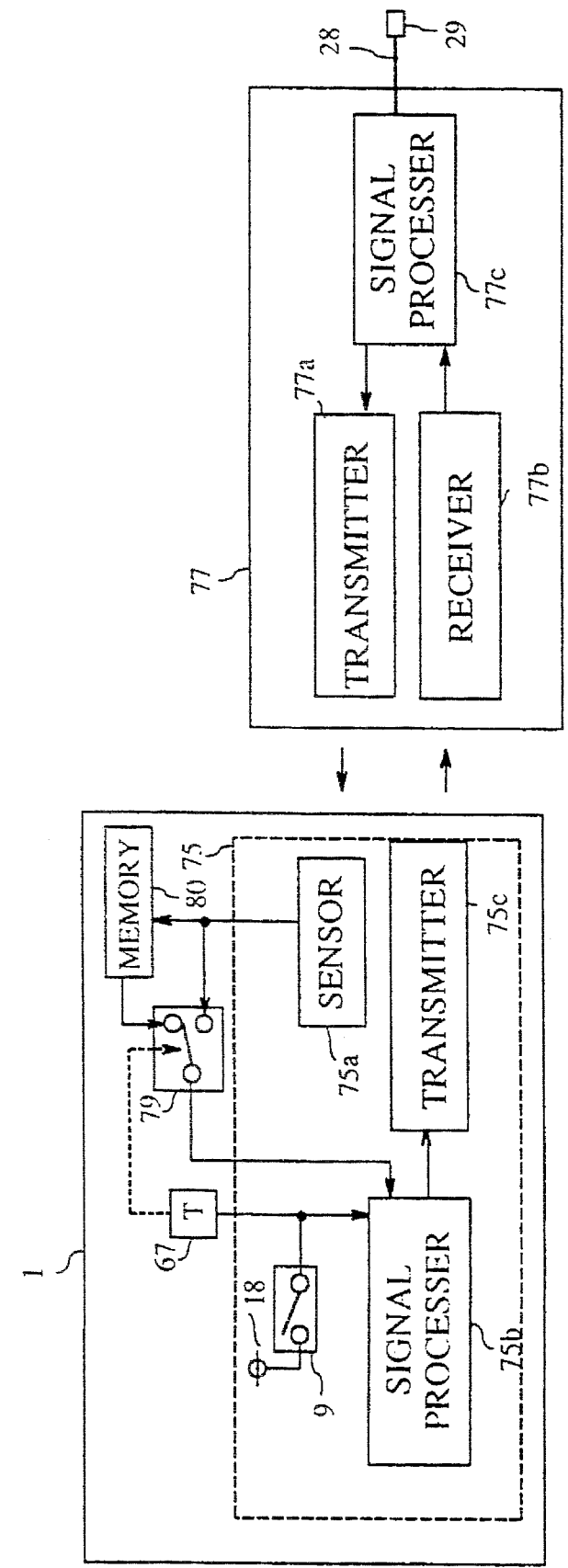
FIG. 71 is a block diagram showing a remote control unit and a receiving unit of a remote control system of Embodiment 39.

FIG. 71 shows the remote control unit and the receiving unit of a remote control system of Embodiment 39. The reference numerals identical to those in FIG. 69 and FIG. 70 designate identical or corresponding members. A memory 80 stores the signal of the sensor 75a at the instant when the selection switch 9 is turned on, and keeps outputting the stored signal from the sensor 75a. A timer 67b outputs a signal indicating that it is in a predetermined time period after the selection switch 9 is turned on. For instance, it produces a signal of a predetermined level for a predetermined time period. The switching circuit 79 normally selects and outputs the output of the sensor 75a. When the output of the timer 67b indicates that it is within the above-mentioned predetermined time period, the switching circuit 79 selects the output of the memory 80. The output of the switching circuit 79 is sent to the signal processing circuit 75b. With such an arrangement, when the selection switch 9 is pressed to select an icon, the signal indicating the position of the remote control unit 1 at the instant when the selection switch 9 is pressed as stored in the memory 80 is output from the switching circuit 79. Accordingly, the cursor 108 is not moved after the selection switch 9 is pressed for selecting an icon until the selection of the icon is completed. As a result, the effects of the pressing action of the selection switch 9 on the position of the cursor 108 is eliminated.

The combination of the timer and memory can be used in the remote control systems of other configurations explained in connection with various embodiments described above. In the various embodiments described above, the invention is applied to a multimedia system. The following invention exemplifies that the invention is also applicable to a system for displaying television broadcast programs or video images from VTRs.

Embodiment 40

Figure 72:
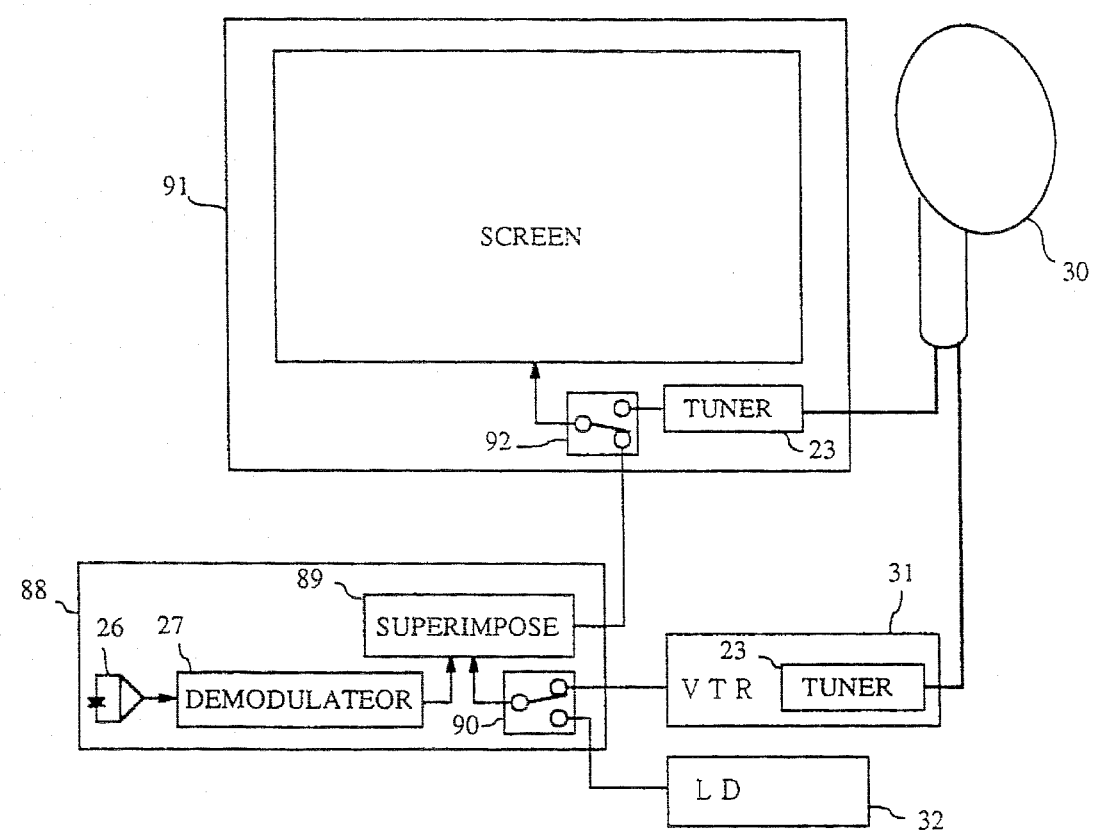
FIG. 72 is a block diagram showing a remote control system of Embodiment 40.
Figure 73:
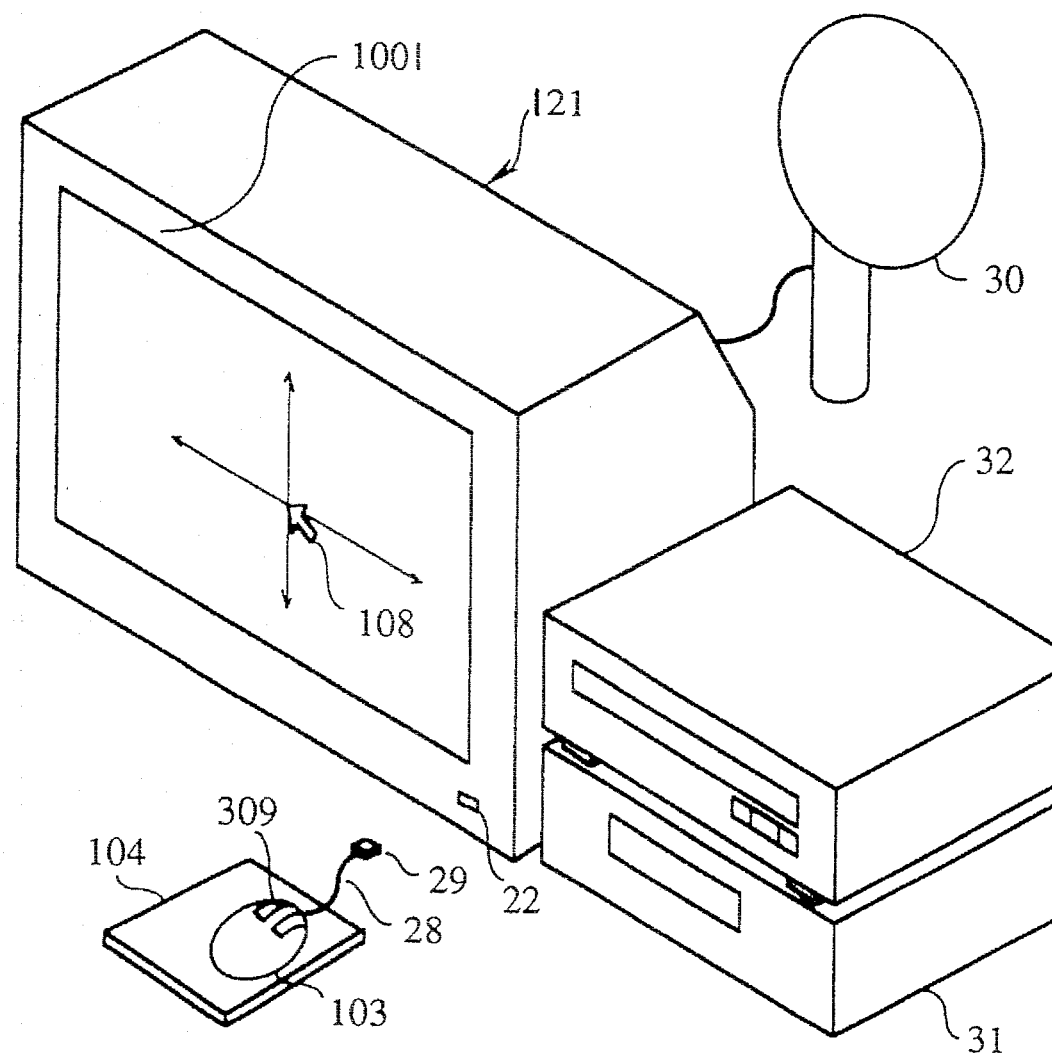
FIG. 73 is a perspective view showing a conventional multimedia system.
Figure 74:
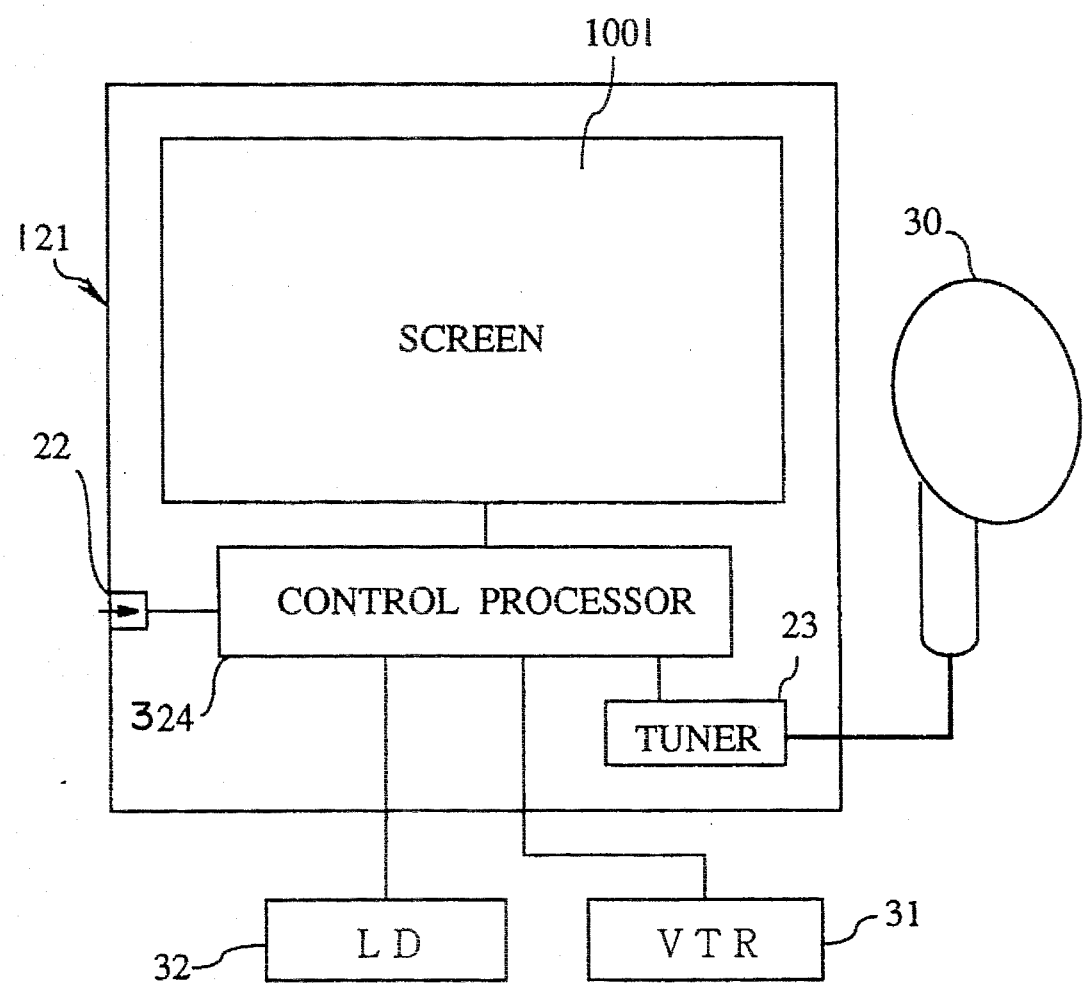
FIG. 74 is a block diagram showing a controlled unit of the conventional multimedia system.
Figure 75:
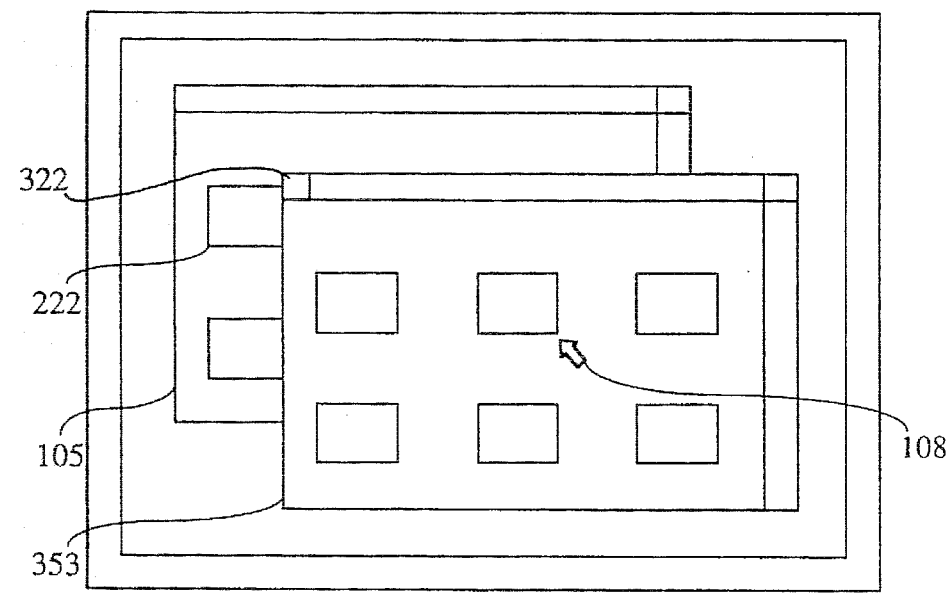
FIG. 75 is a diagram showing the screen of a display device.
Figure 76:
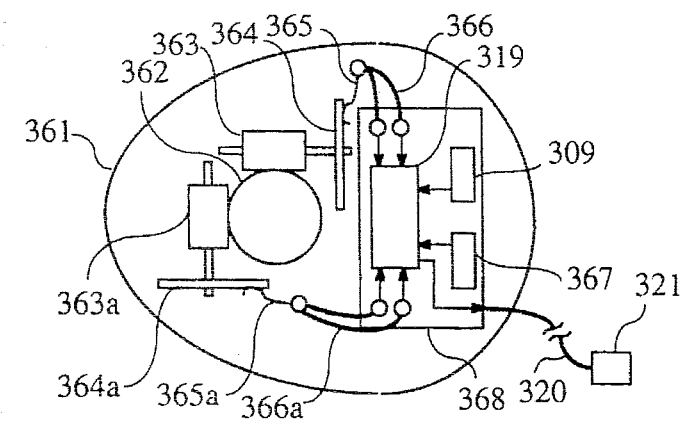
FIG. 76 is a diagram showing a mouse.
Figure 77A:
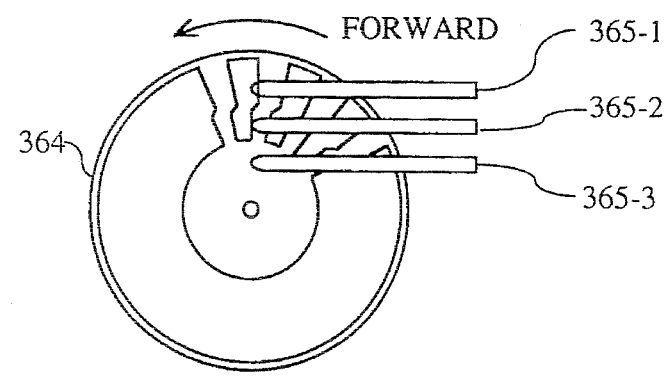
FIG. 77A is a diagram showing rotary encoders and brushes of a mouse which produce sequences of pulses.
Figure 77B:
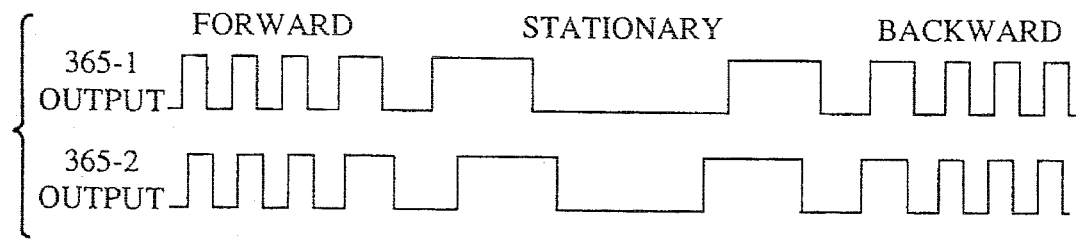
FIG. 77B is a diagram showing the pulses produced by the rotary encoders of a mouse.

FIG. 72 is a block diagram showing a remote control system according to Embodiment 40 of the present invention, wherein a reference numeral 88 designates a superimposing device, 89 a superimposing circuit, 90 an input switching circuit, 91 an ordinary television receiver and 92 an input switching circuit. The signal that displays cursor 108, which is moved by the remote control unit 1, is synthesized by superimposing circuit 89 with the signal of either VTR 31 or laser disc player 32, as selected by input switch 92. As a result, a cursor 108 controlled by the remote control unit 1 can be superimposed in presentations and the like on the screen of ordinary television receiver 91. Similarly the cursor can be displayed on the screen displaying the signals from terrestrial and satellite broadcast tuner 23. The tuner 23 may be built into the television receiver provided separately as part of the VTR.

The concepts explained in connection with the various embodiments described above may be used in combination.

What is claimed is:

1. A remote control system, comprising:

a remote control unit, the remote control unit being moved in three-dimensional space, and including, movement detecting means for detecting movement of the remote control unit, the movement detecting means capable of detecting movement of the remote control unit in any direction, a selection switch, and transmitting means for transmitting output of the movement detecting means and the selection switch; and a controlled unit, the controlled unit including, a display device with a display screen, and which displays a cursor and icons on the display screen;

receiving means for receiving the output of the movement detecting means and the selection switch transmitted by the transmitting means, and control means for moving the cursor across the display screen in accordance with the output of the movement detecting means and the selection switch.

2. A system according to claim 1, wherein the movement detecting means comprises:

a first detecting means for detecting a component in a first direction of change in orientation of the remote control unit; and a second detecting means for detecting a component in a second direction of change in orientation of the remote control unit.

3. A system according to claim 2, wherein the remote control unit further comprises:

first signal converting means for converting an output signal from the first detecting means into a corresponding first sequence of pulses, second signal converting means for converting an output signal from the second detecting means into a corresponding second sequence of pulses, code conversion means for converting the sequences of pulses into corresponding codes; and wherein said transmitting means transmits said codes;

said receiving means receives said codes; and said control means controls the movement of the cursor in accordance with said codes.

4. A system according to claim 3, wherein the first signal converging means includes first angle-to-position conversion modifying means for modifying the first sequence of pulses according to a first angle-to-position conversion coefficient which is a ratio of movement of the cursor in a first direction to an amount of change in orientation of the remote control unit; and the second signal converting means includes second angle-to-position conversion modifying means for modifying the second sequence of pulses according to a second angle-to-position conversion coefficient which is a ratio of movement of the cursor in a second direction to the amount of change in orientation of the remote control unit, the second angle-to-position conversion coefficient being different from the first angle-to-position conversion coefficient.

5. A system according to claim 1, further comprising means for removing, from the output of the movement detecting means, a component due to movement of the remote control unit which is less than a predetermined value.

6. A system according to the claim 1, further comprising means for turning ON a power supply to the remote control unit when the selection switch is manipulated while the power supply to the remote control unit is OFF.

7. A system according to claim 1, further comprising operation detecting means for turning OFF a power supply to at least part of the remote control unit when the detected movement is less than a predetermined value continuously for more than a predetermined time, and for turning ON the power supply when the detected movement exceeds said predetermined value.

8. A system according to claim 1, wherein the transmitting means comprises a plurality of transmitting elements for transmitting signals from the movement detecting means and the selection switch in parallel; and the receiving means comprises a plurality of receiving elements respectively corresponding to the transmitting elements and receiving transmissions from the corresponding transmitting elements to produce the the output of the movement detecting means and the selection switch.

9. A system according to claim 3, wherein the movement detecting means comprises direction detecting means for detecting a direction of change in orientation of the remote control unit; and the direction detecting means produces a signal which assumes either a first value or a second value depending on whether the output of the movement detecting means is or is not greater than a predetermined value different from a value which indicates that there is no movement of the remote control unit.

10. A system according to claim 1, further comprising delay means for delaying the output of the movement detection means;

wherein said transmitting means transmits the output of the movement detection means delayed by said delay means.

11. A system according to claim 1, further comprising means for inhibiting movement of the cursor for a period after the selection switch is manipulated to select an icon and until a predetermined time has elapsed after such manipulation of the selection switch.

12. A system according to claim 1, further comprising means for producing a sound when the selection switch is brought to a first state in which movement of the cursor is enabled, and when one of (1) the selection switch ceases to be in the first state and (2) as long as said selection switch is in the first state.

13. A system according to claim 1, further comprising a first member to which said movement detecting means is mounted, and a second member to which said selection switch is mounted, said first and second member being separate bodies.

14. A system according to claim 1, further comprising a damping material interposed between the movement detecting means and the selection switch.

15. A system according to claim 1, wherein said selection switch comprises a two-stage switch which produces a first signal when its first stage is manipulated, said system further comprises synthesizing means for synthesizing the first signal produced by the operation of said first stage, with a movement signal produced by the movement detecting means to produce a synthetic signal;

said transmitting means transmits the synthetic signal;

said controlled unit comprises, separating means for separating the synthetic signal into the first signal indicating the manipulation of said first stage and the movement signal indicating movement of the remote control unit;

signal generating means, responsive to the first signal indicating the manipulation of the first stage, for producing a generated signal for turning ON the power supply to the display device or to select a specific icon;

a synthetic means for synthesizing the first signal produced by said separating means, the movement signal indicating movement of the remote control unit and the generated signal produced by the signal generated means.

16. A system according to claim 1, further comprising a movement enabling switch which, when manipulated, enables movement of the cursor in accordance with movement of the remote control unit;

wherein the movement enabling switch and the selection switch are separate and independent switches.

17. A system according to claim 1, wherein the transmitting means comprises means for producing electric waves, light, ultrasonic waves or the like, and comprises a plurality of transmitting elements directed towards different directions.

18. A system according to claim 1, wherein the transmitting means comprises means for producing light, and comprises a transmitting element and a lens for diverging the light from the transmitting element.

19. A system according to claim 1 wherein the transmitting means comprises means for producing electric waves, light, ultrasonic waves or the like, and the receiving means comprises a plurality of receiving elements provided at different positions on the controlled unit.

20. A system according to claim 1, further comprising a continuous variation detecting circuit for enabling movement of the cursor only when the remote control unit is moving continuously.

21. A system according to claim 1, further comprising a click interval detecting circuit for permitting an ON signal from the selection switch to select an icon only when an interval between ON signals from the selection switch is longer than a predetermined value.

22. A system according to claim 1, wherein the movement detecting means comprises:

first detecting means for detecting a component of movement in a first direction;

second detecting means for detecting a component of movement in a second direction;

first signal converting means for converting an output signal from the first detecting means into a corresponding first sequence of pulses;

second signal converting means for converting an output signal from the second detecting means into a corresponding second sequence of pulses;

code conversion means for converting the first and second sequences of pulses into corresponding codes; and wherein the transmitting means transmits the codes;

the receiving means receives the codes; and the control means controls movement of the cursor in accordance with the codes.

23. A system according to claim 1, wherein the movement detecting means comprises:

a first detecting means for detecting a component of movement in a first direction; and a second detecting means for detecting a component of the movement in a second direction; and wherein the selection switch is provided such that pressing of the selection switch occurs in a third direction normal to the first and second directions.

24. A system according to claim 1, wherein the movement detecting means comprises:

first detecting means for detecting an acceleration in a first direction of movement of the remote control unit; and second detecting means for detecting an acceleration in a second direction of movement of the remote control unit.

25. A system according to claim 24, wherein at least one of the first and second detecting means comprises a pair of acceleration sensors for detecting acceleration components in directions orthogonal to each other, and a circuit for determining a square root of a sum of squares of outputs of the pair of acceleration sensors.

26. A system according to claim 24, wherein the remote control unit further comprises:

first integrating means for integrating output of the first detecting means into a first velocity signal;

second integrating means for integrating output of the second detecting means into a second velocity signal;

first signal converting means for converting the first velocity signal into a corresponding first sequence of pulses;

second signal converting means for converting the second velocity signal into a corresponding second sequence of pulses;

code conversion means for converting the first and second sequences of pulses into corresponding codes; and wherein the transmitting means transmits the codes;

the receiving means receives the codes; and the control means controls movement of the cursor in accordance with the codes.

27. A system according to claim 26, wherein the movement detecting means further comprises:
third detecting means for detecting a component in the first direction of change in orientation of the remote control unit;
fourth detecting means for detecting a component in the second direction of change in orientation of the remote control unit;
first adding means for adding outputs of said first integrating means and said third detecting means; and
second adding means for adding outputs of said second integrating means and said fourth detecting means.

28. A remote control system, comprising:
a remote control unit, the remote control unit being moved in three-dimensional space, and including,
position detecting means for detecting a position of the remote control unit relative to a display device, the position detecting means capable of detecting the position of the remote control unit relative to the display device in any position in the three-dimensional space,
a selection switch, and
transmitting means for transmitting output of the position detecting means and the selection switch; and
a controlled unit, the controlled unit including,
the display device with a display screen, and which displays a cursor and icons on the display screen;
receiving means for receiving the output of the position detecting means and the selection switch transmitted by the transmitting means, and
control means for moving the cursor across the display screen in accordance with the output of the position detecting means and the selection switch.

29. A system according to claim 28, wherein said selection switch comprises a two-stage switch, and said system further comprises operation stopping means responsive to a signal from a first stage of said two-stage switch for stopping movement of the cursor.

30. A system according to claim 29, wherein the operation stopping means comprises:
a synthesizing circuit provided in the remote control unit for synthesizing the signal from the first stage with output of the position detecting means and a signal from a second stage of the selection switch;
a separating circuit provided in the controlled unit for separating the signal from the first stage from the ouput of the position detecting means and the signal from the second stage; and
a switching circuit provided in the controlled unit to receive the output of the position detecting means, and responsive to the signal from the first stage for preventing output of the output of the position detecting means to the control means.

31. A system according to claim 29, wherein the operation stopping means comprises:
a memory provided in the remote control unit which stores the output of the position detecting means at the instant when the first stage of the two-stage switch is turned OFF; and
a switch provided in the controlled unit for selecting the output of the position detecting means when the first stage is ON, and selecting the output of the memory when the first stage is OFF; and wherein
said control means receives output of the switch and moves the cursor in accordance with the output of the switch.

32. A system according to claim 28, further comprising operation stopping means For preventing movement of the cursor for a predetermined time after selection of an icon by means of the selection switch.

33. A system according to claim 32, wherein the operation stopping means comprises:
a timer for producing a signal for a predetermined time after turning-ON of the selection switch;
a synthesizing circuit provided in the remote control unit for synthesizing the signal of the timer with the output of the position detecting means and the output of the selection switch;
a separating circuit provided in the controlled unit for separating the signal of the timer from the output of the position detecting means and the output of the selection switch;
a switching circuit receiving the output of the position detecting means, and responsive to the signal of the timer to prohibit outputting for the predetermined time; and wherein
the control means moves the cursor in accordance with output of the switching circuit.

34. A system according to claim 32 wherein the operation stopping means comprises:
a timer for producing a signal for a predetermined time after the selection switch is turned ON;
a memory provided in the remote control unit for storing the output of the position detecting means at the time when the selection switch is turned ON; and
a switching circuit for selecting output of the memory for a predetermined time after the selection switch is turned ON, and selecting the output of the position detecting means at other times; and wherein
said control means moves the cursor in accordance with output of the switching circuit.

35. A system according to claim 3, wherein
the first signal converting means includes,
first coefficient setting means for setting a first conversion coefficient, which is a ratio of movement of the cursor in a first direction to an amount of change in orientation of the remote control unit, in accordance with a cumulative amount of change in the orientation of the remote control unit, and
first angle-to-position conversion modifying means for modifying the first sequence of pulses according to the first conversion coefficient; and
the second signal converting means includes,
second coefficient setting means for setting a second conversion coefficient, which is a ratio of movement of the cursor in a second direction to an amount of change in orientation of the remote control unit, in accordance with the cumulative amount of change in the orientation of the remote control unit, and
second angle-to-position conversion modifying means for modifying the second sequence of pulses according to the second conversion coefficient.

36. A system according to claim 1, wherein
the selection switch comprises a two-stage selection switch; and
the control means moves the cursor in accordance with the output of the movement detecting means when the two-stage selection switch is pressed to a first depth, and selects an icon indicated by the cursor on the display screen when the two-stage selection switch is pressed to a second, greater, depth.

37. A system according to claim 36, wherein the first stage of the two-stage selection switch is operated by a minute pressing force.

38. A remote control system, comprising:
a remote control unit, the remote control unit being moved in three-dimensional space, and including,
direction detecting means for detecting a direction of change in orientation of the remote control unit, the direction detecting means capable of detecting the direction of change in orientation of the remote control unit in any direction in the three-dimensional space;
a selection switch, and
transmitting means for transmitting output of the direction detecting means and the selection switch; and
a controlled unit, the controlled unit including,
a display device with a display screen, and which displays a cursor and icons on the display screen;
receiving means for receiving the output of the direction detecting means and the selection switch transmitted by the transmitting means, and
control means for moving the cursor across the display screen in accordance with the output of the direction detecting means and the selection switch.

39. A system according to claim 38, further comprising:
absolute value determining means for determining an absolute value of the change in orientation of the remote control unit based on the output of the direction detecting means, and producing a voltage signal representative of the absolute value;
a voltage-to-frequency conversion circuit for converting the voltage signal into a first sequence of pulses;
a phase shift circuit for shifting a phase of the first sequence of pulse to produce a second sequence of pulses have a phase difference with respect to the first sequence of pulses;
a switching circuit for selectively assuming a first position and a second position, when in the first position the switching circuit outputs the first and second sequence of pulses as third and fourth sequence of pulses, respectively, and when in the second position the switching circuit outputs the first and second sequence of pulses as the fourth and third sequence of pulses, respectively.

40. A system according to claim 39, wherein
the remote control unit includes the absolute value detecting means, and the voltage-to-frequency conversion circuit;
the controlled unit includes the switching circuit and the phase shift circuit;
the transmitter transmits the first sequence of pulses; and
the receiver receives the first sequence of pulses.

41. A system according to claim 39, wherein the controlled unit includes the absolute value circuit, the voltage-to-frequency conversion circuit, the switching circuit and the phase shift circuit.

42. A system according to claim 38, wherein
the directing detecting means includes,
first detecting means for detecting a component of movement of the remote control unit in a first direction, and
second detecting means for detecting a component of movement of the remote control unit in a second direction; and
the system further comprises,
first signal converting means for converting an output of the first detecting means into a first sequence of pulses;
second signal converting means for converting an output of the second detecting means into a second sequence of pulses;
code conversion means for converting the first and second sequence of pulses into codes; and
the control means moves the cursor in accordance with the codes.

43. A system according to claim 42, wherein
the remote control unit includes the first signal converting means, the second signal converting means, and the code converting means;
the transmitter transmits the codes; and
the receiver receives the codes.

44. A system according to claim 42, wherein
the remote control unit includes the first signal converting means and the second signal converting means;
the controlled unit includes the code converting means;
the transmitter transmits the first and second sequence of pulses; and
the receiver receives the first and second sequence of pulses.

45. A system according to claim 42, wherein the controlled unit includes there first signal converting means, the second signal converting means, and the code converting means.

46. A system according to claim 3, wherein the codes received by the control means are of a format received when using a mouse to move a cursor on the display screen.

47. A system according to claim 22, wherein the codes received by the control means are of a format received when using a mouse to move a cursor on the display screen.

48. A system according to claim 26, wherein the codes received by the control means are of a format received when using a mouse to move a cursor on the display screen.

49. A system according to claim 42, wherein the codes received by the control means are of a format received when using a mouse to move a cursor on the display screen.

50. A system according to claim 2, wherein
said first detecting means includes an angular speed detector; and
said second detecting means includes an angular speed detector.

51. A remote control system comprising:
a remote control unit, the remote control unit being moved in three-dimensional space, and including,
movement detecting means for detecting a rate of movement of the remote control unit,
a selection switch, and
transmitting means for transmitting output of the movement detecting means and the selection switch; and
a controlled unit, the controlled unit including,
a display device with a display screen, and which displays a cursor and icons on the display screen;
receiving means for receiving the output of the movement detecting means and the selection switch transmitted by the transmitting means, and
control means for moving the cursor across the display screen in accordance with the output of the movement detecting means and the selection switch.

52. A remote control system, comprising:
a remote control unit, the remote control unit being moved in three-dimensional space, and including,
position detecting means for detecting a rate of change in a position of the remote control unit relative to a display device;

a selection switch, and transmitting means for transmitting output of the position detecting means and the selection switch; and a controlled unit, the controlled unit including, the display device with a display screen, and which displays a cursor and icons on the display screen;

receiving means for receiving the output of the position detecting means and the selection switch transmitted by the transmitting means, and control means for moving the cursor across the display screen in accordance with the output of the position detecting means and the selection switch.

53. A remote control system, comprising:

a remote control unit, the remote control unit being moved in three-dimensional space, and including, direction detecting means for detecting a rate of change in orientation of the remote control unit;

a selection switch, and transmitting means for transmitting output of the direction detecting means and the selection switch; and a controlled unit, the controlled unit including, a display device with a display screen, and which displays a cursor and icons on the display screen;

receiving means for receiving the output of the direction detecting means and the selection switch transmitted by the transmitting means, and control means for moving the cursor across the display screen in accordance with the output of the direction detecting means and the selection switch.

* * * * *